US011669156B2

(12) United States Patent
Nguyen et al.

(10) Patent No.: US 11,669,156 B2
(45) Date of Patent: *Jun. 6, 2023

(54) METHODS, SYSTEMS, APPARATUSES, AND TECHNIQUES FOR EMPLOYING AUGMENTED REALITY AND VIRTUAL REALITY

(71) Applicant: Rockwell Automation Technologies, Inc., Mayfield Heights, OH (US)

(72) Inventors: Thong T. Nguyen, New Berlin, WI (US); John M. Van Hecke, Hartland, WI (US); Alex L. Nicoll, Brookfield, WI (US); Paul D. Schmirler, Glendale, WI (US); Mark Bjerke, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,928

(22) Filed: Apr. 27, 2022

(65) Prior Publication Data

US 2022/0253129 A1 Aug. 11, 2022

Related U.S. Application Data

(63) Continuation of application No. 16/953,016, filed on Nov. 19, 2020, now Pat. No. 11,347,304, which is a
(Continued)

(51) Int. Cl.
*G06F 3/01* (2006.01)
*G06T 11/60* (2006.01)
(Continued)

(52) U.S. Cl.
CPC .............. *G06F 3/011* (2013.01); *G06F 3/016* (2013.01); *G06F 3/0304* (2013.01); *G06T 11/00* (2013.01);
(Continued)

(58) Field of Classification Search
CPC ........ G06F 3/011; G06F 3/016; G06F 3/0304; G06F 3/0482; G06T 11/00; G06T 11/60; G06T 2200/24; G09B 19/00; G09B 9/00
See application file for complete search history.

(56) References Cited

U.S. PATENT DOCUMENTS 5,168,441 A 12/1992 Onarheim et al.
5,471,214 A 11/1995 Faibish et al.
(Continued)

FOREIGN PATENT DOCUMENTS

CN 104142630 A 11/2014
CN 103543700 B 8/2016
(Continued)

OTHER PUBLICATIONS

U.S. Appl. No. 16/953,016, filed Nov. 19, 2020.
(Continued)

*Primary Examiner* — Dmitriy Bolotin
(74) *Attorney, Agent, or Firm* — Amin, Turocy & Watson LLP

(57) ABSTRACT

Techniques for employing augmented reality or virtual reality information are presented. An information management component (IMC) of an augmented reality device (ARD) can monitor and detect user activities and conditions in area in proximity to ARD. Based on user activities and conditions, IMC can determine augmented reality information that can enhance user experience, performance of user activities, or security and safety of user. IMC can present, via an interface component of ARD, the augmented reality information to the user. The augmented reality information can relate to user location; navigation by the user; tasks to be performed by the user; product assembly; maintenance work; system or product design or configuration; remote control of assembly, maintenance, design, or configuration; environmental and/or hazardous conditions; security, iden-
(Continued)

tification, and authentication of users; or training the user to perform tasks. IMC can translate information from a language to a different language of the user.

20 Claims, 17 Drawing Sheets

Related U.S. Application Data continuation of application No. 15/807,247, filed on Nov. 8, 2017, now Pat. No. 10,866,631.

(60) Provisional application No. 62/419,499, filed on Nov. 9, 2016.

(51) Int. Cl.
| | | |
|---|---|---|
| G09B 9/00 | (2006.01) | |
| G09B 19/00 | (2006.01) | |
| G06F 3/03 | (2006.01) | |
| G06T 11/00 | (2006.01) | |
| G06F 3/0482 | (2013.01) | |

(52) U.S. Cl.
CPC .............. *G06T 11/60* (2013.01); *G09B 9/00* (2013.01); *G09B 19/00* (2013.01); *G06F 3/0482* (2013.01); *G06T 2200/24* (2013.01)

(56) References Cited

U.S. PATENT DOCUMENTS

| | | |
|---|---|---|
| 5,717,456 A | 2/1998 | Rudt et al. |
| 5,777,874 A | 7/1998 | Flood et al. |
| 6,002,406 A | 12/1999 | Zhao |
| 6,334,124 B1 | 12/2001 | Bouchard et al. |
| 6,583,794 B1 | 6/2003 | Wattenberg |
| 6,788,315 B1 | 9/2004 | Kekic et al. |
| 7,612,661 B1 | 11/2009 | Johnson et al. |
| 8,285,744 B2 | 10/2012 | Dorgelo et al. |
| 8,453,091 B1 | 5/2013 | Rao et al. |
| 8,489,641 B1 | 7/2013 | Seefeld et al. |
| 8,539,567 B1 | 9/2013 | Logue et al. |
| 8,773,465 B2 | 7/2014 | France et al. |
| 8,819,149 B2 | 8/2014 | Amidon et al. |
| 8,886,153 B2 | 11/2014 | Velusamy et al. |
| 9,069,382 B1 | 6/2015 | Starner et al. |
| 9,213,714 B1 | 12/2015 | Ording |
| 9,237,141 B2 | 1/2016 | Logue et al. |
| 9,438,648 B2 | 9/2016 | Asenjo et al. |
| 9,709,978 B2 | 7/2017 | Asenjo et al. |
| 9,937,577 B2 | 4/2018 | Daniel et al. |
| 9,952,882 B2 | 4/2018 | Kuscher et al. |
| 10,395,222 B2 * | 8/2019 | Washiro ................ G06Q 10/20 |
| 11,347,304 B2 * | 5/2022 | Nguyen .................. G09B 9/00 |
| 2002/0044104 A1 * | 4/2002 | Friedrich ............ G05B 19/409 |
| | | 345/8 |
| 2002/0049775 A1 | 4/2002 | Friedrich et al. |
| 2002/0136432 A1 | 9/2002 | Koike et al. |
| 2002/0158873 A1 | 10/2002 | Williamson |
| 2004/0046711 A1 | 3/2004 | Triebfuerst |
| 2004/0181549 A1 | 9/2004 | Pate |
| 2005/0010307 A1 | 1/2005 | Dove et al. |
| 2005/0023347 A1 | 2/2005 | Wetzel et al. |
| 2005/0188376 A1 | 8/2005 | Matsumoto et al. |
| 2005/0204315 A1 | 9/2005 | Knol et al. |
| 2006/0161544 A1 | 7/2006 | Lee et al. |
| 2006/0241792 A1 | 10/2006 | Pretlove et al. |
| 2006/0271884 A1 | 11/2006 | Hurst |
| 2007/0078824 A1 | 4/2007 | Dorgelo et al. |
| 2008/0007555 A1 | 1/2008 | Vrba et al. |
| 2008/0072180 A1 | 3/2008 | Chevalier et al. |
| 2009/0077055 A1 | 3/2009 | Dillon et al. |
| 2009/0085934 A1 | 4/2009 | Baier et al. |
| 2009/0086021 A1 | 4/2009 | Baier et al. |
| 2009/0088875 A1 | 4/2009 | Baier et al. |
| 2009/0089225 A1 | 4/2009 | Baier et al. |
| 2009/0112816 A1 | 4/2009 | Marlow |
| 2009/0125796 A1 | 5/2009 | Day et al. |
| 2009/0216341 A1 | 8/2009 | Enkerud et al. |
| 2009/0288011 A1 | 11/2009 | Piran et al. |
| 2009/0307162 A1 | 12/2009 | Bui et al. |
| 2009/0307255 A1 | 12/2009 | Park |
| 2009/0322671 A1 * | 12/2009 | Scott ....................... G06F 3/012 |
| | | 345/173 |
| 2010/0016995 A1 | 1/2010 | Barat |
| 2010/0077377 A1 | 3/2010 | Pegden |
| 2010/0082661 A1 | 4/2010 | Beaudreau |
| 2011/0022198 A1 | 1/2011 | Plache et al. |
| 2011/0022310 A1 | 1/2011 | Ishii et al. |
| 2011/0119227 A1 | 3/2011 | Wang et al. |
| 2011/0093188 A1 | 4/2011 | Barkai et al. |
| 2011/0115816 A1 | 5/2011 | Brackney |
| 2011/0270117 A1 * | 11/2011 | Warwick ............... A61B 5/6831 |
| | | 600/544 |
| 2011/0298579 A1 | 12/2011 | Hardegger et al. |
| 2011/0316884 A1 | 12/2011 | Giambalvo et al. |
| 2012/0120070 A1 | 5/2012 | Baillot |
| 2012/0224057 A1 | 9/2012 | Gill et al. |
| 2012/0233573 A1 | 9/2012 | Sullivan et al. |
| 2012/0242648 A1 | 9/2012 | Baier et al. |
| 2012/0249588 A1 | 10/2012 | Tison et al. |
| 2012/0249741 A1 | 10/2012 | Maciocci et al. |
| 2012/0254792 A1 | 10/2012 | Husoy et al. |
| 2012/0259436 A1 | 10/2012 | Resurreccion et al. |
| 2012/0296635 A1 | 11/2012 | Brockett et al. |
| 2012/0300089 A1 | 11/2012 | Sbaiz et al. |
| 2012/0304007 A1 | 11/2012 | Hanks et al. |
| 2012/0314571 A1 | 12/2012 | Forssell |
| 2012/0320088 A1 | 12/2012 | Ihara et al. |
| 2013/0006395 A1 | 1/2013 | Plache et al. |
| 2013/0031202 A1 | 1/2013 | Mick et al. |
| 2013/0031508 A1 | 1/2013 | Kodosky et al. |
| 2013/0038633 A1 | 2/2013 | Maggiore |
| 2013/0054573 A1 | 2/2013 | Snellman et al. |
| 2013/0073400 A1 | 3/2013 | Heath |
| 2013/0083012 A1 | 4/2013 | Han et al. |
| 2013/0110978 A1 | 5/2013 | Gordon et al. |
| 2013/0120449 A1 | 5/2013 | Ihara et al. |
| 2013/0124253 A1 | 5/2013 | Cooper et al. |
| 2013/0124465 A1 | 5/2013 | Pingel et al. |
| 2013/0124613 A1 | 5/2013 | Plache et al. |
| 2013/0125233 A1 | 5/2013 | Bush et al. |
| 2013/0147838 A1 | 6/2013 | Small et al. |
| 2013/0169681 A1 | 7/2013 | Rasane et al. |
| 2013/0211546 A1 | 8/2013 | Lawson et al. |
| 2013/0211559 A1 | 8/2013 | Lawson et al. |
| 2013/0222373 A1 | 8/2013 | Weinstein et al. |
| 2013/0246539 A1 | 9/2013 | Davis |
| 2013/0257863 A1 | 10/2013 | Mikkelsen |
| 2013/0275908 A1 | 10/2013 | Reichard |
| 2013/0281206 A1 * | 10/2013 | Lyons ................... G07F 17/323 |
| | | 463/33 |
| 2013/0281207 A1 * | 10/2013 | Lyons .................. G07F 17/3211 |
| | | 463/33 |
| 2013/0281208 A1 * | 10/2013 | Lyons ................... A63F 13/213 |
| | | 463/33 |
| 2013/0281209 A1 * | 10/2013 | Lyons ..................... A63F 13/53 |
| | | 463/33 |
| 2013/0290899 A1 | 10/2013 | Amran |
| 2014/0032849 A1 | 1/2014 | De Vleeschauwer et al. |
| 2014/0047064 A1 | 2/2014 | Maturana et al. |
| 2014/0047106 A1 | 2/2014 | Leung et al. |
| 2014/0047107 A1 | 2/2014 | Maturana et al. |
| 2014/0143395 A1 | 5/2014 | Geltner et al. |
| 2014/0207870 A1 | 7/2014 | Vaya |
| 2014/0240356 A1 | 8/2014 | Cupitt et al. |
| 2014/0244111 A1 * | 8/2014 | Gross ..................... B60R 21/00 |
| | | 701/1 |
| 2014/0250377 A1 | 9/2014 | Bisca et al. |
| 2014/0253588 A1 | 9/2014 | Mandala |
| 2014/0258940 A1 | 9/2014 | Han et al. |
| 2014/0282215 A1 | 9/2014 | Grubbs et al. |

(56) References Cited

U.S. PATENT DOCUMENTS

| | | | |
|---|---|---|---|
| 2014/0302915 A1* | 10/2014 | Lyons | G07F 17/3237 |
| | | | 463/25 |
| 2014/0316540 A1 | 10/2014 | Loncar et al. | |
| 2014/0324279 A1 | 10/2014 | Shinohara et al. | |
| 2014/0335480 A1 | 11/2014 | Asenjo et al. | |
| 2014/0336785 A1 | 11/2014 | Asenjo et al. | |
| 2014/0336786 A1 | 11/2014 | Asenjo et al. | |
| 2014/0358256 A1 | 12/2014 | Billi et al. | |
| 2015/0007043 A1 | 1/2015 | Steinmetz | |
| 2015/0077555 A1 | 3/2015 | Scalisi | |
| 2015/0146007 A1 | 5/2015 | Dusik et al. | |
| 2015/0154840 A1 | 6/2015 | Black et al. | |
| 2015/0169190 A1 | 6/2015 | Girardeau | |
| 2015/0213465 A1 | 7/2015 | Noyes et al. | |
| 2015/0248826 A1 | 9/2015 | Hahn et al. | |
| 2015/0277406 A1 | 10/2015 | Maturana et al. | |
| 2015/0281329 A1 | 10/2015 | Dimov | |
| 2015/0371455 A1 | 12/2015 | Abdel-Rahman et al. | |
| 2016/0103750 A1 | 4/2016 | Cooper et al. | |
| 2016/0127690 A1 | 5/2016 | Kaehler et al. | |
| 2016/0132538 A1 | 5/2016 | Bliss et al. | |
| 2016/0132595 A1 | 5/2016 | Bliss et al. | |
| 2016/0176724 A1 | 6/2016 | Ji et al. | |
| 2016/0196701 A1* | 7/2016 | Strother | G06Q 10/06 |
| | | | 701/29.3 |
| 2016/0217381 A1 | 7/2016 | Bloomquist et al. | |
| 2016/0226731 A1 | 8/2016 | Maroulis | |
| 2016/0267759 A1 | 9/2016 | Kerzner | |
| 2016/0272112 A1* | 9/2016 | DeGrazia | B60Q 9/00 |
| 2016/0274553 A1 | 9/2016 | Strohmenger et al. | |
| 2016/0282847 A1 | 9/2016 | Germann et al. | |
| 2016/0292895 A1 | 10/2016 | Billi et al. | |
| 2016/0300463 A1 | 10/2016 | Mahar et al. | |
| 2016/0321841 A1 | 11/2016 | Christen et al. | |
| 2016/0322078 A1 | 11/2016 | Bose et al. | |
| 2016/0337289 A1 | 11/2016 | Duca et al. | |
| 2016/0337441 A1 | 11/2016 | Bloomquist et al. | |
| 2016/0343163 A1 | 11/2016 | Venkatesha et al. | |
| 2016/0350595 A1 | 12/2016 | Solomin et al. | |
| 2017/0032574 A1 | 2/2017 | Sugaya | |
| 2017/0046877 A1 | 2/2017 | Hustad et al. | |
| 2017/0053445 A1 | 2/2017 | Chen et al. | |
| 2017/0060379 A1 | 3/2017 | Capozella et al. | |
| 2017/0091607 A1 | 3/2017 | Emeis et al. | |
| 2017/0108838 A1 | 4/2017 | Todeschini et al. | |
| 2017/0116259 A1 | 4/2017 | Elliot et al. | |
| 2017/0131711 A1 | 5/2017 | Thomson et al. | |
| 2017/0195265 A1 | 7/2017 | Billi et al. | |
| 2017/0210017 A1 | 7/2017 | Yamamoto et al. | |
| 2017/0213387 A1 | 7/2017 | Bean et al. | |
| 2017/0270362 A1 | 9/2017 | Bamehama et al. | |
| 2017/0270715 A1* | 9/2017 | Lindsay | G06T 7/70 |
| 2017/0300753 A1 | 10/2017 | Billi et al. | |
| 2017/0337352 A1 | 11/2017 | Williams | |
| 2017/0345219 A1 | 11/2017 | Holz | |
| 2018/0054432 A1 | 2/2018 | Bailey et al. | |
| 2018/0067558 A1* | 3/2018 | Eagleman | G10L 15/16 |
| 2018/0075759 A1 | 3/2018 | Kim et al. | |
| 2018/0222052 A1 | 8/2018 | Vu et al. | |
| 2018/0349654 A1 | 12/2018 | Takeshima et al. | |
| 2019/0122437 A1* | 4/2019 | Pinti | G06T 19/006 |
| 2019/0156584 A1 | 5/2019 | Herman et al. | |
| 2020/0035203 A1* | 1/2020 | Kosik | G06F 3/04815 |
| 2020/0126172 A1* | 4/2020 | Vanslette | G06Q 50/10 |
| 2021/0096975 A1* | 4/2021 | DeLuca | G06F 11/301 |
| 2021/0118342 A1* | 4/2021 | Chen | G06T 11/00 |

FOREIGN PATENT DOCUMENTS

| | | |
|---|---|---|
| CN | 105988367 A | 10/2016 |
| CN | 106383647 A | 2/2017 |
| EP | 1 814 045 A2 | 8/2007 |
| EP | 1 906 289 A1 | 4/2008 |
| EP | 2 077 473 A1 | 7/2009 |
| EP | 2 380 709 A2 | 10/2011 |
| EP | 2 592 812 A2 | 5/2013 |
| EP | 2 801 935 A1 | 11/2014 |
| EP | 2 927 854 A1 | 10/2015 |
| EP | 2 940 544 A1 | 11/2015 |
| EP | 2 942 717 A1 | 11/2015 |
| EP | 3 076 253 A1 | 3/2016 |
| EP | 3 018 597 A1 | 5/2016 |
| EP | 3 032 480 A1 | 6/2016 |
| EP | 3 037 901 A2 | 6/2016 |
| EP | 3 086 193 A1 | 10/2016 |
| JP | 2008-201101 A | 9/2008 |
| JP | 2016-010145 A | 1/2016 |
| WO | 2016/057386 A1 | 4/2016 |
| WO | 2018/040425 A1 | 3/2018 |

OTHER PUBLICATIONS

U.S. Appl. No. 15/807,247, filed Nov. 8, 2017.
Final Office Action received for U.S. Appl. No. 15/170,676 dated Aug. 14, 2019, 44 pages.
Non-Final Office Action received for U.S. Appl. No. 16/502,491 dated Aug. 22, 2019, 44 pages.
First Office Action received for Chinese Patent Application Serial No. 201710001412.0 dated Aug. 16, 2019, 14 pages.
Non-Final Office Action received for U.S. Appl. No. 15/718,856 dated Feb. 3, 2020, 37 pages.
Non-Final Office Action received for U.S. Appl. No. 15/807,247 dated Dec. 23, 2019, 68 pages.
Extended European Search Report received for European Patent Application Serial No. 19189864.2 dated Nov. 20, 2019, 7 pages.
Communication Pursuant to Rules 69 EPC received for EP Patent Application Serial No. 19189864.2, dated Jan. 2, 2020, 2 pages.
Communication Pursuant to Rules 69 EPC received for EP Patent Application Serial No. 17150085.3, dated Jul. 10, 2017, 2 pages.
Second Office Action received for Chinese Patent Application Serial No. 201710001412.0 dated Mar. 9, 2020, 14 pages.
Communication Pursuant to Article 94(3) EPC received for EP Patent Application No. 17178555.3 dated Apr. 9, 2020, 6 pages.
First Office Action received for Chinese Patent Application Serial No. 201711092322.3 dated Aug. 4, 2020, 26 pages.
First Office Action received for Chinese Patent Application Serial No. 201711095263.5 dated Jul. 2, 2020, 20 pages.
Notice of Allowance received for U.S. Appl. No. 15/807,247 dated Jul. 29, 2020, 25 pages.
Second Office Action received for Chinese Patent Application Serial No. 201711092322.3 dated Dec. 15, 2020, 39 pages.
Non-Final Office Action received for U.S. Appl. No. 16/915,152 dated Jun. 1, 2021, 72 pages.
Decision of Rejection received for Chinese Patent Application Serial No. 201711092322.3 dated Mar. 15, 2021, 14 pages.
Communication pursuant to Article 94(3) EPC received for European application No. 19189864.2 dated Apr. 29, 2021, 7 pages.
Non-Final Office Action received for U.S. Appl. No. 16/953,016 dated Jul. 20, 2021, 79 pages.
Extended European search report is received for European application No. 21168295.0 dated Jul. 16, 2021, 7 pages.
Communication pursuant to Article 94(3) EPC received for European application No. 18205904.8 dated Jul. 20, 2021, 10 pages.
Notice of Allowance received for U.S. Appl. No. 16/915,152 dated Oct. 22, 2021, 52 pages.
Notice of Allowance received for U.S. Appl. No. 16/953,016 dated Jan. 27, 2022, 32 pages.
Non-Final Office Action received for U.S. Appl. No. 16/915,194 dated Mar. 22, 2021, 54 pages.
Rockwell Automation, "Win-911 Software", The Power of Collaboration Working for you, PartnerNetwork Solutions from Rockwell Automation, Encompass Product Partner, Dec. 2013, 4 pages.
Extended European Search Report received for EP Patent Application Serial No. 16161305.4 dated Sep. 5, 2016, 10 pages.
Communication Pursuant to Rules 69 EPC received for EP Patent Application Serial No. 16161305.4, dated Oct. 10, 2016, 2 pages.

(56) References Cited

OTHER PUBLICATIONS

Extended European Search Report received for EP Patent Application Serial No. 16196582.7 dated Jan. 31, 2017, 9 pages.
Non-Final Office Action received for U.S. Appl. No. 14/675,129 dated May 4, 2017, 58 pages.
Extended European Search Report received for EP Patent Application Serial No. 17150085.3 dated May 10, 2017, 8 pages.
Communication Pursuant to Article 94(3) EPC received for EP Patent Application No. 16161305.4 dated Sep. 8, 2017, 7 pages.
Extended European Search Report received for EP Patent Application Serial No. 17178556.1 dated Aug. 23, 2017, 10 pages.
Extended European Search Report received for EP Patent Application Serial No. 17186540.5 dated Sep. 28, 2017, 8 pages.
Communication Pursuant to Rules 69 EPC received for EP Patent Application Serial No. 16196582.7 dated May 9, 2017, 2 pages.
Final Office Action received for U.S. Appl. No. 14/675,129 dated Dec. 1, 2017, 63 pages.
Non-Final Office Action received for U.S. Appl. No. 14/928,305 dated Dec. 22, 2017, 24 pages.
Non-Final Office Action received for U.S. Appl. No. 15/241,354 dated Jan. 24, 2018, 95 pages.
Youtube, Microsoft HoloLens demo onstage at BUILD 201, https://www.youtube.com/watch?v=3AADEqLIALk, Apr. 29, 2015, 2 pages.
Communication Pursuant to Rules 94(3) EPC received for EP Patent Application Serial No. 16196582.7, dated Feb. 14, 2018, 7 pages.
Communication Pursuant to Rules 94(3) EPC received for EP Patent Application Serial No. 17150085.3, dated Dec. 19, 2017, 5 pages.
Extended European Search Report received for EP Patent Application Serial No. 17178555.3 dated Jan. 8, 2018, 73 pages.
Extended European Search Report received for EP Patent Application Serial No. 17200391.5 dated Jan. 18, 2018, 7 pages.
Non-Final Office Action received for U.S. Appl. No. 15/391,213 dated May 9, 2018, 79 pages.
Communication pursuant to Rule 69 EPC received for EP Patent Application Serial No. 17186540.5 dated Apr. 4, 2018, 2 pages.
Communication pursuant to Rule 69 EPC received for EP Patent Application Serial No. 17178556.1 dated Feb. 26, 2018, 2 pages.
Communication pursuant to Rule 69 EPC received for EP Patent Application Serial No. 17178555.3 dated Feb. 26, 2018, 2 pages.
Extended European Search Report received for EP Patent Application Serial No. 17200575.3 dated Apr. 17, 2018, 8 pages.
Extended European Search Report received for EP Patent Application Serial No. 17200580.3 dated Apr. 17, 2018, 8 pages.
Non-Final Office Action received for U.S. Appl. No. 15/170,676, dated May 24, 2018, 163 pages.
First Office Action received for Chinese Patent Application Serial No. 201610187424.2 dated Mar. 9, 2018, 6 pages.
Communication pursuant to Rule 69 EPC received for EP Patent Application Serial No. 17200575.3 dated May 22, 2018, 2 pages.
Communication pursuant to Rule 69 EPC received for EP Patent Application Serial No. 17200580.3 dated May 22, 2018, 2 pages.
Non-Final Office Action received for U.S. Appl. No. 14/987,399 dated Jun. 1, 2018, 83 pages.
Final Office Action received for U.S. Appl. No. 14/928,305 dated Jun. 5, 2018, 16 pages.
Final Office Action received for U.S. Appl. No. 15/241,354, dated Jul. 11, 2018, 80 pages.
Non-Final Office Action received for U.S. Appl. No. 15/240,161, dated Jul. 27, 2018, 54 pages.
Final Office Action received for U.S. Appl. No. 15/391,213, dated Oct. 25, 2018, 67 pages.
Non-Final Office Action received for U.S. Appl. No. 14/928,305 dated Dec. 31, 2018, 19 pages.
Non-Final Office Action received for U.S. Appl. No. 15/391,260, dated Nov. 30, 2018, 78 pages.
Final Office Action received for U.S. Appl. No. 15/170,676, dated Dec. 26, 2018, 46 pages.
Non-Final Office Action received for U.S. Appl. No. 15/718,907, dated Dec. 14, 2018, 45 pages.
Second Office Action received for Chinese Patent Application Serial No. 201610187424.2 dated Sep. 4, 2018, 11 pages.
Non-Final Office Action received for U.S. Appl. No. 15/465,246, dated Jan. 24, 2019, 115 pages.
Communication pursuant to Rule 94(3) EPC received for EP Patent Application Serial No. 17186540.5 dated Feb. 21, 2019, 5 pages.
Non-Final Office Action received for U.S. Appl. No. 15/718,856 dated Mar. 5, 2019, 68 pages.
Final Office Action received for U.S. Appl. No. 15/718,856 dated May 24, 2019, 27 pages.
Non-Final Office Action received for U.S. Appl. No. 15/170,676 dated May 13, 2019, 36 pages.
Communication pursuant to Article 94(3) EPC received for EP Patent Application Serial No. 17200575.3 dated Apr. 5, 2019, 5 pages.
Extended European Search Report received for EP Patent Application Serial No. 18205904.8 dated Apr. 3, 2019, 11 pages.
Makris et al., "Augmented reality system for operator support in human-robot collaborative assembly", CIRP Annals—Manufacturing Technology, vol. 65, No. 1, May 12, 2016, pp. 1-4.
Communication Pursuant to Rule 69 EPC received for EP Patent Application Serial No. 18205904.8 dated May 20, 2019, 2 pages.
Final Office Action received for U.S. Appl. No. 15/391,260 dated Jun. 12, 2019, 56 pages.
Notice of Allowance received for U.S. Appl. No. 16/165,360 dated Jun. 11, 2019, 49 pages.

* cited by examiner

METHODS, SYSTEMS, APPARATUSES, AND TECHNIQUES FOR EMPLOYING AUGMENTED REALITY AND VIRTUAL REALITY

CROSS-REFERENCE TO RELATED APPLICATIONS

This application claims is a continuation of, and claims priority to each of, U.S. patent application Ser. No. 16/953,016, filed Nov. 19, 2020, and entitled "METHODS, SYSTEMS, APPARATUSES, AND TECHNIQUES FOR EMPLOYING AUGMENTED REALITY AND VIRTUAL REALITY," which is a continuation of, and claims priority to each of, U.S. patent application Ser. No. 15/807,247 (now U.S. Pat. No. 10,866,631), filed Nov. 8, 2017, and entitled "METHODS, SYSTEMS, APPARATUSES, AND TECHNIQUES FOR EMPLOYING AUGMENTED REALITY AND VIRTUAL REALITY," which claims priority to U.S. Provisional patent application Ser. No. 62/419,499, filed Nov. 9, 2016, and entitled "VIRTUAL REALITY/AUGMENTED REALITY DEVICE," the entireties of which applications are hereby incorporated by reference herein.

TECHNICAL FIELD

The subject application relates generally to methods, systems, apparatuses, and techniques for employing augmented reality and virtual reality.

BACKGROUND

The subject matter disclosed herein relates to virtual reality and augmented reality. Virtual reality is a computer-related technology that can use a device, such as a headset device, to simulate the presence of a user in a virtual multi-dimensional environment. Augmented reality can provide a view of a real multi-dimensional environment, wherein the view can be supplemented with other information regarding the real environment to augment the perception of the real environment by the user.

The above-described description is merely intended to provide a contextual overview relating to augmented reality and virtual reality, and is not intended to be exhaustive.

BRIEF DESCRIPTION

The following presents a simplified description in order to provide a basic understanding of some aspects described herein. This description is not an extensive overview nor is intended to identify key/critical elements or to delineate the scope of the various aspects described herein. Its sole purpose is to present some concepts in a simplified form as a prelude to the more detailed description that is presented later.

Disclosed is a device comprising a set of sensors configured to detect conditions associated with at least one of a user or an environment associated with the user, wherein the set of sensors generate sensor data in response to detection of the conditions. The system also comprises a memory that stores machine-executable components, a processor, operatively coupled to the memory, that executes machine-executable components. The machine-executable components can comprise an information management component configured to analyze the sensor data, determine a context associated with the user based on a result of the analysis of the sensor data, and determine customized information based on the context of the user, wherein the context relates to at least a location of the user. The system further can comprise an interface component configured to present the customized information to the user to facilitate performance of at least one task.

Also disclosed is a method comprising sensing, by a system comprising a processor, conditions associated with at least one of a user or an environment associated with the user, wherein sensor information is generated based on the sensing. The method also can include determining, by the system, a context associated with the user based on a result of analyzing the sensor information. The method further can comprise determining, by the system, customized data based on the context of the user, wherein the context relates to at least a location of the user in an area associated with the environment. The method also can comprise presenting, by the system, the customized information to the user to facilitate performance of at least one task.

The disclosed subject matter further comprises a system that can include a group of sensors configured to sense conditions associated with at least one of a user or an environment, wherein at least one sensor of the group of sensors generates sensor information in response to the sensing of the conditions. The device also can comprise a memory that stores machine-executable components, and a processor, operatively coupled to the memory, that executes machine-executable components. The machine-executable components can include an information management component configured to analyze the sensor information, determine a context associated with the user based on a result of the analysis of the sensor data, and generate customized data based on the context of the user, wherein the context relates to at least a location of the user with respect to the environment. The device further can comprise an interface component configured to present the customized data to the user to facilitate performance of at least one task.

To the accomplishment of the foregoing and related ends, certain illustrative aspects are described herein in connection with the following description and the annexed drawings. These aspects are indicative of various ways which can be practiced, all of which are intended to be covered herein. Other advantages and beneficial features may become apparent from the following detailed description when considered in conjunction with the drawings.

DETAILED DESCRIPTION

Figure 1:
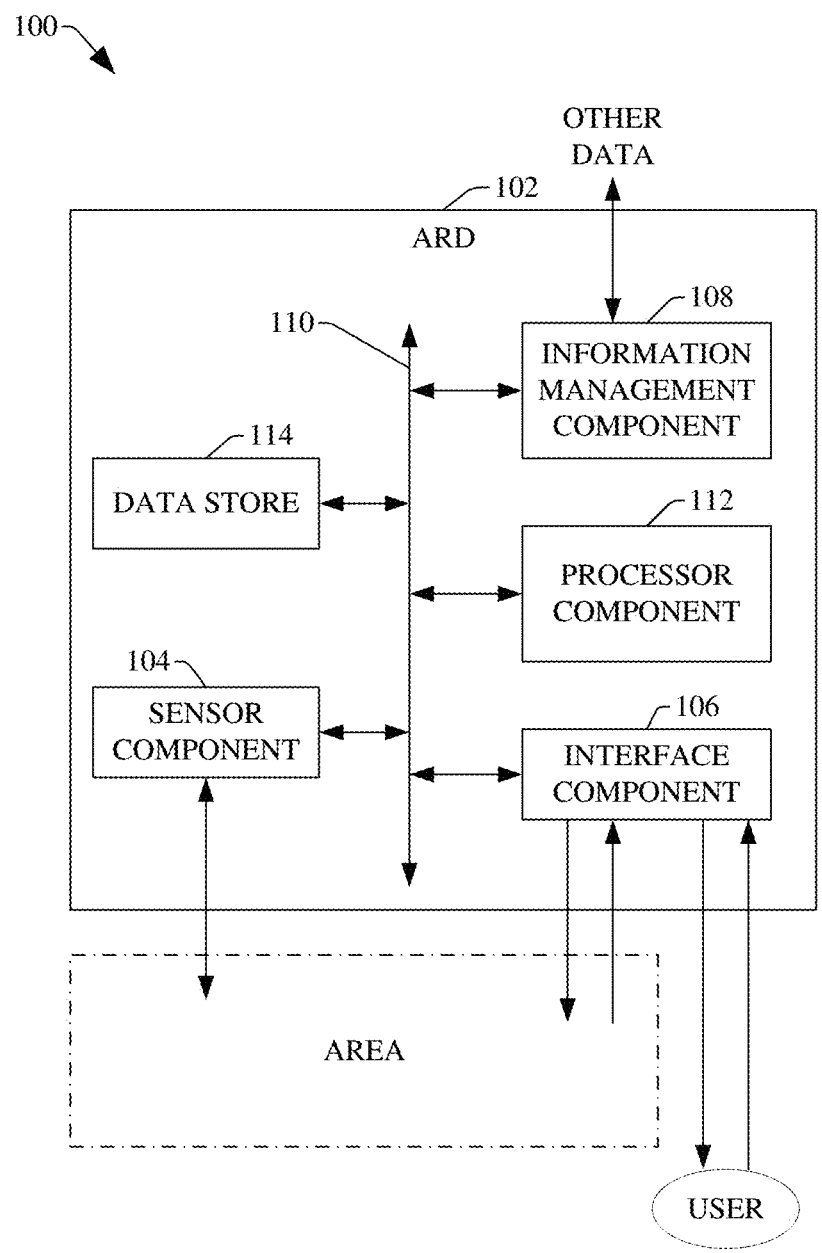
FIG. 1 illustrates a block diagram of an example system that can employ an augmented reality device (ARD) to facilitate performance and/or enhancement of various activities and tasks, in accordance with various embodiments and aspects of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the disclosed subject matter can be practiced without these specific details. In other instances, well-known structures and devices are shown in block diagram form in order to facilitate a description thereof.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

The subject matter disclosed herein relates to virtual reality and augmented reality. Virtual reality is a computer-related technology that can use a device, such as a headset device, to simulate the presence of a user in a virtual multi-dimensional environment. Augmented reality can provide a view of a real multi-dimensional environment, wherein the view can be supplemented with other information regarding the real environment to augment the perception of the real environment by the user.

In various types of situations, product assembly, maintenance work, industrial work (e.g., industrial automation system work), design and configuration of systems (e.g., industrial automation systems) or products, general life situations, or other situations, various issues can arise. For example, a user can be doing assembly work on a product, wherein various issues can arise, such as issues regarding having desired (e.g., suitable) information at a desired time to facilitate the performance of an assembly task, the use of an incorrect part during the assembly, the existence of a hazard associated with assembly of the product, and/or lack of knowledge or training of the user with respect to performing tasks associated with assembly of the product. As another example, there can be issues with regard to performing maintenance work or industrial work, such as, issues regarding having desired (e.g., suitable) information at a desired time to facilitate the performance of a maintenance task, the existence of a hazard in an area where the maintenance or industrial work is to be performed and/or with regard to the performing of the maintenance task or industrial work task, other safety-related issues (e.g., issue as to whether the user or another person has the experience, skills, and/or training to perform the task), lack of knowledge or training of the user with respect to performing tasks associated with maintenance or industrial work, and/or security-related issues (e.g., issue as to whether the user or another person is authorized to be in the area they are at and/or are they authorized to perform the task). As a further example, there can be issues with regard to designing or configuration of systems or products, such as issues regarding having desired (e.g., suitable) information at a desired time to facilitate the design and configuration of the system or product, issues regarding how to overcome certain design or configuration obstacles in connection with the design or configuration of the system or product, lack of knowledge or training of the user with respect to performing tasks associated with the design or configuration of the system or product, safety-related issues (e.g., issue as to whether the user or another person has the experience, skills, and/or training to perform tasks related to the design or configuration of the system or product), security-related issues (e.g., issue as to whether the user or another person is authorized to be in the area they are at and/or are they authorized to perform tasks related to the design or configuration of the system or product)

The disclosed subject matter can overcome these and other issues to enhance the user experience of the user, enhance the activities and/or productivity of the user, enhance the assembly of products, improve the performance of maintenance work, enhance the designing and configuration of systems or products, provide assistance and/or or training to the user regarding various tasks, enhance the life of the user with regard to general life situations, and/or enhance the safety and security of the user and/or other people, etc.

To that end, techniques for employing augmented reality or virtual reality information to a user are presented. An information management component (IMC) of an augmented reality device (ARD) can monitor and detect user activities and conditions in area in proximity to the ARD. Based on user activities and conditions, the IMC can determine augmented reality information that can enhance user experience, performance of user activities, or security and safety of user. The IMC can present, via an interface component of the ARD, the augmented reality information to the user. The augmented reality information can relate to, for example, user location; navigation by the user; tasks to be performed by the user; product assembly; maintenance work; system or product design or configuration; remote control of assembly, maintenance, design, or configuration; environmental and/or hazardous conditions; security, identification, and authentication of users; or training the user to perform tasks.

The IMC also can translate information from a language to a different language of the user and can facilitate presenting the translated language to the user via the interface component of the ARD. The IMC further can provide information (e.g., augmented reality information) regarding locales, people, etc., to the ARD user, and/or provide instruction regarding various subjects, can provide entertainment (e.g., music, movies, electronic games, . . . ) to the user, can notify the user when the user is impaired (e.g., sleepy, inebriated, . . . ), can provide reminders of events, appointments, or tasks, and/or can enable connection (e.g., communicative connection) with other people (e.g., family, friends, . . . ) or businesses.

These and other aspects and embodiments of the disclosed subject matter will now be described with respect to the drawings.

FIG. 1 illustrates a block diagram of an example system 100 that can employ an augmented reality device (ARD) to facilitate performance and/or enhancement of various activities and tasks, in accordance with various embodiments and aspects of the disclosed subject matter. The system 100 can comprise the ARD 102. While the ARD 102 is referenced as an augmented reality device, it is to be understood and appreciated that the ARD 102 also can employ virtual reality functions and features, in addition to augmented reality functions and features, as more fully described herein.

The ARD 102 can be, for example, an augmented reality, virtual reality headset that can be worn by a user. The ARD 102 can comprise and can utilize headset hardware, firmware, and software routines to facilitate performing various operations and tasks, such as disclosed herein. The headset can be or comprise, for example, electronic eyewear, electronic eyeglasses, electronic headwear, an electronic helmet or partial helmet, an electronic visor, electronic goggles, or other type of ARD that can be worn by a user.

The ARD 102 can comprise a sensor component 104 that can include a set of sensors that can sense or detect objects, people, conditions, events, or properties in an environment (e.g., in an area in proximity to a sensor). The sensor component 104 can comprise, for example, a global position system (GPS) sensor or device, an orientation sensor(s), inertial accelerometer(s), and/or other types of sensor(s), to sense the location, movement, orientation, and/or position of the ARD 102 and associated user and/or to sense the user interacting with or wearing the ARD 102. The sensor component 104 also can comprise one or more environmental sensors, such as, for example, a temperature sensor (e.g., which can include infrared (IR) temperature sensor), a humidity sensor, an air pressure sensor, a chemical sensor, and/or another sensor(s).

The ARD 102 also can comprise an interface component 106 that can provide a set of interfaces that can enable a user to interface or interact with the ARD 102. The interface component 106 can receive information (e.g., user input information) from the user via voice communication (e.g., voice command, search queries made by voice, input of data via voice, . . . ) of the user (e.g., via an audio sensor component, such as a microphone), via eye, facial, or body gestures (e.g., eye movement or focus, facial movement or expressions, hand or finger gestures, . . . ) of the user in relation to the interface component 106, and/or via manipulation, by the user, of keys on a keyboard or keypad, or other buttons or controls of the interface component 106. The interface component 106 also can include a display screen(s) that can present visual images (e.g., photographs, video), images from other parts of the electromagnetic spectrum (e.g. infrared (IR), ultraviolet (UV), microwave, or any other zone across the electromagnetic spectrum from radio waves to x-rays), textual information, and/or other information to the user, wherein such images or information can comprise augmented reality information and/or virtual reality generated and presented via the interface component 106 to facilitate augmenting the reality of the user with respect to the environment associated with the user, enhancing the user experience of the user, enhancing the activities and/or productivity of the user, providing assistance and/or or training to the user, and/or enhancing the safety and security of the user, etc.

The interface component 106 also can provide information and/or feedback, including haptic feedback, to the user who is interacting with or wearing the ARD 102. In some implementations, the haptic feedback can facilitate causing the ARD 102 to vibrate to provide an indication, alert, or notification to the user, which such indication, alert, or notification can, for example, indicate that data (e.g., a message) has been received or indicate that a hazardous condition is in proximity to the user.

The ARD further can include an information management component (IMC) 108 that can control operations of the ARD 102 and its various components (e.g., sensor component 104, interface component 106, . . . ), and can generate augmented reality information and/or other information (e.g., virtual reality information, user-related information, metadata,). For instance, the IMC 108 can analyze sensor information relating to conditions detected in an environment by the sensor component 104 and/or other data that can be obtained from one or more data sources, wherein the sensor component 104 can communicate the sensor information to the IMC 108. Based at least in part on the results of the analysis of the sensor information and/or the other data, the IMC 108 can determine and generate customized information, comprising augmented reality information and/ or virtual reality information, that can be useful and/or relevant (e.g., pertinent) to the user of the ARD 102, in accordance with defined information management criteria. The IMC 108 can present or facilitate presenting, via the interface component 106, the customized information to the user.

The IMC 108 can be associated with (e.g., communicatively connected to) the sensor component 104 and the interface component 106 via a bus component 110, which can provide one or more buses (e.g., system bus) that can couple (e.g., communicatively connect) various components of the ARD 102.

The ARD 102 also can comprise a processor component 112 that can operate in conjunction with the other components (e.g., sensor component 104, interface component 106, IMC 108, bus component 110, data store 114, . . . ) to facilitate performing the various functions and operations of the ARD 102. The processor component 112 can employ one or more processors (e.g., central processing units (CPUs), graphical processing units (GPUs), field-programmable gate arrays (FPGAs), etc.), microprocessors, or controllers that can process data, such as data relating to a user of the ARD 102, data relating to an environment in which the user and the ARD 102 are located, maintenance-related data, safety-related data, security-related data, design-related data (e.g., data relating to design of an industrial automation system, or data relating to design of a product), human-machine interface (HMI) design-related data, asset-related data (e.g., device data, process data, asset data, system data, etc.) associated with systems (e.g., industrial automation systems) or products, customer or client related data, data relating to parameters associated with systems or products, algorithms (e.g., algorithm(s) relating to recognizing or identifying respective industrial devices, industrial processes, industrial assets, network-related devices, interrelationships between such devices, processes, or assets), etc., to facilitate performing operations and tasks (e.g., in connection with an industrial automation system(s), or in connection with another type of environment); and can control data flow between the ARD 102 and other components or devices associated with the ARD 102.

In accordance with various aspects, the ARD 102 can include the data store 114. The data store 114 can store data structures (e.g., user data, metadata); code structure(s) (e.g., modules, objects, classes, procedures), commands, or instructions; data relating to a user of the ARD 102, data relating to an environment in which the user and the ARD 102 are located, maintenance-related data, safety-related data, security-related data, design-related data (e.g., data relating to design of an industrial automation system, or data relating to design of a product), HMI design-related data, asset-related data (e.g., device data, process data, asset data, system data, etc.) associated with systems (e.g., industrial automation systems) or products, customer or client related data, data relating to parameters associated with systems or products, algorithms (e.g., algorithm(s) relating to recognizing or identifying respective industrial devices, industrial processes, industrial assets, network-related devices, interrelationships between such devices, processes, or assets), and so on. The processor component 112 can be functionally coupled (e.g., through a memory bus of the bus component 110) to the data store 114 in order to store and retrieve data desired to operate and/or confer functionality, at least in part, to the sensor component 104, interface component 106, IMC 108, etc., of the ARD 102 and/or substantially any other operational aspects of the ARD 102.

It is to be appreciated and understood that the various components of the ARD 102 can communicate data, instructions, or signals between each other and/or between other components associated with the ARD 102 as desired to carry out operations of the ARD 102. It is to be further appreciated and understood that respective components (e.g., the sensor component 104, interface component 106, IMC 108, etc.) of the ARD 102 can be a stand-alone unit (e.g., attached or attachable to the ARD 102), can be included within the ARD 102 (as depicted), can be incorporated within another component of the ARD 102, can be a component separate from the ARD 102, and/or can be virtually any suitable combination thereof, as desired.

Figure 2:
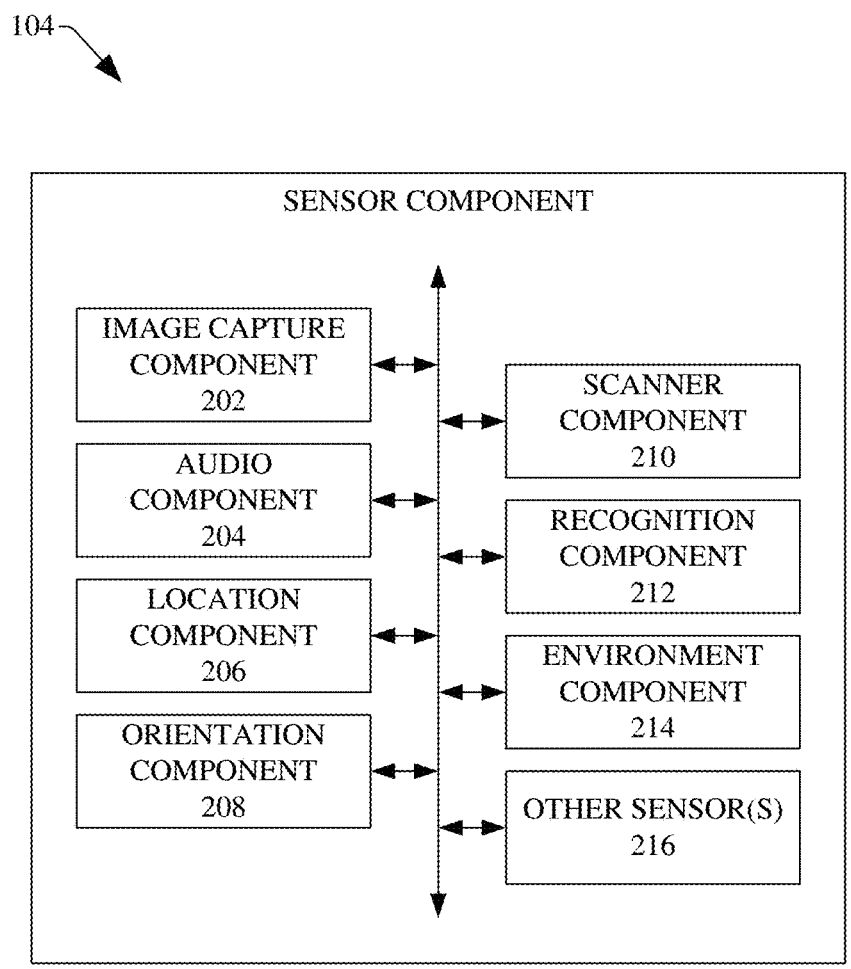
FIG. 2 depicts a block diagram of an example sensor component that can comprise a set of sensors that can be used in conjunction with the ARD, in accordance with various embodiments and aspects of the disclosed subject matter.

Referring to FIG. 2 (along with FIG. 1), FIG. 2 depicts a block diagram of an example sensor component 104 that can comprise a set of sensors that can be used in conjunction with the ARD 102, in accordance with various embodiments and aspects of the disclosed subject matter. The sensor component 104 can include an image capture component 202 (e.g., camera component) that can include one or more cameras that can be used capture visual images (e.g., photographs, video comprising video images) or images from other parts of the electromagnetic spectrum (e.g., IR, UV, microwave, or any other zone across the electromagnetic spectrum from radio waves to x-rays). The one or more cameras of the image capture component 202 can comprise one or more out-facing cameras that can have a camera lens(es) that is (or are) facing away from the user associated with (e.g., wearing) the ARD 102 and/or one or more user-facing cameras that can have a camera lens(es) that is (or are) facing towards the user associated with the ARD 102. The one or more out-facing cameras can capture images in the field of view of the user of the ARD 102 and/or images that are outside the field of view of the user of the ARD 102 (e.g., behind the user, or outside of the direct or peripheral view of the user). The one or more out-facing cameras also can capture images of gestures of the user (e.g., physical gestures employed by the user to generate commands or requests directed to the ARD 102), biometric information or features (e.g., fingerprint or handprint) of the user, bodily dimensions of the user (e.g., dimensions of hand or other body part of the user), movement-related features (e.g., walking gait) of the user, etc.

The one or more user-facing cameras (e.g., one or more inward-facing cameras) can capture images regarding the user, such as, for example, images of the facial expression of the user (e.g., to facilitate determining or identifying mood, impairedness, consciousness, or other characteristics or conditions of the user), facial or visual (e.g., eye) gestures of the user (e.g., employed by the user to initiate facially generated commands or requests directed to the ARD 102), images of the eye focus or line-of-sight of the user, and/or images of the biometric features (e.g., iris, retina, facial features or dimensions, . . . ) of the user. The images captured by the one or more cameras of the image capture component 202 can be multi-dimensional images (e.g., two-dimensional images, three-dimensional images).

The sensor component 104 also can comprise an audio sensor component 204 (e.g., microphone component) that can comprise one or more microphones or audio sensors that can receive or sense audio signals (e.g., voice of the user, voice of another user, or miscellaneous other types of sounds). For instance, the audio sensor component 204 can be employed to receive voice communications from the user of the ARD 102, wherein the voice communications can comprise commands or requests (e.g., request for additional augmented reality information) directed to the ARD 102, authentication information (e.g., voice characteristics, passcode, or answer to security question, . . . ) provided by the user, feedback information (e.g., observations, factual information, or parameters of conditions of an area, system, product, part, asset, or process made by the user) directed to the ARD 102, and/or information the user desires to be stored by the ARD 102. The audio sensor component 204 also can sense sounds in the environment, wherein the sounds can indicate the occurrence of an event or a hazard (e.g., gun shots, explosion, accident (e.g., vehicle accident), mechanical problem, . . . )

The sensor component 104 can include a location component 206 that can employ one or more location sensors to sense or determine the location of the ARD 102 and associated user and/or sense or determine the respective locations of respective objects (e.g., people, furniture, buildings, structures, appliances, machines, devices, trees, plants, hills, signs, poles, wires, . . . ) in an environment (e.g., in an area), including sensing the relative location of respective objects and/or the user to each other. The location component 206 can comprise, for example, a GPS system or device, an accelerometer, a gyroscope, and/or another component that can determine the respective locations of the ARD 102, the user, and/or other objects.

The sensor component 104 can comprise an orientation component 208 that can sense, determine, and/or measure the orientation of the ARD 102, and accordingly the orientation of the user associated with (e.g., wearing) the ARD 102, relative to the environment. The orientation component 208 can comprise one or more accelerometers, gyroscopes, inertial measurement unit (IMU) devices, and/or other sensors that can sense, determine, and/or measure the acceleration, position, motion, and/or orientation of the ARD 102 relative to the environment. The accelerometer can be, for example, a single axis or a multi-axes (e.g., two-axes or three-axes) accelerometer that can sense, determine, and/or measure acceleration along one, two, or three axes, wherein such accelerometer data can be used to determine or measure orientation and motion of the ARD 102. As another example, the gyroscope can be a single axis or a multi-axes (e.g., two-axes or three-axes) gyroscope that can sense or measure rotation along one, two, or three axes, wherein such gyroscope data can be used to determine or measure orientation and/or motion of the ARD 102. An IMU device can employ one or more sensors, such as an accelerometer(s), a gyroscope(s), and/or a magnetometer(s).

The sensor component 104 further can include a scanner component 210 that can scan objects or images to facilitate identifying objects or information associated with objects or images. The scanner component 210 can comprise a radio frequency identification (RFID) reader that can scan RFID tags associated with the user, other entities, or objects (e.g., product parts, industrial assets, . . . ) in proximity to the RFID reader to obtain identification information from the RFID tags to facilitate identifying the user, other entities, or objects. The scanner component 210 also can include a bar code reader that can read bar code information contained in bar codes associated with objects (e.g., product parts, industrial assets, . . . ) or entities to facilitate identifying the objects or entities.

The sensor component 104 also can comprise a recognition component 212 that can employ one or more recognition techniques to sense characteristics, features, or conditions of entities or objects to facilitate recognizing or identifying entities or objects. The recognition techniques that can be utilized by the recognition component 212 can include, for example, pattern recognition, object recognition, facial recognition, voice recognition, audio recognition, image recognition, spatial relationship recognition, animal recognition, pose recognition, action recognition, shape recognition, scene recognition, behavior recognition, sound recognition, scent recognition, motion recognition, hue recognition, feature recognition, edge recognition, texture recognition, timing recognition, location recognition, and/or any other suitable recognition technique) to facilitate determining characteristics, features, or conditions of the entities or objects, and recognizing or identifying the entities or objects based at least in part on the sensed characteristics, features, or conditions of entities or objects.

The sensor component 104 can comprise an environment component 214 that can employ one or more sensors to sense various conditions or characteristics of an environment in proximity to or otherwise associated with the ARD 102. The one or more sensors (e.g., environment sensors) can include, for example, a temperature sensor (e.g., IR sensor, thermal imaging sensor, semiconductor-based temperature sensor, resistance temperature detector (RTD),), a humidity sensor, a barometer, an altimeter, a chemical sensor, a radiation sensor, a biohazard sensor, a smoke detector, an electromagnetic field sensor, a scent sensor, a pressure sensor, a moisture sensor, and/or a light sensor.

The temperature sensor can detect or measure a temperature level of an object (e.g., outside of object, inside of object) or area. The humidity sensor can detect, measure, determine, or facilitate determining the humidity level of the environment in proximity to the ARD 102 (e.g., in proximity to the humidity sensor of the ARD 102). The barometer can sense, measure, determine, or facilitate determining the air pressure level of the environment in proximity to the ARD 102 (e.g., in proximity to the barometer of the ARD 102). The altimeter can detect, measure, and/or determine an altitude of the ARD 102 or an object in proximity to the ARD 102.

The chemical sensor can detect, measure, and/or facilitate identifying chemical elements or information in the environment in proximity to the ARD 102. The radiation sensor can detect, measure, and/or facilitate identifying radiation, including an amount or a type of radiation, in the environment in proximity to the flow management light (e.g., in proximity to the radiation sensor of the flow management light). The biohazard sensor can detect, measure, and/or facilitate identifying a biohazardous condition in the environment (e.g., in the air of the environment or emitted by an object(s) in the environment) in proximity to the biohazard sensor of the ARD 102. The smoke detector can detect smoke or other air impurities, or measure smoke or other air impurities, in the environment in proximity to the smoke detector of the ARD 102. The electromagnetic field sensor can sense or measure electromagnetic fields in the environment in proximity to the ARD 102 (e.g., in proximity to the electromagnetic field sensor of the ARD 102). The scent sensor can sense and/or facilitate identifying scents in the environment (e.g., in the air of the environment or emitted by an object(s) in the environment) in proximity to the scent sensor of the ARD 102.

The pressure sensor can detect or measure pressure (e.g., an amount of pressure) in the environment in proximity to the pressure sensor of the ARD 102. The moisture sensor can detect an amount of moisture in the environment (e.g., in the air of the environment or emitted by an object(s) in the environment) in proximity to the moisture sensor of the ARD 102. The light sensor can detect or measure light or an amount of light in proximity to the light sensor of the ARD 102.

The sensor component 104 further can comprise one or more other sensors 216 that can monitor and detect various characteristics, features, and/or conditions related to entities or objects to facilitate determining various characteristics, features, conditions, qualities, etc., of the entities or objects. Such other sensors can include, for example, a motion sensor, a radar sensor, an ultrasound imaging sensor or device, a light detection and ranging (LIDAR) sensor, a sound navigation and ranging (SONAR) sensor, or a microwave sensor.

The motion sensor can sense movement and/or direction of movement of an object(s) or entity(ies) in proximity and relation to the motion sensor of the ARD 102. The radar sensor can employ radar technology (e.g., Doppler radar) to facilitate detecting an object(s) or entity(ies), including detecting the location and/or movement of an object(s) or entity(ies), in proximity to the radar sensor of the ARD 102. The ultrasound imaging sensor can employ ultrasound technology to detect features of or objects or entities in an area in proximity to the ultrasound imaging sensor of the ARD 102, and can facilitate generating images (e.g., ultrasound images) that can represent the features of or objects or entities in the area in proximity to the ARD 102. The LIDAR sensor can employ a laser light (e.g., a pulsed laser light) to detect features of or objects or entities in the area in proximity to the LIDAR sensor of the ARD 102, and can facilitate generating images (e.g., LIDAR images) that can represent the features of or objects or entities in the area in proximity to the ARD 102. The SONAR sensor can employ ultrasound technology to detect features of or objects or entities in the area in proximity to the ARD 102, and the distance between the features or objects or entities and the ARD 102, and can facilitate generating of images (e.g., SONAR images) that can represent the features of or objects or entities in the area in proximity to the SONAR sensor of the ARD 102. The microwave sensor can employ microwaves to facilitate detecting objects or or entities, including the movement of objects entities, in the area in proximity to the microwave sensor of the ARD 102.

Figure 3:
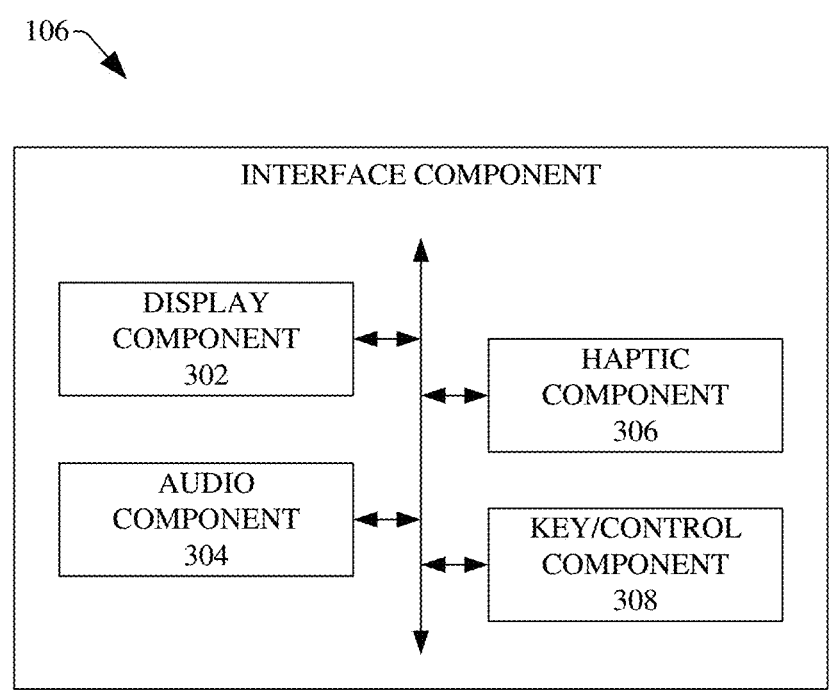
FIG. 3 illustrates a block diagram of an example interface component that can comprise a set of interfaces that can be used in conjunction with the ARD, in accordance with various embodiments and aspects of the disclosed subject matter.

Turning to FIG. 3 (along with FIG. 1), FIG. 3 illustrates a block diagram of an example interface component 106 that can comprise a set of interfaces that can be used in conjunction with the ARD 102, in accordance with various embodiments and aspects of the disclosed subject matter. The interface component 106 can comprise a display component 302, an audio component 304, a haptic component 306, and a key/control component 308 (e.g., keyboard, keypad, and/or control buttons). The interface component 106, including its various components (e.g., 302, 304, 306, 308) can be associated with (e.g., communicatively connected to) the IMC 108.

The display component 302 can comprise or generate one or more display screens of desired size and shape that can be situated or presented in the field of view of the user of the ARD 102 (e.g., situated or presented on or near the lens or lenses of the ARD 102). The one or more display screens of the display component 302 can present data, such as customized data (e.g., augmented reality information), which can be data that is automatically or dynamically generated by the IMC 108 and/or communicated to the display component 302 by the IMC 108, and/or which can be data requested by the user. The IMC 108 can determine (e.g., automatically and/or dynamically determine) a location(s) on a display screen of the display component 302 where the data is to be presented (e.g., displayed), based at least in part on the defined information management criteria.

The audio component 304 can comprise audio generation and/or presentation mechanisms to facilitate generating, amplifying, and/or emitting sounds (e.g., voices, music, audio alerts or notifications, . . . ) from the audio component 304. For instance, the audio component 304 can comprise one or more amplifiers that can amplify audio signals to achieve a desired volume level, one or more speakers that can emit the sounds (e.g., processed or amplified sounds), and/or sound processing mechanisms or devices (e.g., digital signal processor, analog-to-digital converter, digital-to-analog converter, encoder, decoder, sound equalizer, . . . ) that can process audio signals to generate processed audio signals. In some implementations, the audio component 304 also can be associated with or can include the audio sensor component (e.g., microphone(s)) of the sensor component 104 to receive sounds (e.g., voice commands or other speech or sounds) from the user or other sounds audible in the area where the audio component 304 is located. The audio component 304 can receive audio information (e.g., data (e.g., augmented reality data), alerts, notifications, indicators, etc., in audio form) from the IMC 108 for presentation to the user.

The haptic component 306 (e.g., feedback component) can provide feedback, including haptic feedback, to the user who is interacting with or wearing the ARD 102. The haptic feedback can comprise haptic information, communications, or signaling in any of its various forms. In some implementations, the haptic component 306 can be or can comprise a vibration component that can cause the haptic component 306 or other part of the ARD 102 to vibrate to provide an indication, alert, or notification to the user (e.g., relating to an issue or data). Additionally or alternatively, the haptic component 306 can employ one or more other types of haptic feedback (e.g., haptic communications or signaling). For example, the haptic component 306 can apply forces or motion to the user to provide a tactile sensation(s) to the user, which can facilitate providing an indicator, alert, or notification to the user. Some examples of other types of haptic feedback can comprise, for instance, feedback that can be, or can simulate, a brush on the skin of the user, a waft of air that can be perceived or felt by the user, a sensation of heat or cold on the skin of the user (e.g., in connection with a hazard relating to hot or cold temperatures). The haptic component 306 can communicate respective (e.g., different) types of feedback (e.g., respective types of vibrations or other haptic feedback) for respective types of indications, alerts, or notifications.

For example, the haptic component 306 can communicate a first type of feedback (e.g., a first type of vibration, or other first type of haptic feedback, of the haptic component 306) that can alert the user to a hazardous condition of which the user is to be made aware (e.g., because the user is in proximity to the hazardous condition, or so the user can take an action responsive to the hazardous condition). As another example, the haptic component 306 can communicate a second type of feedback (e.g., a second type of vibration, or other second type of haptic feedback, of the haptic component 306) that can notify the user that a message (e.g., an email message, a text, instant, or multimedia message, or a social media message) to the user has been received (e.g., because the user is in proximity to the hazardous condition, or so the user can take an action responsive to the hazardous condition). As still another example, the haptic component 306 can communicate a third type of feedback (e.g., a third type of vibration, or other third type of haptic feedback, of the haptic component 306) that can notify or alert the user that an event has occurred. The haptic component 306 can communicate other types of feedback (e.g., other types of vibratory signals, and/or other types of haptic feedback signals besides vibratory signals) to the user with regard to other types of indications, alerts, or notifications. As some examples involving vibratory signals, the types of vibrational feedback can comprise, for example, a single vibration, two distinct vibrations in succession, three distinct vibrations in succession, a single long vibration, a single short vibration that can be shorter in duration than the single long vibration, a combination of short vibration(s) and long vibration(s), or any desired variation thereof.

The key/control component 308 can comprise a keyboard (e.g., a keyboard having keys representing alphanumeric characters, symbols, or functions), a keypad (e.g., a keypad having keys representing alphanumeric characters, symbols, or functions), and/or one or more control buttons that can represent respective controls, functions, alpha numeric characters, or symbols. In some implementations, the keyboard, keypad, or control buttons can be part of a unit that can be held or accessed by the user to facilitate selection of the keys or control buttons by the user, wherein the unit can be connected via a wireline or wireless connection to the IMC 108, processor component 112, and/or other components of the ARD 102. In other implementations, keyboard, keypad, or control buttons can be displayed on a display screen of the display component 302, wherein keys or control buttons can be selected via visual cues (e.g., eye movements), audio cues (e.g., spoken word), gestures, or another type of action(s) of the user of the ARD 102. In still other implementations, the image capture component 202 of the sensor component 104 can capture gestures (e.g., eye gestures, hand gestures, ...) of the user to facilitate selecting keys or control buttons, wherein the image capture component 202 can interact with the key/control component 308 and/or another component(s) to facilitate converting the gestures into selection of keys or control buttons.

It is to be appreciated and understood that the image capture component 202, the audio sensor component 204, and/or one or more other sensors of the sensor component 104 also can be part of the interface component 106.

With further regard to FIG. 1 (along with FIGS. 2 and 3), the IMC 108 of the ARD 102 can analyze and process various inputs of information (e.g., sensor information, information from other data sources), such as, for example, data relating to location, movement, or orientation of the user or the ARD 102, object recognition of objects within the field of view of the user or the ARD 102, data input received or obtained from the user by the ARD 102 (e.g., via the sensor component 104 or the interface component 106). Based at least in part on the results of the analysis and processing of the various inputs of information, the IMC 108 can generate and present (e.g., display or overlay) customized information (e.g., augmented reality information and/or virtual reality information) that can be relevant (e.g., pertinent) and useful to the user while the user is performing tasks (e.g., tasks relating to an industrial automation system or relating to another type of system or environment). Such customized information can be presented to the user via the interface component 106 (e.g., a display screen(s) of the display component 302, audio component 304, and/or haptic component 306. Such customized information can comprise, for example, photographs, video, computer aided design or drafting (CAD) objects, tags, dials, alerts, and/or notifications, etc., that can be relevant or useful to the user in connection with the tasks (e.g., work tasks) or activities the user is engaging in or is preparing to engage in and/or the environment the user is in or a remote environment with which the user is interacting.

In some implementations, with the user (e.g., operator) interacting with or wearing the ARD 102, the ARD 102 can assist the user in a number of ways, such as disclosed herein, to improve the speed of the user and of the speed of assembly or production of products, the quality of assembly or production of products, the security of assembly and production of products, and the safety of the user and the environment in the performance of tasks relating to assembly of products by the user. The ARD 102 can advise or instruct the user through visual signals (e.g., via the display component 302), audible signals (e.g., via the audio component 304), and/or haptic feedback (e.g., via the haptic component 306) to facilitate enhancing the assembly process (e.g., enhancing, the speed, quality, security, and safety associated with the assembly process).

In some implementations, the disclosed subject matter, by employing the features of the ARD 102, can capture enhancements to tasks or activities and provide assistance in the performance of tasks or activities (e.g., work tasks or activities, leisure activities, ...) in areas, such as, for example, 1) remote control, 2) route selection, and 3) life coach, butler, or tour guide.

The ARD 102 can employ methods, techniques, features, and activities to solve problems relating to remote control, route selection, and life coach, butler, or tour guide. For instance, the ARD 102 can employ the sensor component 104 to sense location, orientation, and/or motion related information associated with the ARD 102. Based at least in part on the results of analyzing the sensor information relating to location, orientation, and/or motion of the ARD 102, the IMC 108 can determine or resolve the location, orientation, and/or motion (e.g., movement) of the ARD 102 with respect to an assembly. The sensor component 104 also can sense conditions (e.g., environmental conditions) associated with the environment where the user and associated ARD 102 are located. The IMC 108 can analyze the sensor information relating to the conditions associated with the environment. Based at least in part on the results of analyzing the sensor information relating to the conditions of the environment, and/or the location, orientation, and/or motion of the ARD 102, the IMC 108 can determine customized data (e.g., augmented reality information and/or virtual reality information) that can be relevant (e.g., pertinent) and useful to the user. The IMC 108, via the display component 302, can present (e.g., overlay) the customized data on the display screen(s) of the display component 302 of the ARD 102. The customized data can comprise augmented reality information (e.g., real time information relating to the environmental conditions) and/or virtual reality information (e.g., virtual view objects that can represent objects associated with the environment). The ARD 102 also can work with other networks and/or systems (e.g., industrial, commercial and corporate computer networks and/or systems) as well as databases and servers to exchange data and/or process the tasks (e.g., assembly tasks) that are done to accomplish the described goal or solution (e.g., assemble a product).

There can be instances when there can be some danger or at least potential danger in a user physically going to a cabinet (or other object or device) to perform a task (e.g., adjusting a bit or control (e.g., toggling or forcing a bit or control)) on a component of the cabinet. The disclosed subject matter can overcome these and other issues by employing various techniques and features, as described herein.

With regard to some of the remote control features of the disclosed subject matter, the user can employ the ARD 102 to perform (e.g., remotely perform) tasks (e.g., adjusting a bit or control) on a component of the cabinet from a safer, remote distance from the cabinet, instead of the user physically being by the cabinet to perform the tasks on the component of the cabinet. That is, using the ARD 102 to perform the tasks on the component of the cabinet, the user can be a desired distance away (e.g., 10 feet away, 10,000 km, . . . ) away from the cabinet when performing the tasks (e.g., using the ARD 102) in connection with the cabinet. For example, the user can use the ARD 102 to communicate with the component (or an associated component) of the cabinet via a wireline or wireless communication connection. The ARD 102 can receive information relating to settings (e.g., bit or control settings) of the component of the cabinet from the cabinet. The IMC 108 can instruct the interface component 106 (e.g., display component 302) to present the information relating to the settings of the component to the user (e.g., on a display screen). The IMC 108 also can facilitate presenting (e.g., via the display screen of the display component 302) virtual settings (e.g., virtual bits or controls) for the user to view. The user can decide to perform a task to adjust the settings. In that regard, the user can employ keys, buttons, or controls on the interface component 106 (e.g., key/control component 308 of the interface component 106) and/or voice commands (e.g., via the interface component 106) to adjust the settings (e.g., by adjusting the virtual bits or controls) of the component of the cabinet from a location at a remote or safe distance from the cabinet. The settings of the component of the cabinet can be adjusted accordingly, in response to the adjustment to the settings of the component performed by the user using the ARD 102.

In some implementations, the IMC 108 can generate and facilitate presenting, via a display screen of the interface component 106, an HMI (e.g., a virtual HMI), or the ARD 102 can be associated with (e.g., communicatively connected to) an HMI that can be presented to the user via the ARD 102. The HMI can be virtual and can be used (e.g., manipulated) by the user, using the IMC 108 and interface component 106 of the ARD 102, to control assets (e.g., devices, machines, processes, . . . ) from a suitable (e.g., safe) distance away from the assets.

With regard to other aspects of remote control using the ARD 102, the user can use the ARD 102 to facilitate performing assembly, maintenance, and/or design, deployment, and/or configuration tasks by controlling a robot (e.g., robotic device) remotely via the ARD 102. For example, the user can use the ARD 102 (e.g., the IMC 108 and/or other components of the ARD 102) to control operation of a drone to carry a robotic device (e.g., an anthropomorphic robot) to a remote (e.g. a supervisory control and data acquisition (SCADA)) location or a dangerous location (e.g., a location of an oil pump). The user also can use the ARD 102 (e.g., the IMC 108 and/or other components of the ARD 102) to control the robotic device virtually, e.g., via gestures or commands of the user that are received by the interface component 106 and/or sensor component 104 of the ARD 102 from the user. The procedures employed by the ARD 102 and/or robotic device for performing the tasks by the ARD 102 and/or robotic device can either be live or can be previously developed at a more local or on premises installation.

With regard to route selection for travel by a user, the ARD 102 can enhance route selection associated with the user (e.g., route selection (e.g., smarter GPS, or foot traffic version of driverless cars)). The ARD 102 can utilize GPS, maps, and/or object recognition to guide the user as the user walks to the destination. Also, the ARD 102, employing the sensor component 104 and IMC 108, can detect, identify, and use information (e.g., visible, perceived, or sensed) information about hazards (e.g., heat, voltage, moving machines, precipices, . . . ) in databases and in real-time to enable the user to efficiently and safely stay on a desirable track to the destination. The ARD 102, employing the interface component 106 and IMC 108, also can generate and present alerts or notification messages to warn the user about these hazards, stairs, and/or other moving objects or people while the user travels en route to the destination.

For instance, the user can instruct the ARD 102 regarding a destination where user wants to go. The ARD 102 can use sensors (e.g., location sensor, orientation sensor, motion sensor, GPS, and/or object sensors, . . . ) of the sensor component 104 and/or other data sources (e.g., map or travel data sources) to determine the origination location of the user, determine the destination location of the user, determine objects, obstacles, and/or hazards in the area between the origination location and destination location, and/or determine other relevant information in connection with the travel by the user. Based at least in part on the results of analyzing the travel instructions (e.g., origination location, destination location) received from the user, the sensor information received from the sensor component 104, and/or other travel-related data (e.g., map or travel related data) received from the other data sources, the IMC 108 can determine a desired (e.g., suitable, acceptable, enhanced, or optimal) travel route for the user to travel and can provide instructions to the user, via the interface component 106, to guide the user from the origination location to the destination location in a safe, secure, and efficient manner. The guidance regarding the travel route the ARD 102 provides to the user can be visual guidance (e.g., visual display of the directions along the travel route, including streets or landmarks along or associated with the travel route, and/or textual travel directions), verbal guidance (e.g., an audio presentation of the directions along the travel route, and/or haptic feedback (e.g., a haptic indicator to indicate a user is to make a change of direction; another haptic indicator to indicate that a user has missed a change of direction; or still another haptic indicator to indicate that the travel route has been changed or updated). The ARD 102, via the interface component 106, can provide such guidance regarding the travel route on a continuous, periodic, or event-occurrence basis as the user proceeds along the travel route.

As part of determining the travel route between the origination location and the destination location and/or advising or guiding the user as the user proceeds along the travel route, the IMC 108 can detect, determine, and/or identify objects, obstacles, and/or hazards (or potential hazards) in the area between the origination location and destination location based at least in part on the sensor information and/or other travel-related information obtained from the other data sources. The IMC 108 can determine, customize, and/or tailor the travel route based at least in part on the objects, obstacles, and/or hazards (or potential hazards) in the area between the origination location and destination location, including structuring the travel route to avoid or at least substantially avoid (e.g., mitigate, reduce, minimize, or eliminate) obstacles, and/or hazards (or potential hazards) along the path the user travels and/or to warn (e.g., via a visual, audio, and/or haptic warning indicator(s)) the user of any obstacles and/or hazards (or potential hazards) the user may face while traveling along the determined travel route.

If the travel route includes any objects, obstacles, and/or hazards (or potential hazards), the IMC 108 can facilitate presenting, via the interface component 106 (e.g., on the display screen) of the ARD 102, an indicator or notification of, and/or can highlight, the object, obstacle, or hazard to warn or notify the user of such object, obstacle, or hazard before, but when the user is in proximity to, such object, obstacle, or hazard.

As the user travels along the travel route, the sensor component 104 can continue to collect additional sensor information, and/or the other data sources can continue to collect additional travel-related information, and the IMC 108 can, continuously, periodically, and/or on an event-occurrence basis, analyze the additional sensor information and/or the additional travel-related information. Based at least in part on the results of the analysis of the additional sensor information and/or the additional travel-related information, the IMC 108 can determine whether the user is still on course on the travel route, whether the travel route is to be changed, whether a new obstacle or new hazard (or new potential hazard) has appeared along the travel route, whether an indicator or notification (or highlighting) is to be presented to the user, via the interface component 106, to warn or notify the user of an object, obstacle, or hazard associated with the travel route.

For example, as the user travels along the travel route, the sensor component 104 can detect when a newly occurring or newly recognized hazard or obstacle (e.g., a "Don't Walk" sign, stairs, moving people or objects, . . . ) occurs. The IMC 108 can analyze the sensor data from the sensor component 104 and can determine an indicator, notification, and/or highlighting to present to the user and/or an adjustment to the travel route to present to the user, via the interface component 106.

Employing these and other aspects of the ARD 102, the ARD 102 also has the capability to be used by blind and visually impaired people (e.g. firefighters or other emergency responders in a dark or smoky building) to enhance their performance of tasks, and enhance their safety and security. The ARD 102, employing the sensor component 104 and/or information obtained from another data source, can monitor and detect natural hazards, such as, for example, streams, avalanche, cliff, holes in the ground, uneven or rocky surfaces, trees, or plants. The ARD 102, employing the sensor component 104 and/or information obtained from another data source, also can monitor, detect, and/or identify other hazards or obstacles, such as, for example, open or closed doors (e.g. subway doors, building doors, . . . ), people approaching a door (including on the other side of a glass door), traffic signals such as "walk/don't walk" or traffic lights (e.g., green light, red light), curbs, hostile people with weapons, stairs, wires (e.g., downed electrical wires, hanging wires, cable wires), walls, doors, furniture, barriers, machines, devices, assets (e.g., industrial assets), appliances, buildings, structures, building fixtures, lighting fixtures, railings, rails, logs, tracks, ditches, wells, fences, hills, vehicles, etc. The sensors of the sensor component 104 can employ object recognition techniques, edge detection techniques, or other recognition techniques to facilitate detecting and determining shapes of objects (e.g., persons, entities, obstacles, hazards, barriers, . . . ), dimensions of objects, and/or other features of objects.

The IMC 108 can determine an appropriate indicator, notification, and/or highlighting to use to notify or warn the blind or visually impaired user of such hazards or obstacles. For instance, the IMC 108 can determine that an audio message and/or haptic feedback can be presented, via the interface component 106, to the user to notify or warn the user of the hazard or obstacle, to provide information regarding the hazard or obstacle (e.g., curb is 8 feet (or three steps) in front of you, street intersection is 20 feet ahead, pedestrian signal is 10 feet ahead and has changed from "walk" to "don't walk"), and/or to alter the travel route of the user.

Additionally or alternatively, with regard to a user (e.g. firefighters or other emergency responders in a dark or smoky building) whose vision has been impaired by a hazard, the IMC 108 can determine other customized information (e.g., augmented reality information and/or virtual reality information) that can be presented, via the interface component 106 (e.g., via a display screen), to the user. For example, the IMC 108 can determine that a heat map indicating hot spots in the environment (e.g., areas of a building with higher temperatures), and information (e.g., virtual objects representing actual objects) indicating objects in the environment, can enhance the performance of tasks, and enhance the safety, of the user. The IMC 108 can generate a heat map of the environment based at least in part on sensor data of the environment from the sensor component 104. The IMC 108 also can generate virtual objects that can represent actual objects and their relative placement (e.g., position) in the environment (e.g., in a room of the building). The IMC 108 can facilitate presenting, via the display screen of the interface component 106, the heat map and the visual information relating to virtual objects in the environment to the user (e.g., visually impaired user) to enhance the user's visual perception of the environment, enhance the performance of tasks by the user, and/or enhance the safety and security of the user.

The ARD 102 also can supplement or enhance information for a user who is deaf and otherwise audibly impaired by translating key sounds into visual information that can be perceived by the user. For instance, the sensor component 104 of the ARD 102 can monitor, detect, and/or identify people yelling, instructions being given by people, approaching vehicles, alarms, audible announcements, etc. The IMC can analyze the sensor data relating to people yelling, instructions being given by people, approaching vehicles, alarms, audible announcements, etc., and can translate the audio signals relating to those events into visual signals or information that can be perceived by the user via the display screen of the interface component 106.

In some implementations, the ARD 102 also can translate language for foreigners. For example, the IMC 108 of the ARD 102 can translate spoken information (e.g., sensed via the sensor component 104) into visual, translated text or audible, translated text. The sensor component 104 also can sense written signs, menus, and/or cues. Based at least in part on the results of analyzing sensor data relating to the written signs, menus, and/or cues, the IMC 108 can translate the written signs, menus, and/or cues into corresponding textual information and/or audio signals. The IMC 108 can facilitate presenting, via the display screen and/or speakers of the interface component 106, the translated text and/or audio signals to the user.

The ARD 102 also can generate and provide cues, based at least in part on context (e.g., location of the user, camera input, . . . ) to local customs associated with the location. For instance, the sensor component 104 (e.g., GPS or navigation system, camera, audio sensor, . . . ) can monitor and detect the location of the user, and/or visual information and/or audio information regarding the environment. Based at least in part on the results of analyzing such sensor data regarding the location and environment, the IMC 108 can determine the context relating to local customs or local items of interest for that location (e.g., country, region, . . . ), can determine cues or instructions that can enhance the activities or actions of the user in that location, and can facilitate presenting, via the interface component 106, the cues or instructions to the user. The local customs and/or local items of interest can be or can relate to, for example, which side of the road to drive on, how to greet people in that location, currency translation, food ingredients, politics and phrases to avoid while in that location, local history of that location, sights to see in or near that location, recent events associated with that location (to start conversation), landmarks in or near that location, mythologies associated with that location, and/or other local customs or items of interest.

In certain implementations, with regard to companionship, butler, tour guide, and life coach issues, the ARD 102 can be employed to provide a number of services and information (e.g., customized information) based at least in part on conditions or characteristics of the environment detected by the sensor component 104, information obtained from another data source(s), and/or user instructions or preferences. The IMC 108 can analyze the sensor data relating to the conditions or characteristics of the environment, other information from the other data source(s), and/or the user instructions or preferences, and can determine information (e.g., customized information) to present to the user via the display component 302, the audio component 304, and/or the haptic component 306 of the interface component 106.

As some examples, based at least in part on the results of such analysis, the IMC 108 can employ the interface component 106 to play certain music, and/or present visual and/or audio versions of stories (e.g., frivolous stories, fables, local yore, teaching, history, personal (e.g., conglomeration of Facebook, Twitter, Instagram, Wiki (e.g., Wikipedia),)). The IMC 108 also can employ the interface component 106 to inform the user or other people about the locale, people, places, and history associated with the location of the user; and/or generate and provide a list of opportunities (e.g., here and now opportunities), such as, for example, where to eat, what to do for entertainment, etc., wherein the IMC 108 can determine such information based at least in part on the analysis results. Additionally or alternatively, the IMC 108 can employ the interface component 106 to present information (e.g., customized information) to teach the user about abstracts: history, law, math, science, etc.; and/or teach the user about the here and now: what is around the user now, who is around the user now, etc., wherein the IMC 108 can determine such information based at least in part on the analysis results.

The IMC 108 also can determine and generate joke suggestions and/or speech text, which can be presented to the user via the interface component 106 (e.g., the speech text can be presented via a teleprompter of the interface component 106). The ARD 102 also connect the user with home, family, and/or friends as immersively as possible via text, voice, and/or video (e.g., 3-dimensional (3-D) video); remind the user of significant events, things to do, appointments, gift preferences, manager type tasks, etc.; and/or allow connections and ability to act on ideas: order flowers, adjust furnace, turn off water pump, balance checkbook, complete tax return, perform production accounting and data reconciliation, etc., based at least in part on the results of the data analysis performed by the IMC 108.

In some implementations, the ARD 102 can inform the user when the user is becoming impaired (e.g., sleepy, inebriated, etc.). For example, the sensor component 104 can employ a camera(s) (e.g., user-facing camera of the interface component 106) to detect eye actions or facial expressions of the user and/or an audio sensor to detect the speech of the user and pattern recognition. The IMC 108 can analyze (e.g., using pattern recognition on the visual sensor data or audio sensor data) the sensor data relating to the eyes, face, or speech of the user, and can determine whether the user is impaired (e.g., sleepy, inebriated, unconscious, . . . ) or not impaired. In response to determining that the user is impaired, the IMC 108 can determine an indicator or notification (e.g., visual, audio, and/or haptic indicator or notification) to present to the user (or to another person) to notify the user (or another person) that the user is impaired. The IMC 108 can control the interface component 106 to have the interface component 106 present the indicator or notification to the user and/or can facilitate communicating the indicator or notification to a device (e.g., another ARD or other communication device) of another user.

In some embodiments, the ARD 102 can provide assembly advantages to the user or other entity (e.g., assembly company) during an assembly process to assemble products or perform other installation work in connection with a product (e.g., article of manufacture, device, cabinet, unit, etc., comprising parts, components, wires, and/or circuitry, . . . ). The ARD 102 can be employed to overcome various problems that may occur during assembly of products. For example, in connection with an assembly process, there may be various problems regarding a wrong part being used, a part being used in the wrong place, a part may be connected to the wrong thing(s), a part may not be traceable (e.g., a serial number of a part), a part may not meet incoming inspection criteria, parts from assembly may be forgotten, a user may not be trained, a user may not be authorized, a user may be in the wrong place or assembling the wrong unit, and/or assembly training materials may be insufficient. The ARD 102 can employ methods, techniques, components, features, and activities that can overcome these and/or other problems.

In some implementations, with the user (e.g., operator) interacting with or wearing the ARD 102, the ARD 102 can assist the user in a number of ways, such as disclosed herein, to improve speed of the user and of assembly or production, quality of assembly or production, security of assembly and production, and safety of the user and the environment in the performance of tasks relating to assembly of products by the user. The ARD 102, employing the interface component 106, can advise or instruct the user through visual signals, audible signals, and/or haptic feedback to facilitate enhancing the assembly process (e.g., enhancing, the speed, quality, security, and safety associated with the assembly process).

The ARD 102 can be employed to mitigate (e.g., reduce, minimize, or eliminate) wrong parts being used by the user (e.g., operator or assembler) during assembly of the product. The IMC 108 can be aware of what parts are to be used, what order the parts are to be assembled, the respective locations where the parts are to be assembled or installed, etc., to facilitate desirable (e.g., efficient) assembly of the product. In some implementations, the ARD 102 can be used step by step during the assembly process to advise the user of the ARD 102 which part is next to be assembled (e.g., connected, installed, . . . ) for the product and can use feedback to enable the user to determine which part is next in the assembly process. As an example of feedback, the IMC 108 can generate one or more indicators that can be presented via the interface component 106 to the user, wherein the one or more indicators can comprise visibly highlighting the next part by coloration and/or blinking (e.g., a green colored and/or blinking box surrounding the next part or arrow pointing to the next part, as presented on the display screen of the display component 302; and/or a voice message emitted via a speaker of the audio component 304 to the user). The ARD 102 also can employ the interface component 106 (e.g., the display screen of the display component 302) to show the parts of the product virtually on the display screen over the live view the user has (e.g., the live view via the lens component of the ARD 102).

For instance, the IMC 108 can receive the assembly information, comprising task-related information, relating to the product assembly from the data store 114 and/or another data source (e.g., external data source), the sensor component 104 (e.g., one or more sensors) and/or the user. The IMC 108 can analyze the assembly information. Based at least in part on the results of the analysis, the IMC 108 can determine the task (e.g., the next task) relating to assembly of the product.

The assembly information can comprise directions and/or images relating to assembling the product, including information regarding the respective parts of the product, the order of the assembling of parts of the product, respective parameters of respective parts, any notable considerations, conditions, or hazards associated with assembling the product, and/or other types of assembly information. Notable considerations, conditions, or hazards associated with assembling the product can comprise, for example, indicating whether a part or assembling (e.g., installing, connecting, . . . ) of the part involves a potential hazard (e.g., the part has a sharp edge and is to be handled with care, or installation of the part involves high voltage and the potential for electrical shock, so proper precautions should be taken) and/or indicating whether the part is fragile and should be handled with care, among other types of considerations, conditions, or hazards that may exist.

The IMC 108 also can determine the part (e.g., next part) to be assembled as part of the assembly task based at least in part on the results of analyzing the assembly information. The IMC 108 can generate customized information (e.g., augmented reality information and/or virtual reality information), comprising part information, that can indicate the part to be assembled as part of the assembly task.

The IMC 108 can facilitate presenting, via the interface component 106 of the ARD 102 associated with the user, the customized information, comprising the part information, to the user. The customized information, comprising the part information, can include a visual presentation regarding the part information (e.g., a drawing of the part (e.g., in space), and/or the part being visually highlighted or emphasized by color, by flashing, and/or by other emphasis means), for example, as if the part is present (e.g., virtually present) in the live view of the assembly of the product (e.g., partial assembly comprising the part) that can be viewable through the ARD 102 (e.g., display component 302) by the user, and/or can include audio information regarding the part information presented via the interface component 106 (e.g., speaker(s) of the audio component 304). Such customized information can facilitate instructing the user as to which part to select (e.g., choose) for assembly or installation at this point in the assembly process.

Figure 4:
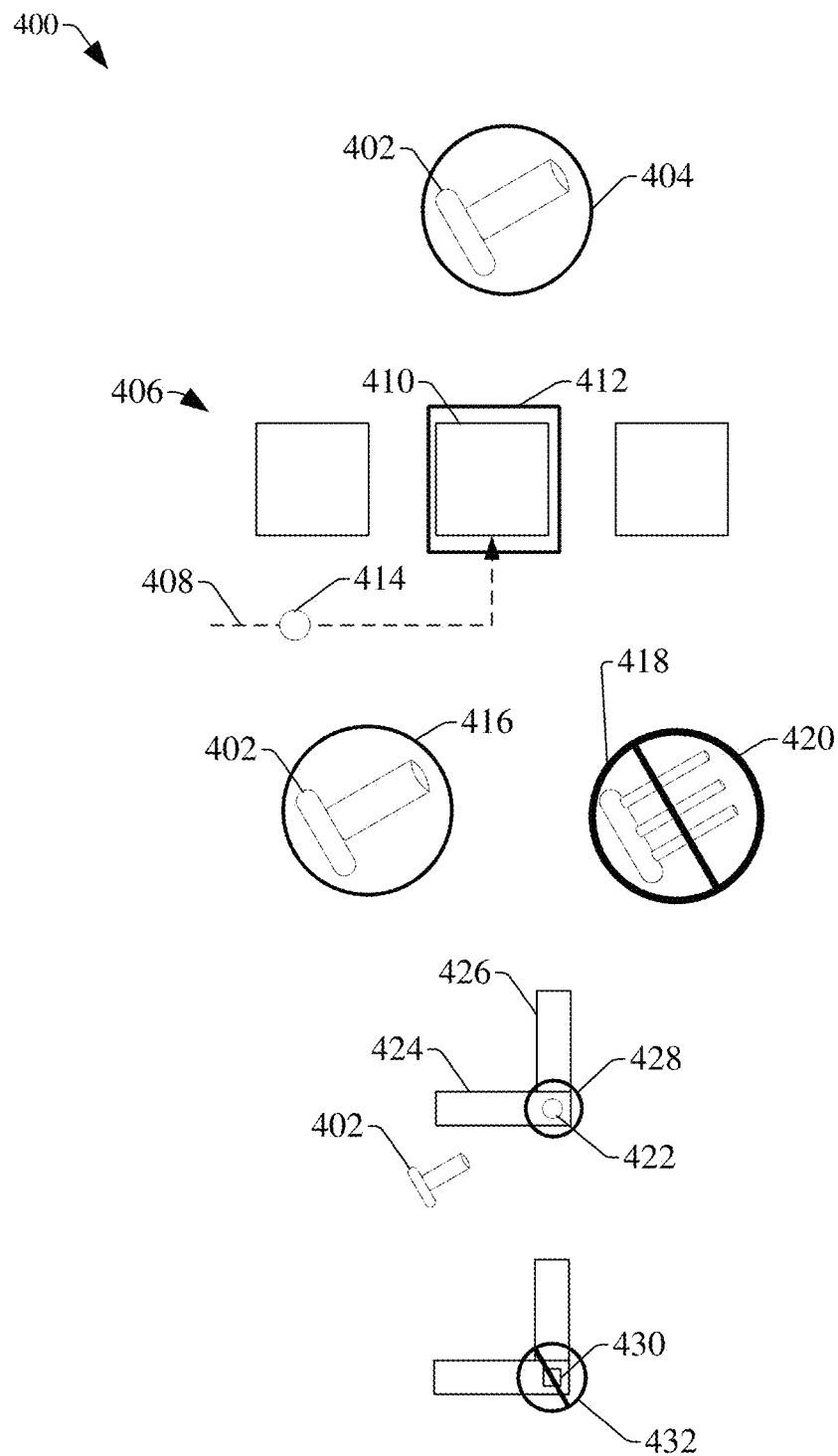
FIG. 4 depicts a diagram of various example visual presentations in the field of view of a user in connection with an assembly process, in accordance with various aspects and embodiments of the disclosed subject matter.

Referring briefly to FIG. 4 (along with FIG. 1), FIG. 4 depicts a diagram of various example visual presentations 400 in the field of view of a user in connection with an assembly process, in accordance with various aspects and embodiments of the disclosed subject matter. As depicted in the visual presentations of FIG. 4, the IMC 108 can facilitate presenting customized information on the display screen of the display component 302 associated with the lens component, wherein the customized information can comprise a visual illustration of the part 402, and optionally can include a visual emphasis 404, such as a ring or rectangular shaped box around the part (e.g., to highlight the part from other parts that may be viewable on the display screen).

In some implementations, the IMC 108 can determine the correct bin or part storage location where the part is located based at least in part on an analysis of the assembly information and/or other information (e.g., stored in the data store 114 or an external data source) that can indicate the location of the correct bin or part storage location. The IMC 108 also can determine the travel route (if any travel to get the part is to be done) the user is to take to get to the correct bin or part storage location, based at least in part on an analysis of sensor data regarding the location and/or orientation of the user (and associated ARD 102) and the location of the correct bin or part storage location, wherein the sensor data can be received from one or more sensors (e.g., location sensor or GPS sensor) of the sensor component 104. The IMC 108 can facilitate presenting, via the interface component 106 (e.g., display component 302, audio component 304), the travel route (e.g., textual or audio travel directions) to the user and can guide the user to the correct bin or part storage location to retrieve the part and/or an indicator (e.g., visual indicator and/or audio indicator) that can indicate the correct bin in which the part can be found. For example, with regard to a set of bins 406 in which parts are stored, the IMC 108 can facilitate presenting, via the interface component 106, the travel route 408 to the correct bin 410 and an indicator 412 that can indicate the correct bin 410 and differentiate it from the other bins of the set of bins 406. The travel route 408 presented (e.g., displayed) on the display screen to the user also can include a user location indicator 414 that can indicate the location of the user along or in relation to the travel route 408, and in relation to the correct bin 410.

In response to selection of the part (e.g., from the correct bin or part storage location) by the user, the IMC 108, employing the sensor component 104, can determine whether the user selected the correct part. The sensor component 104 (e.g., image capture component 202) of the ARD 102 can detect the part selected (e.g., picked up and held) by the user and can provide sensor information relating to detection of the part selected by the user to the IMC 108. The IMC 108 can determine the part that was selected by the user based at least in part on the sensor information and part identification information obtained from the data store 114, wherein the part identification information can facilitate identifying the selected part. The IMC 108 can employ object recognition to recognize or identify the part and/or can interpret a bar code or other identification information (e.g., symbol) associated with (e.g., attached to or imprinted on) the part.

For example, the IMC 108 can compare an image of the part captured by the sensor component 104 to images of parts stored in the data store 114 and can determine an image of a part in the data store 114 that matches or at least substantially matches the image of the part captured by the sensor component 104, wherein the image of the part in the data store 114 can be associated with identification information that can identify the part and can identify where and when the part is to be installed or otherwise assembled in the assembly process. Additionally or alternatively, the sensor component 104 (e.g., image capture component 202 and/or scanner component 210) can capture an image of a bar code or other identification information associated with the part and/or can scan (e.g., read) the bar code or other identification information associated with the part. The sensor component 104 can communicate the sensor data relating to the bar code or other identification information to the IMC 108. The IMC 108 can identify the part selected by the user based at least in part on the results of analyzing such sensor data.

If the IMC 108 determines that the user selected the correct part, the IMC 108 can generate and facilitate presenting, via the interface component 106 (e.g., a display screen of the display component 302 and/or an audio speaker of the audio component 304), a confirmation indicator or message. The confirmation indicator or message, for example, can be a colored (e.g., green) indicator 416 that can emphasize (e.g., highlight) the selected part (e.g., the selected part can be outlined in green in the visual display of the ARD 102) to indicate the correct part was selected and/or audio information (e.g., verbal message) confirming that the correct part was selected can be communicated via the speaker to the user.

If, however, the user had selected the wrong part 418, and the data analysis by the IMC 108 caused the IMC 108 to determine that the user did not select the correct part, the IMC 108 can generate and facilitate presenting, via the interface component 106 (e.g., the display component 302 and/or audio component 304), an incorrect part indicator or message. The incorrect part message, for example, can be a colored (e.g., red) indicator 420 that can emphasize the selected part (e.g., the selected part can be outlined in red on the display screen of the display component 302) to indicate the wrong part 418 was selected by the user and/or audio information indicating that the wrong part 418 was selected can be communicated via the speaker of the audio component 304 to the user.

In response to determining the part 402 to be assembled or installed as part of the task, the IMC 108 also can determine the location 422 and orientation on the product where the part 402 is to be assembled or installed and/or location and orientation of one or more other parts (e.g., 424, 426) or features of the product (e.g., in proximity to the location 422 where the part 402 is to be assembled or installed or to which the part 402 is to be connected), based at least in part on the results of the analysis of the assembly information (e.g., images of the product assembly and parts) relating to assembly of the product and/or analysis of the part 402 and product. For instance, the ARD 102, via the IMC 108 and interface component 106 (e.g., through images or indicators presented on the display screen of display component 302 and/or audio information presented via the audio component 304), can show or indicate to the user where a part, component, or wire, etc., is to be placed (e.g., installed, connected, inserted, . . . ) inside a cabinet, device, unit, product, etc., associated with an assembly process, using the techniques disclosed herein.

In some implementations, the IMC 108 also can determine the location of the user and/or the user's hands or tools (e.g., tool in hand) relative to the product or part 402, and/or the location and orientation of the part 402 (e.g., in the user's hand or on tool), based at least in part on sensor data obtained from the sensor component 104 relating to location of the user (and associated ARD 102). The IMC 108 can facilitate emphasizing, via the display screen of the display component 302 (and associated lens component) of the ARD 102, the location 422 on the product where the part 402 is to be assembled based at least in part on such analysis results, wherein such analysis results can indicate the location 422 where the part 402 is to be assembled (e.g., relative to the one or more other parts (e.g., 424, 426) or features of the product in proximity to the location where the part 402 is to be assembled or to which the part 402 is to be connected). As part of the data analysis, the IMC 108 also can employ object recognition to facilitate identifying the location 422 of the installation or other assembling of the part 402 on the product and/or identifying the one or more other parts (e.g., 424, 426) or features of the product in proximity to the location 422 where the part 402 is to be installed or otherwise assembled or to which the part is to be connected, based at least in part on the assembly information (e.g., images and/or textual information regarding the respective parts and features of the product).

The emphasis provided on the display screen of the display component 302 can be, for example, an emphasis or highlight, such as a colored (e.g., green) and shaped (e.g., circular or rectangular shaped) indicator 428 around (e.g., surrounding) the location on the product where the part 402 is to be assembled, an arrow indicator pointing at the location 422 on the product where the part 402 is to be assembled, and/or a message in proximity to the location 422 on the product where the part 402 is to be assembled. For instance, the IMC 108 can determine the position in the field of view on the display screen of the display component 302 (and associated lens component of the ARD 102) that corresponds to (e.g., aligns with) the location 422 where the part 402 is to be installed or otherwise assembled on the product. The IMC 108 can facilitate emphasizing, via the interface component 106, that position on the display screen of the ARD 102 to facilitate emphasizing the corresponding location 422 where the part 402 is to be assembled on the product. If the position changes due, for example, to the user moving the ARD 102 (e.g., the user moving his head and the ARD 102 thereon), the IMC 108 can facilitate, via the interface component 106, moving the position of the emphasis indicator 428 associated with the location 422 on the display screen to continue to have the position on the display screen, and, accordingly, the emphasis indicator 428 on the display screen of the ARD 102, correspond to the location 422 where the part 402 is to be assembled on the product.

In certain embodiments, in connection with the user installing, connecting, or otherwise assembling parts (e.g., components, wires, . . . ) on a product during assembly, the IMC 108 can generate customized information (e.g., augmented and/or virtual reality information) that can be presented as a display presentation (e.g., virtual display of the product or portion thereof) on the display screen of the display component 302. With regard to parts that are not assembled into the product, the display presentation can show such parts in a washed-out (e.g., grayed-out or de-emphasized) manner. With regard to respective parts of the product, as a part being assembled into the product, to depict the part as in the process of being assembled, the IMC 108 can facilitate modifying the display presentation to display a virtual part, corresponding to that part, such that it is active or blinking (e.g., intermittently transitioning between showing as washed-out or colored) in the display presentation. With regard to respective parts of the product, once the part has been assembled into the unit, to depict the part as being assembled in the product, the IMC 108 can facilitate modifying the display presentation to display the virtual part, corresponding to that part, such that it is solid or real (e.g., a solid color) in the display presentation.

In some implementations, to facilitate proper assembling of parts in a product, the IMC 108 can generate a display presentation (e.g., virtual display presentation (e.g., virtual product) that can virtually represent the product) that can represent the product, or a portion thereof, based at least in part on the assembly information and/or other information obtained from another data source(s). The display presentation can comprise a CAD model or wireframe model (e.g., 3-D CAD or wireframe model), for example. The IMC 108 can facilitate presenting, via the display screen of the display component 302, the display presentation to the user. The user, using, for instance, hand gestures (e.g., captured by the image capture component 202), voice commands (e.g., captured by the audio sensor component 204), or controls of the ARD 102 (e.g., received via the key/control component), can manipulate the display presentation to zoom in to or out from a particular area of the virtual product (e.g., in the virtual view of the product on the virtual display) and/or can rotate or otherwise adjust the viewing perspective of the virtual product (e.g., in the virtual view of the product on the virtual display). These disclosed aspects, along with the indicators relating to assembling of the part in the product (e.g., indicators that can indicate the proper part and proper location to assemble the part in the product), can enhance assembling of parts in the product.

If, for some reason, the user is attempting to install or otherwise assemble the part 402 in the wrong place 430 on the product, the IMC 108 can identify that the user is attempting to assemble the part 402 in the wrong place 430 on the product, based at least in part on the analysis results relating to determining the correct location 422 on the product to assemble the part 402, as disclosed herein. The IMC 108 can facilitate, via the interface component 106, presenting a negative indicator 432 on the display screen of the ARD 102, wherein the negative indicator 432 can indicate to the user that the user is attempting to assemble the part 402 in the wrong location 430 on the product. The negative indicator 432 can comprise, for example, a colored (e.g., red) indicator of desired form (e.g., a red circle with a line through it) that can be placed over a location on the display screen that can correspond to the location 430 (e.g., wrong location) on the product where the user is improperly attempting to assemble the part 402 in the product. Additionally or alternatively, the IMC 108 can present (e.g., via a speaker of the audio component 304 and/or the haptic component 306) an indicator (e.g., verbal message and/or haptic communication) to the user to notify the user that the user is attempting to assemble the part 402 in the wrong place 430 on the product.

In a similar regard, the ARD 102 also can be utilized to determine whether the user of the ARD 102 is in the right place or wrong place to perform work tasks and/or is assembling the right unit or wrong unit. For instance, the IMC 108 can determine the location and orientation of the user based at least in part on sensor data relating to the user's location and orientation received from one or more sensors of the sensor component 104, as more fully disclosed herein. The IMC 108 also can determine the correct location where the user should be at to perform the next work task and/or the correct unit (e.g., product, cabinet, device, . . . ) on which the user is to perform the next work task, based at least in part on the results of analyzing sensor data relating to the user and/or unit received from the sensors of the sensor component 104, assembly information and/or work instructions relating to the assembly of the unit, and/or other information.

If the IMC 108 determines that the user is in the wrong location (e.g., in a building or other area), is attempting to perform a work task on the wrong unit, and/or is not facing the correct unit (e.g., according to the orientation of the user) to perform the next work task, the IMC 108 can communicate one or more indicators (e.g., visual indicator, audio indicator, and/or haptic indicator) via the interface component 106 (e.g., display screen of display component 302, audio speaker of audio component 304, and/or haptic emitter of the haptic component 306) to the user to notify the user that the user is in the wrong location, is attempting to perform the work task on the wrong unit, and/or is not facing the correct unit to perform the next work task. The IMC 108 also can determine and generate a travel route to guide the user from the current (e.g., wrong) location to the correct location where the correct unit is located, based at least in part on the current location of the user and the location of the unit, using the techniques disclosed herein. The information can facilitate presenting, via the interface component 106 (e.g., via display screen of the display component 302 and/or speaker of the audio component 304), the travel route to the user. The travel route generated by the IMC 108 in such instances when a user is in the wrong location to perform work tasks can be particularly useful, for example, in larger areas or buildings.

In a manner similar to the above disclosed subject matter regarding the assembling of the correct part in or on a product, the ARD 102 also can be employed to confirm that a part is assembled (e.g., installed or connected) correctly and/or determine whether a part is connected correctly to other parts of a product, and can provide (e.g., communicate) confirmation that the part is connected correctly or provide a negative indicator to indicate that the part is not connected correctly and/or has somehow become incorrectly connected. For instance, the ARD 102, employing the sensor component 104 and IMC 108, can confirm that appropriate nodes (e.g., screw terminals, wire ends, tabs, brackets, . . . ) of a product are in contact with the appropriate nodes of surrounding and associated parts of the product.

For example, the sensor component 104 can sense various connections between parts of a product, for example, by capturing images of the various connections of the product (e.g., via the image capture component 202), sensing data flow between respective components of the product (e.g. via one or more other sensors 216), and/or other sensing means, and can generate sensor data relating thereto. The IMC 108 can analyze all or a portion of the sensor data obtained from the sensor component 104 and/or other data relating to the product from another data source(s) to facilitate determining whether parts on the product are appropriately connected to each other. For instance, the IMC 108 can compare the images of the various connections between parts of the product (e.g., images received from the sensor component 104) to stored images regarding the correct connections between parts of the product, and can determine whether the various connections between the parts of the product are correct based at least in part on the results of the comparison. The IMC 108 can retrieve the stored images from the data store 114 or an external data source (e.g., via the communication network).

If the IMC 108 determines that the connections between the parts of the product are correct, based at least in part on the analysis results, the IMC 108 can facilitate presenting, via the interface component 106 (e.g., the display screen of the display component 302 and/or a speaker of the audio component 304), a positive indicator (e.g., a green or otherwise confirming visual indicator, or a confirmation audio message). If the IMC 108 determines that a connection between parts of the product is not correct or is otherwise faulty, based at least in part on the analysis results, the IMC 108 can facilitate presenting, via the interface component 106 (e.g., the display screen of the display component 302 and/or a speaker of the audio component 304), a negative indicator (e.g., a red visual indicator or other bad-connection visual indicator, or a bad-connection audio message) to the user to indicate that such connection between those parts of the product is not correct or is otherwise faulty.

In some instances, there can be an issue with regard to tracing a part of a product (e.g., tracing or identifying a serial number of the part). The ARD 102 can be employed to facilitate tracing or identifying the part. For instance, the sensor component 104 can employ the image capture component 202 to capture an image of a part code of a part and/or capture images of the part, the scanner component 210 to scan the part code of the part, and/or another sensor(s) of the sensor component 104 to sense other information regarding the part that can be used to facilitate tracing the part, wherein the part code can be a serial number, bar code, two-dimensional (2-D) code, or other type of part code. In some implementations, the image capture component 202 or another sensor(s) can capture or scan the part code, or at least capture images of the part, in response to sensing that the user is looking at the part through the lens component of the ARD 102. Such other sensor(s) of the sensor component 104 can comprise, for example, sensors that can perform or employ near field imaging (NFI), Bluetooth technology, radio frequency (RF) technology, infrared (IR) technology, and/or other technology to sense or capture information regarding a part that can be used to facilitate tracing or identifying the part. The respective sensors of the sensor component 104 can generate sensor data based at least in part on the respective sensing performed by the respective sensors. The IMC 108 also can request that the user otherwise confirm the identification of the part.

The tracing, identifying, and/or confirming of parts of the product, using the disclosed techniques, can facilitate enhancing the assembly process, including enhancing bill of materials (BOM) confirmation and a serial numbers-in-this-product list). The ARD 102, employing the IMC 108, also can facilitate verification of the assembly (e.g., proper assembly) of the product, based at least in part on the tracing, identifying, and/or confirming of the parts of the product, and comparing the 3-D view of the display presentation of the virtual product to the BOM associated with the product, to the print associated with the product, to the view of the camera(s) of, or images of the product captured by, the image capture component 202, and/or to the live view presented via the lens component of the ARD 102.

For example, the IMC 108 and the sensor component 104 (e.g., image capture component 202 or other sensor(s)) of the ARD 102 can check (e.g., double check or confirm) measurements, for example, of wires, hole placements, hole sizes, components (e.g., component sizes and/or relative placement of components to other components), etc., of a product. The image capture component 202 can capture images of the wires, hole placements, hole sizes, component sizes, relative placement of components to other components, etc., of the product. The IMC 108 can retrieve stored images relating to the measurements associated with the product from the data store 114 or an external data source. The IMC 108 can compare the captured images to the stored images to determine whether there are any unacceptable differences between the measurements identified in the captured images and the measurements identified in the stored images, based at least in part on defined assembly criteria associated with the product.

In response to determining that the measurements identified in the captured images satisfy the defined assembly criteria, the IMC 108 can facilitate presenting, via the interface component 106, a confirmation message or indicator (e.g., visual or audio message or indicator) that can confirm that the assembled product (or portion thereof under inspection) satisfies the defined assembly criteria. In response to determining that the measurements identified in the captured images do not satisfy the defined assembly criteria (e.g., because one or more measurements in the captured images do not suitably compare to one or more corresponding measurements in the stored images), the IMC 108 can facilitate presenting, via the interface component 106, an assembly problem message or indicator (e.g., visual or audio message or indicator) that can indicate that the assembled product (or portion thereof under inspection) does not satisfy the defined assembly criteria and/or can indicate which portion of the assembly does not satisfy the defined assembly criteria.

In some implementations, the IMC 108 can receive the sensor data from the sensor component 104, and can access a database (e.g., external database) that can comprise part identification information (e.g., part codes, serial numbers of parts, bar codes of parts, images of parts, 2-D codes, . . . ) that can identify various parts. The IMC 108 can compare the sensor data to the part identification information accessed from the database to generate comparison (e.g., analysis) results. The IMC 108 can determine the part code based at least in part on the analysis (e.g., comparison) results.

In other implementations, the IMC 108 can receive the sensor data relating to the part from the sensor component 104, and can upload the sensor data relating to the part (e.g., sensor data relating to identification of the part) to another system (not shown in FIG. 1), such as a manufacturing execution system or part identification system. Such other system can trace or identify the part, and can generate part identification information that can identify the part, based at least in part on the sensor data received from the IMC 108. The IMC 108 can receive the part identification information from such other system and can use the part identification information to identify the part, and/or to make other decisions and/or determinations relating to the part.

The ARD 102 also can enable identification of a part that does not meet inspection criteria (e.g., incoming inspection criteria). For instance, with regard to a part, the IMC 108 can identify the part, using the disclosed techniques, and can obtain a photograph(s) or visual view (e.g., 2-D or 3-D visual view) of the part from the data store 114 or an external data source, based at least in part on the part identification. The visual view of the part can be a CAD drawing of the part and/or a manipulative visual view (e.g., a 3-D visual view that the user can manipulate using controls or commands via the ARD 102 to adjust the view of the part with respect to the user), for example. The IMC 108 can facilitate, presenting via the display screen of the interface component 106, the photograph(s) or visual view of the part to the user. The user can compare the photograph(s) or visual view of the part to the live view of the part as the user views the part through the lens component of the ARD 102. The user can determine whether the part satisfies the quality criteria for the part based at least in part on the results of comparing the photograph(s) or visual view of the part to the actual part.

Additionally or alternatively, the user can use the image capture component 202 (e.g., one or more cameras) of the interface component 106 to capture one or more images of the part, wherein the one or more images can capture dimensions and/or other quality-related features (e.g., critical dimensions and/or critical-to-quality aspects) of the part. The IMC 108 and/or the user can compare the dimensions and/or other quality-related features of the part to information (e.g., images, specifications, quality criteria, . . . ) relating to the dimensions and/or other quality-related features of the part, and/or quality criteria applicable to the part, wherein the IMC 108 can obtain such information from the data store 114 or an external data source (e.g., a company database). Based at least in part on the results of comparing the dimensions and/or other quality-related features of the part to the information relating to the dimensions of the part, other quality-related features of the part, and/or quality criteria applicable to the part, the IMC 108 or user can determine whether the part satisfies the quality criteria applicable to the part.

In some implementations, the ARD 102 can be employed to identify instances when a part(s) from an assembly of a product is missing or has been forgotten. For instance, the image capture component 202 of the ARD 102 can capture one or more images of a view of the product assembly. The IMC 108 can obtain one or more assembly views (e.g., expected assembly views) of the product assembly from the data store 114 or an external data source (e.g., company database) and/or assembly information (e.g., assembly instructions) relating to the product assembly. The IMC 108 can analyze the one or more images of the view of the product assembly and the one or more assembly views and/or the assembly information. For instance, the IMC 108 can compare the one or more images of the view of the product assembly to the one or more assembly views and/or the assembly information to facilitate determining whether a part of the product assembly has been forgotten or is otherwise missing.

Based at least in part on the results of the analysis, the IMC 108 can determine whether a part of the product assembly has been forgotten or is otherwise missing. If the IMC 108 determines that a part of the product assembly is missing, the IMC 108 can generate an assembly error message, which can include a notification that the part is missing from the product assembly and/or other information regarding the missing part. The interface component 106 can communicate the assembly error message to the user via the display screen of the display component 302, a speaker of the audio component 304, and/or a haptic feedback signal from the haptic component 306 to notify the user that the part is missing from the product assembly and/or the other information regarding the missing part (e.g., identify which part is missing and/or the location on the product assembly where the part is supposed to be installed).

The ARD 102 also can be employed to train users to perform works tasks for product assembly and/or can enable untrained or undertrained users to perform the work tasks for product assembly (e.g., by learning and being trained on the job), even though they are untrained or undertrained. Training materials often can be more efficacious when they involve pictures as, for example, pictures do not need language translation and pictures can be closer to reality (e.g., visual reality) than verbal or written descriptions.

The ARD 102 can be used to develop, generate, and provide work instructions by capturing a desired number of images (e.g., photographs) from various perspectives and desired (e.g., expert) user instructions from a desired article build (e.g., a first-article build) of the product. As the product is being assembled during the desired article build, the trained (e.g., expert) user of the ARD 102 can capture images of different portions of the assembly process for the product (e.g., to provide work instructions on a part-by-part, step-by-step basis). The images captured by the ARD 102 can be still frames (e.g., still images) or video of what the camera(s) of the image capture component 202 perceives or captures during the assembly process of the desired article build of the product. The trained user (e.g., teaching assembler) also can use the audio sensor component 204 (e.g., microphone) to provide (e.g., communicate) verbal work instructions regarding performing the work tasks of the assembly process (e.g., describing what the trained user is doing) and/or the key/control component 308 to provide textual work instructions regarding performing the work tasks of the assembly process. As desired, the IMC 108 and/or another component of the ARD 102 can employ a speech-to-text engine to convert speech (e.g., verbal work instructions) of the trained user to textual information (e.g., textual work instructions), which can be edited, if necessary, and included in the work instructions.

The ARD 102 also can obtain images and/or other information regarding the product assembly from another data source(s) (e.g., an external database(s)) or other persons working on the product assembly. As desired (e.g., as appropriate), the ARD 102, employing the IMC 108, also can create or obtain CAD models (e.g., 3-D and/or virtual CAD models) of the product, the product assembly, or respective portions thereof, that can be used as part of the work instructions. The CAD models can be used to augment the images of the product assembly. In some implementations, a CAD model can be manipulated by the user, using various controls of the interface component 106, to view the CAD model from various perspectives, via the display screen of the display component 302 of the ARD 102. For example, the IMC 108 can control manipulation of the CAD model, and can adjust the view of the CAD model with respect to the user, based at least in part on hand gestures (e.g., captured via the image capture component 202), voice commands (e.g., captured by the audio sensor component 204), and/or textual commands (e.g., received via the key/control component 308) presented by the user.

The work instructions, comprising the images, verbal work instructions, and/or the textual work instructions, can be available to other users who can use their ARDs 102 to access the work instructions from the data store 114 of the ARD 102 or from an external data source. A user (e.g., an untrained or undertrained user) of an ARD 102 can play back the work instructions on the ARD 102 (e.g., on the display screen and through the audio speaker on the ARD 102) so the user can be trained with regard to performing the work tasks of the assembly process and/or so that the user can perform the work tasks of the assembly process (e.g., as the user learns on the job). In some implementations, the ARD 102 can use live 2-D or 3-D video, audio (e.g., audio instructions), and/or haptic feedback, presented to the user via the interface component 106, for fully immersive guidance (e.g., live guidance) of the user or training (e.g., beforehand) of the user regarding the assembly procedure of the product.

In some embodiments, a user of the ARD 102 can use the image capture component 202 and/or other components of the ARD 102 to capture images and/or other information (e.g., audio signals) of a view(s) of an assembly of a product, and can communicate (e.g., broadcast or transmit) the images and/or other information of the view(s) of the product assembly to another device (e.g., another ARD, or a communication device, such as a computer, electronic tablet, or mobile phone) of another user (e.g., supervisor, trained user, and/or expert user) for review of the assembly work by the other user and/or live guidance regarding the assembly (e.g., how to perform an assembly task) from the other user. The user can receive, via the ARD 102, feedback (e.g., video and/or audio communications or information) from the other user, via the other device, to indicate whether the user has performed the assembly correctly or provide the live guidance regarding the assembly to the user.

As disclosed, the ARD 102 can be employed to create and use work instructions regarding a product assembly, wherein the work instructions can be step-by-step work instructions. By presenting step-by-step work instructions to the user via the ARD 102 (e.g., via the display screen of the display component 302 and/or speaker of the audio component 304), it can enable the ARD 102 to lead, instruct, or train the user to perform the work tasks regarding the product assembly in relatively small bits (e.g., installation or construction part by part) and review and check the work of the user (e.g., after each portion (e.g., performance of each work task) of the product assembly process), which can effectively enable virtually untrained users to perform the work tasks.

In certain embodiments, the ARD 102 can be utilized to secure the ARD 102, other devices or information (e.g., external databases) associated with the ARD 102, and/or an area(s) associated with the ARD 102 from being accessed by unauthorized persons. The ARD 102 can verify or facilitate verifying the identity of a user based at least in part on authentication information (e.g., authentication credential) received from the user. The IMC 108 can control access to the ARD 102 based at least in part on whether the user is an authorized user. The IMC 108 can request that the user provide (e.g., present or submit) authentication information to the ARD 102.

The authentication information can be in the form of a passcode (e.g., password, pass phrase, personal identification number (PIN), . . . ), gesture(s) (e.g., one or more finger and/or hand gestures of the user in the form of a finger or hand passcode), biometric information of the user, and/or other types of authentication information. A textual passcode can be received via the key/control component 308 of the ARD 102 from the user, wherein the user can use the keys or controls to enter the passcode. A verbal passcode can be received via the audio sensor component 204 (e.g., microphone) from the user, wherein the user can speak the passcode into the audio sensor component 204. The biometric information can comprise, for example, fingerprint, hand print or hand structure, eye (e.g., iris or retina) features, facial features (e.g., facial dimensions), and/or voice features, of the user. The ARD 102 can employ the user-facing camera(s) of the image capture component 202 to obtain (e.g., capture an image(s) of) the biometric information relating to the eyes or face, and/or can use the outward-facing camera(s) of the image capture component 202 to capture the biometric information relating to the fingers or hand. The ARD 102 can utilize the audio sensor component 204 to obtain (e.g., capture) the voice features of the user, wherein the user can speak into the audio sensor component 204 to enable the ARD 102 to obtain voice information of the user.

The IMC 108 can analyze the received authentication information and stored authentication information. For instance, the IMC 108 can compare the received authentication information to the stored authentication information to determine whether the received authentication information matches, or at least substantially (e.g., sufficiently) matches, the stored authentication information. If the IMC 108 determines that the received authentication information matches or at least substantially matches the stored authentication information, the IMC 108 can determine that the user is authenticated and can grant the user a set of access rights to the ARD 102, associated devices and/or information, and/or the area(s) associated with the ARD 102, in accordance with the access rights the user is authorized to have. If the IMC 108 determines that the received authentication information does not match or substantially match the stored authentication information, the IMC 108 can determine that the user is not authenticated and can deny the user access rights, or can grant the user only limited access rights, to the ARD 102, associated devices and/or information, and/or the area(s) associated with the ARD 102, wherein the limited access rights can be, for example, a subset of access rights that can be granted to an unauthenticated user.

In other embodiments, the ARD 102 can communicate the received authentication information of the user to another device (e.g., a device that can perform authentication or security authorizations and is associated with a company database comprising security and authentication information), wherein the other device can perform such analysis (e.g., comparison) of the received authentication information and the stored authentication information. The other device can communicate with the ARD 102 to inform the ARD 102 with regard to whether the user has been authenticated or not, and/or to inform the ARD 102 of the particular access rights that can be granted to the user.

In a manner similar to product assembly activities and tasks, the ARD 102 also can be used for enhancing maintenance activities (e.g., maintenance assistance), for example, associated with an assembly process, an industrial automation system, or with regard to another type of environment. Certain problems may arise during maintenance. As some examples, there may be hazards inside an electrical cabinet or other device to be maintained which are obscured by the cabinet door in normal circumstances. Before performing maintenance work safely, circuits often should be (e.g., need to be) shut down. If the controls to shut the circuits down are remote or within the cabinet itself, this can cause difficulties and/or present potential hazards. Parts sometimes can wear out after they are used/stressed in certain ways. While this data may be available inside a controller or a database, it can be difficult to obtain and may in fact not even be considered except when a given part fails. Determining which cabinet in a plant and which part in a system contains a serviceable part can be prone to mistakes, particularly when there are many similar cabinets or many similar parts. There also can be problems which are associated with the reassembly portion of maintenance.

It is to be appreciated and understood that aspects, embodiments, and techniques disclosed herein with regard to assembly activities or tasks performed or facilitated (e.g., enabled, enhanced, . . . ) by the ARD 102 generally can be applicable to maintenance activities or tasks performed or facilitated by the ARD 102. Likewise, it is to be appreciated and understood that aspects, embodiments, and techniques disclosed herein with regard to maintenance activities or tasks performed or facilitated by the ARD 102 generally can be applicable to assembly activities or tasks performed or facilitated by the ARD 102.

In certain implementations, with the user (e.g., operator) interacting with or wearing the ARD 102, the ARD 102 can assist the user in a number of ways, such as disclosed herein, to improve speed of the user with regard to performing maintenance tasks, quality of maintenance performed, security of the performance of maintenance tasks, and safety of the user and the environment in the performance of maintenance tasks. The ARD 102, employing the IMC 108 and the interface component 106, can advise or instruct the user through visual signals, audible signals, and/or haptic feedback to facilitate enhancing and assisting in the performance of maintenance tasks associated with the system (e.g., enhancing the speed, quality, security, and safety associated with the performance of maintenance tasks associated with the system).

One issue that can arise in maintenance of a unit, such as an electrical cabinet or other device, is that there may be hazards inside the unit that, under normal circumstances, can be obscured from the user by a cabinet door of the unit. The ARD 102, employing the IMC 108 and the interface component 106, can generate and present visible, audible, and/or haptic alerts, notifications, or warnings to the user before the user opens the unit (e.g., alert, notification, or warning regarding high voltage, high temperature, etc.; and/or actual or virtual warning labels from the equipment designers). The ARD 102 can provide the information to the user textually on the display screen of the display component 302 (e.g., as if written on the door of the unit), audibly via an audio message presented by the audio component 304, haptically by emitting haptic feedback from the haptic component 306 when the user approaches any hazards, and/or visually on the display screen of the display component 302 (e.g., as if the user is looking through the door into the unit and showing internal components and associated warnings, voltages, temperatures, in textual or virtual meters or a "heat-map" of hazards).

When a user of the ARD 102 is in proximity to the unit to perform a maintenance task or when the IMC 108 determines that the user is to perform, or is preparing to perform, a maintenance task on the unit, one or more sensors of the sensor component 104 can sense the location and/or orientation of the user, and can sense conditions associated with the unit (e.g., inside or outside the unit) and/or the area around the unit, and can generate sensor data relating thereto, for example, using the techniques disclosed herein. The IMC 108 can determine the location and/or orientation of the user, including the location and/orientation of the user relative to the unit, based at least in part on the sensor data.

The IMC 108 also can determine one or more hazards associated with the unit based at least in part on the sensor data relating to the conditions associated with the unit and/or other data obtained from the data store 114 or another data source(s). For instance, the camera(s) of the image capture component 202 can comprise a temperature sensor(s) (e.g., IR sensor(s)) that can sense or perceive temperatures (e.g., IR temperatures) inside or outside of the unit. The IMC 108 can determine and generate (e.g., automatically and/or virtually instantaneously determine and generate) customized information (e.g., augmented and/or virtual reality information), comprising a heat map of respective temperatures of respective regions or components inside or outside the unit, based at least in part on the sensor data relating to the temperatures inside or outside of the unit. For example, the IMC 108 can translate (e.g., automatically and virtually instantaneously translate) the IR temperatures into corresponding colorations (e.g., different colors representing different temperature levels) in the form of a heat map that can be overlaid on the view on the display screen (e.g., of the display component 302) through the glasses (e.g., lens component) of the ARD 102 to enable the user to avoid touching hazardous (e.g., hot) components of the unit. The IMC 108 also can obtain data regarding components of the unit that may be hazardous (e.g., hot) from the other data (e.g., specifications or descriptions of components or the unit) obtained from the data store 114 or another data source(s) and can incorporate such other data into the heat map.

Figure 5:
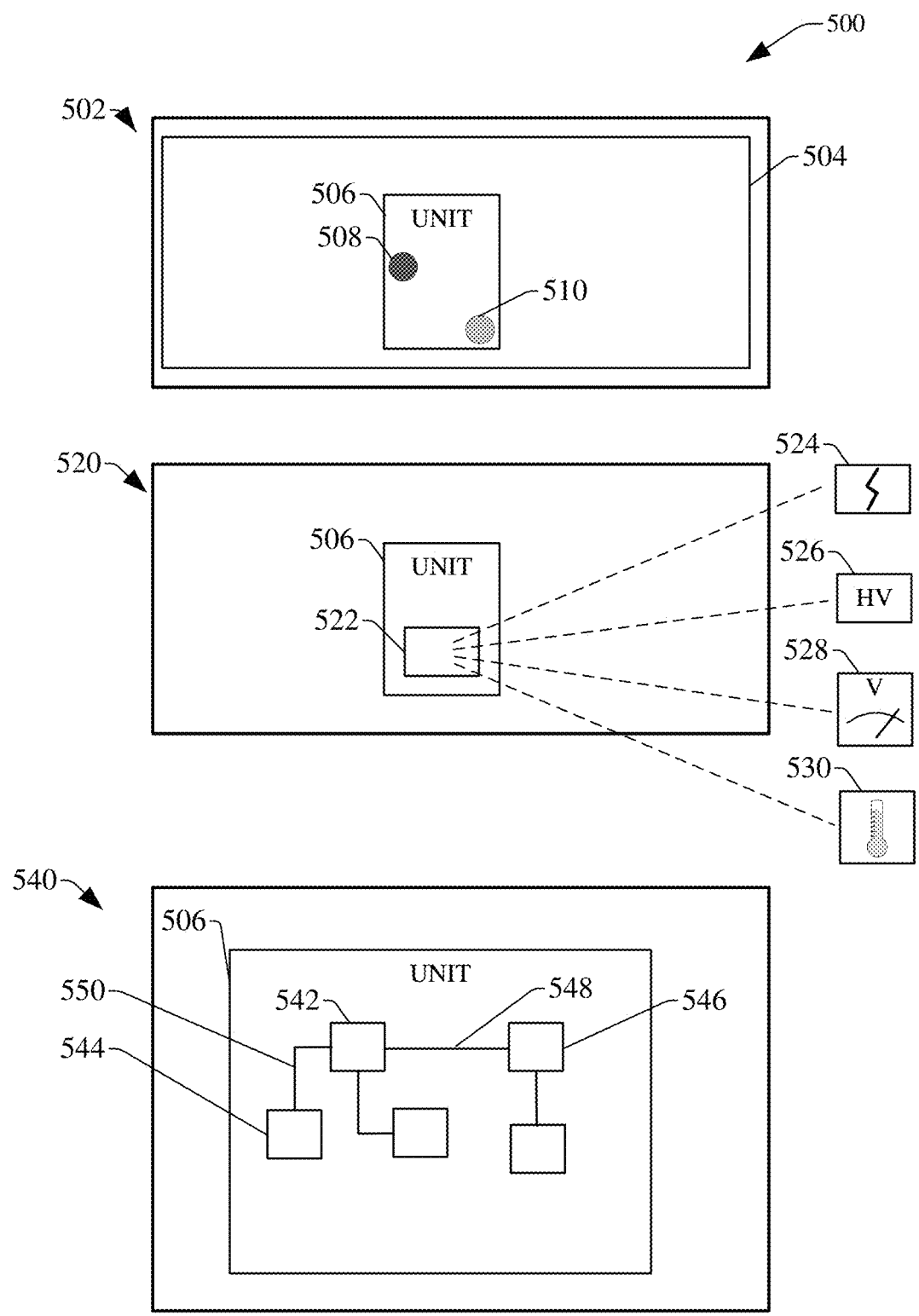
FIG. 5 illustrates a diagram of various example visual presentations in the field of view of a user in connection with performing maintenance tasks or other tasks, in accordance with various aspects and embodiments of the disclosed subject matter.

Referring to FIG. 5 (along with FIG. 1), FIG. 5 illustrates a diagram of various example visual presentations 500 in the field of view of a user in connection with performing maintenance tasks or other tasks, in accordance with various aspects and embodiments of the disclosed subject matter. The visual presentations 500 depicted in FIG. 5 can include a visual presentation 502 of a heat map 504 illustrating respective heat levels inside or in proximity to the unit 506. The IMC 108 can generate the heat map 504 to have a desired granularity with regard to the displaying the respective temperatures of respective areas inside or in proximity to the unit 506, wherein different colors or colorations can represent different temperature levels (e.g., areas with darker red coloring can indicate hotter temperatures, areas with lighter colors (or, alternatively, darker blue colors) can indicate cooler temperatures). For example, in response to determining that at least a portion (e.g., internal component) of the inside of the unit 506 has a higher (e.g., hot and potentially dangerous temperature), the IMC 108 can use a first visual representation or indicator 508 that can have a first color (e.g., dark red) on the heat map 504 to indicate that portion of the inside of the unit has a higher temperature. Based at least in part on the IMC 108 determining that another portion of the inside of the unit has a relatively lower temperature, the IMC 108 can use a second visual representation or indicator 510 that can have a second color (e.g., blue) on the heat map 504 to indicate that other portion of the inside of the unit has a relatively lower temperature. Other portions of the heat map 504 can be respectively colored using respective visual representations or indicators according to their respective temperature levels.

In some implementations, based at least in part on the results of analyzing the sensor data or the other data, the IMC 108 also can determine one or more other hazards, such as high voltages or high currents, that can be inside or associated with the unit 506. In response to determining one or more hazards in or associated with the unit, the IMC 108 can generate one or more visual presentations (e.g., indicators, virtual meters, . . . ) and can facilitate presenting, via the interface component 106, the one or more visual presentations to the user (e.g., by overlaying the display presentation(s) on the display screen associated with the lens component of the ARD 102). For instance, the IMC 108 can generate a visual indicator that can indicate an electrical hazard (e.g., high voltage, high current) in or associated with the unit (e.g., a component inside the unit) and/or can present a virtual meter(s) illustrating a voltage level or current level in or associated with the unit (e.g., a component inside the unit).

For instance, as illustrated in the visual presentations 500 of FIG. 5, the IMC 108 can generate and facilitate presenting (e.g., overlaying), via the display screen of the interface component 106 associated with the lens component of the ARD 102, a visual presentation 520 that can include one or more objects 522 (e.g., virtual objects or indicators) that can represent and indicate the hazardous or at least potentially hazardous conditions inside or associated with the unit 506.

The one or more objects 522 can comprise, for example, a high voltage symbol 524, textual information 526 (e.g., HIGH VOLTAGE (HV)), or a virtual meter 528 (e.g., a virtual voltage meter (as depicted), or virtual current meter). With regard to temperatures, in addition to or as an alternative to the heat map 504, the one or more objects 522 can include a hazardous temperature indicator 530 that can indicate a hazardous (e.g., hot) or potentially hazardous temperature has been identified in the region (e.g., inside the unit 506) at or near where the hazardous temperature indicator 530 is located in the visual presentation 520.

In some implementations, the IMC 108 can obtain images of actual warning labels provided by the manufacturer of the unit, or component therein, or provided by another data source or entity. In addition or as an alternative to the objects or indicators depicted in the visual presentations (e.g., 502, 520), the IMC 108 can generate and facilitate presenting, via a visual presentation on the display screen of the ARD 102, a virtual warning label that can correspond to an actual warning label with respect to the unit 506 or component therein.

Additionally or alternatively, the IMC 108 can generate an audio indicator that can be communicated by the audio component 304 to notify or warn the user of the hazard, the location of the hazard (e.g., inside the unit, or a particular place inside the unit), a component associated with the hazard, the type of hazard, and/or parameter values (e.g., voltage level, current level) associated with the hazard, etc. Additionally or alternatively, the IMC 108 can generate a haptic indicator that can be presented by the haptic component 306 to notify or warn the user that the user is in proximity to a hazard, for example, in response to the IMC 108 determining that the user is in proximity to the hazard.

In some embodiments, the IMC 108 can determine and generate customized information (e.g., augmented and/or virtual reality information), comprising a visual presentation 540 (e.g., a virtual view) of components, wires, connections, etc., of the unit 506 (e.g., inside or associated with the unit 506) based at least in part on the sensor data and/or the other data. The visual presentation 540 can comprise virtual objects (e.g., virtual components, such as virtual components 542, 544, and 546; virtual wires, such as virtual wire 548; and/or other virtual connections, such as virtual connection 550; . . . ) that illustrate or represent the interrelationships or associations between components (e.g., internal components of the unit), wires, connections, etc., inside or associated with the unit. For instance, the IMC 108 can have images (e.g., photographs, IR images, . . . ) of a component of the unit 506 that were captured by the image capture component 202 of the ARD 102 (or by another ARD 102 or another device), can have other images of the component obtained from another data source or entity (e.g., the manufacturer of the component), and/or can have other visual representations (e.g., a 3-D CAD or wireframe model) of the component. The IMC 108 can determine and generate a virtual component (e.g., 542) of the component based at least in part on the results of analyzing the captured images of the component, other images of the component, and/or other visual representations of the component.

As desired (e.g., by the user), this visual presentation 540 can be combined with (e.g., integrated with) other visual presentations, such, for example, visual presentations 502 or 520 (e.g., visual indicator, virtual meter, heat map, . . . ), and/or other visual information (e.g., other customized visual information), such as parameter data or task-related information. For example, a heat map 504 can be overlaid on the visual presentation 540 of the virtual objects, or a visual indicator (e.g., high voltage indicator, such as high voltage symbol 524) can be overlaid on a virtual component (e.g., 542) in the visual presentation 540 that corresponds to a component in the unit determined by the IMC 108 to have a high and potentially dangerous voltage.

The ARD 102, by providing one or more of the visual presentations (e.g., 502, 520, and/or 540) can enable a user to see inside (e.g., virtually see inside) the unit (e.g., via the virtual unit) before opening the unit. This can facilitate enabling the user to make decisions regarding an internal component(s) of the unit before the user opens the unit or accesses the inside of the unit, and/or enabling the user to take precautions (e.g., proper precautions) against hazards (e.g., high voltage, hot temperatures, . . . ) that are or may be inside of the unit, using the feedback (e.g., feedback regarding voltage or temperature) obtained by the sensor component 104 (e.g., IR sensor) and/or the other data obtained by the IMC 108, as such sensor data and/or other data is analyzed and processed by the IMC 108.

The user also can use the ARD 102 to facilitate planning or rehearsing work to be performed inside the unit (e.g., performed on an internal component(s) inside the unit) before opening up the unit (e.g., cabinet). For instance, prior to performing work inside the unit, the user can use the ARD 102 to virtually interact with an internal component(s) (e.g., interact with a virtual version (e.g., 542) of the internal component(s) on the visual presentation 540) to facilitate planning, rehearsing, and/or simulating work that is to be performed inside the unit 506 (e.g., performed on the internal component(s) inside the unit 506). For example, the user can use hand gestures (e.g., captured or detected by the image capture component 202), voice commands (e.g., input via the audio sensor component 204), and/or textual or control commands (e.g., input via the key/control component 308, to manipulate controls, sub-components, etc. (e.g., virtual controls, virtual sub-components), of the virtual component (e.g., 542) and/or connections (e.g., virtual connections (e.g., 550)) associated with the virtual component, and/or manipulate the user's view of the virtual component or associated connections to facilitate planning, rehearsing, and/or simulating work that is to be performed on the component inside the unit.

The user also can use the ARD 102 to confirm (e.g., by location of the ARD 102 and user and/or by a virtual in-cabinet view of the unit) that that the user is at the correct place where work is to be performed by the user and/or is at or interacting with the correct unit on which work is to be performed by the user. The IMC 108 can determine the location and/or orientation of the user, based at least in part on the results of analyzing sensor data from one or more sensors of the sensor component 104 and/or other data, as more fully described herein. The IMC 108 also can determine the location of the unit and the relative location of the user to the unit, based at least in part on the results of analyzing the sensor data and/or other data, as more fully described herein. Based at least in part on the respective locations of the user (and associated ARD 102) and the unit and/or orientation of the user, the IMC 108 can determine whether the user is in the correct place (e.g., in front of or in proximity to the unit) where work is to be performed by the user and/or whether the user is interacting with the correct unit on which work is to be performed by the user.

In order to safely perform maintenance work involving electrical circuits, before performing maintenance work, it often can be desirable to shut down circuits that are or may be associated with the maintenance work. If the controls to shut the circuits down are remote or within the unit itself, this may cause difficulties for the user attempting to shut down the circuits and/or expose the user to hazards. The IMC 108 of the ARD 102 can access system design parameters from the data store 114 or an external data source(s) (e.g., a database). The IMC 108 can determine which circuits are associated with (e.g., connected to) which breakers of the system based at least in part on the results of analyzing the system design parameters. Accordingly, the IMC 108 can generate customized information (e.g., augmented and/or virtual reality information) that can indicate or illustrate which circuits are associated with (e.g., connected to) which breakers of the system. The IMC 108 can facilitate presenting (e.g., overlaying), via the display screen of the interface component 106, the customized information to the user. For example, in response to detecting the user in proximity to the equipment on which maintenance work is to be performed and/or when the IMC 108 identifies that the user is preparing to perform the maintenance work on the equipment, the IMC 108 can facilitate presenting, via the display screen of the interface component 106, the customized information to the user.

Further, the IMC 108 can determine or confirm the location of all the devices, components, etc., associated with the maintenance work, based at least in part on the results of analyzing sensor data and/or other data, using the techniques described herein. The IMC 108 can determine and facilitate presenting (e.g., overlaying) respective customized information (e.g., respective pertinent information) associated with the respective devices, components, etc., virtually within the field of view of the user (e.g., via the display screen of the interface component 106 associated with the lens component of the ARD 102).

In some instances, these circuits that are to be shut down (e.g., turned off, or disconnected, . . . ) in connection with the maintenance work can be controlled or shut down by a PLC or other logically controlled devices. In such instances, the IMC 108 can generate a virtual control panel comprising virtual controls and/or other controls (e.g., switches, estop, . . . ) that can represent and virtually recreate the controls of the PLC or other logically controlled devices, based at least in part on data relating to the PLC or other logically controlled devices that can be obtained from the data store 114 or other data source (e.g., external database). The IMC 108 also can facilitate establishing a connection (e.g., a wireless communication connection) between the ARD 102 and the PLC or other logically controlled devices (e.g., via a communication network or direct communication connection). Using the ARD 102, the user can make gesture commands, which can be captured by the image capture component 202, to manipulate the virtual controls on the virtual control panel, or other controls or switches, to facilitate adjusting the actual controls, switches, etc., of the PLC or other logically controlled devices. The IMC 108 can determine the manipulations or adjustments made to the virtual controls on the virtual control panel, or other controls or switches, by the user, based at least in part on the captured gestures of the user (e.g., finger, hand, eye, and/or facial gestures of the user). The IMC 108 can adjust the virtual controls on the virtual control panel, or other controls or switches and/or can generate control information, based at least in part on the determined manipulations or adjustments. The IMC 108 can communicate the control information (e.g., control instructions) to the PLC or other logically controlled devices via the connection to facilitate adjusting the actual controls, switches, etc., of the PLC or other logically controlled devices. In response, the actual controls, switches, etc., of the PLC or other logically controlled devices can be adjusted accordingly, based at least in part on the control information, to shut down the associated circuits. Such shut down of the circuits by the user can be performed using the ARD 102 before certain safety processes, such as lock-out-tag-out, for example. For example, using the ARD 102, the user can control the PLC or other logically controlled devices, or components (e.g., internal components of a cabinet) associated therewith, to perform a safe, controlled shutdown of the circuits prior to a normal shutdown, de-energize process (e.g., de-energize a component(s)), and/or the lock-out-tag-out process.

Additionally or alternatively, to facilitate adjusting the actual controls of the PLC or other logically controlled devices, the user can present voice commands (e.g., input to or captured by the audio sensor component 204), and/or control or textual commands (e.g., input to the key/control component 308) to the IMC 108. The IMC 108 can analyze the voice commands and/or control or textual commands, and can determine control information to facilitate adjusting the actual controls, switches, etc., of the PLC or other logically controlled devices. The IMC 108 can communicate such control information (e.g., control instructions) to the PLC or other logically controlled devices via the connection to facilitate adjusting the actual controls, switches, etc., of the PLC or other logically controlled devices and, accordingly, shutting down the circuits.

Another issue that can arise is that parts can wear out after they are used or stressed in certain ways. While this data may be available inside a controller or a database, it may be difficult to obtain by a user and may in fact not even be considered except when a given part fails. The ARD 102 can overcome these and other problems that may arise with regard to obtaining desired data regarding the wearing out of parts.

The IMC 108 of the ARD 102 can detect or determine the respective items of equipment in view or in the area of the user, based at least in part on sensor data obtained by the sensor component 104 and/or other data from the data store 114 or another data source(s), as more fully described herein. The IMC 108 can correlate the respective items of equipment in view of the lens component of the ARD 102 or in the area of the user with data from databases, machine historical data, or infrared thermal readings, etc., and can compare that data to lifetime ratings of the components (e.g., parts) of the equipment. For example, for respective components of the equipment, the IMC 108 can analyze current sensor data (e.g., infrared thermal measurements or images, voltage level measurements, current level measurements, . . . ) relating to respective components and obtained from one or more sensors, historical operational data and/or other pertinent data (e.g., respective specifications, respective lifetime ratings, respective maximum or minimum parameters, . . . ) regarding the respective components (e.g., obtained from the data store 114 or another data source(s)). The historical operational data can comprise or relate to, for example, on-off cycles, voltages, thermals, current range, instances of exceeding a rating or threshold, the length of time the component has been in active service, and/or other pertinent historical operational data with regard to the respective components.

Based at least in part on the results of such analysis, the IMC 108 can determine the respective wear or stress levels of the respective components, and can determine respective "risk" levels (e.g., risk values) of the respective components, wherein a risk level of a component can comprise, or be determined based on, the risk of failure of the component, the risk that the failure of the component can result in a failure of or damage to another component, the cost associated with the failure of the component, a hazard associated with the failure of the component, the loss of production resulting from the failure of the component, and/or another factor(s), in accordance with the defined information management criteria. The IMC 108 can generate customized information (e.g., augmented and/or virtual reality information) that can comprise a visual presentation that can include a virtual display of the respective risk levels of the respective components in the field of view of the user as the user wears the ARD 102.

The IMC 108 can facilitate presenting (e.g., overlaying), via the display screen of the interface component 106, the visual presentation comprising the virtual display of the respective risk levels of the respective components in the user's field of view to enable the user to ascertain the respective risk levels of those respective components. The respective risk levels can be positioned in the virtual display on the display screen associated with the lens component of the ARD 102 to correspond to, and in proximity to, the location of the actual component in the lens component of the ARD 102 as the user looks at the actual component of the equipment through the lens component. This virtual display can facilitate enabling the user to determine, with regard to each of those components, whether a particular component is to be replaced, repaired, or have maintenance performed on the particular component, or whether another action is to be taken with regard to the particular component.

Figure 6:
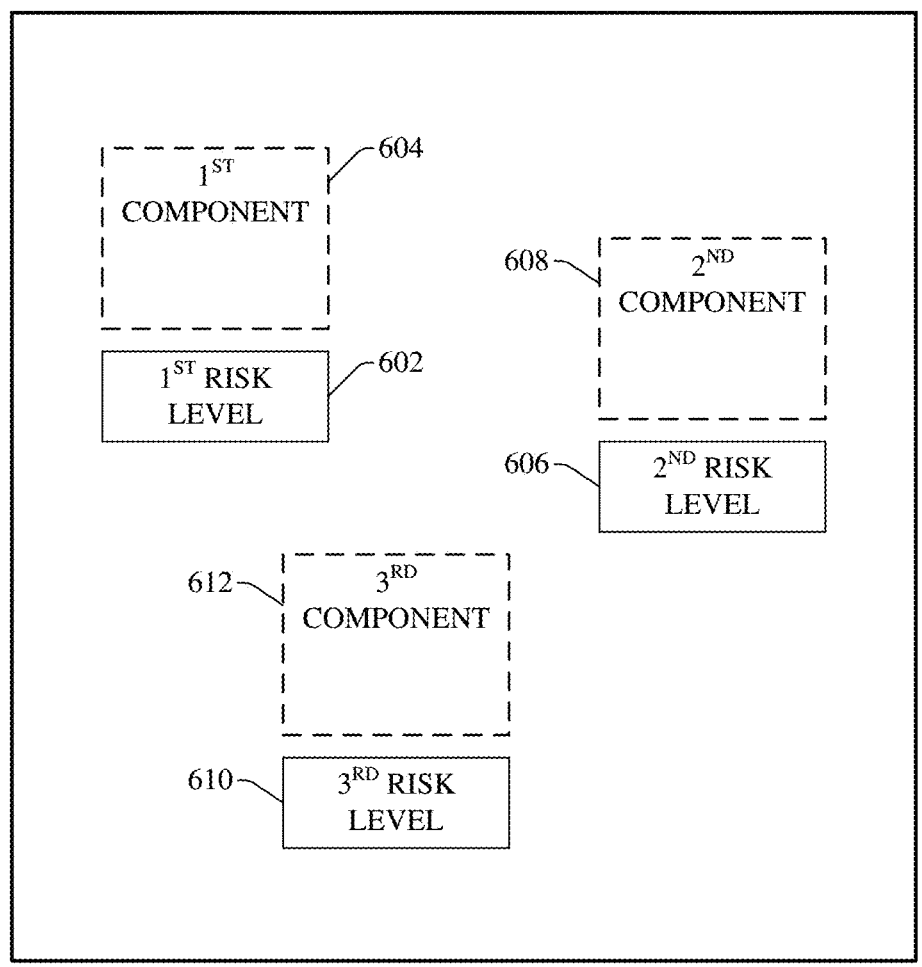
FIG. 6 presents a diagram of an example visual presentation that comprises a virtual display that includes respective risk levels of respective components in the field of view of the user through the ARD, in accordance with various aspects and embodiments of the disclosed subject matter.

Referring briefly to FIG. 6 (along with FIG. 1), FIG. 6 presents a diagram of an example visual presentation 600 that comprises a virtual display that includes respective risk levels of respective components in the field of view of the user through the ARD 102, in accordance with various aspects and embodiments of the disclosed subject matter. The IMC 108 can generate the visual presentation 600 comprising the virtual display, which can include respective risk levels of respective components in the field of view of the user, based at least in part on the sensor data and/or other data, as more fully described herein.

In this example visual presentation 600, the virtual display can comprise a first risk level 602 associated with a first component 604, a second risk level 606 associated with a second component 608, and a third risk level 610 associated with a third component 612. The first risk level 602, the second risk level 606, and the third risk level 610 can have respective risk level values, as determined by the IMC 108. It is to be appreciated and understood that, while the visual presentation 600 depicts three risk levels respectively associated with three components, such example merely included three risk levels and three components for reasons of brevity and clarity, and the visual presentation 600 can include virtually any desired number of risk levels associated with respective components, based at least in part on the number of components in the field of view of the user of the ARD 102, wherein the number of risk levels can be three, more than three, or less than three.

The IMC 108 can position or locate the first risk level 602 in the visual presentation 600, presented via the display screen of the interface component 106, to the user to have the first risk level 602 appear in proximity to the actual first component 604 as the user views the actual first component 604 through the lens component of the ARD 102. Similarly, the IMC 108 can position or locate the second risk level 606 in the visual presentation 600, presented via the display screen of the interface component 106, to the user to have the second risk level 606 appear in proximity to the actual second component 608 as the user views the actual second component 608 through the lens component of the ARD 102; and the IMC 108 can position or locate the third risk level 610 in the visual presentation 600, presented via the display screen of the interface component 106, to the user to have the third risk level 610 appear in proximity to the actual third component 612 as the user views the actual third component 612 through the lens component of the ARD 102.

To facilitate determining the wear or stress levels associated with components, determining respective risk levels of respective components, and/or determining whether components are to be replaced, be repaired, or have maintenance performed on such components, the IMC 108 can identify and/or obtain statistics regarding how often respective components are or were activated, on/off cycles of a relay over its lifetime vs. the rating of a relay with regard to on/off cycles, voltage, thermal, and/or current range history for a given node, and/or other statistics (e.g., other current or historical operational data) associated with respective components. The IMC 108 can obtain such statistics from the data store 114 and/or another data source(s) (e.g., a database(s)).

The IMC 108 can facilitate presenting, via the interface component 106, such statistics to the user for the user to review or analyze to enable the user to facilitate determining the wear or stress levels associated with components and/or determining whether components are to be replaced, be repaired, or have maintenance performed on such components. Additionally or alternatively, the IMC 108 can analyze such statistics, and, based at least in part on the analysis results, can determine the respective wear or stress levels associated with respective components and/or determine whether respective components are to be replaced, be repaired, or have maintenance performed on such components.

Yet another issue that can arise in connection with performing maintenance work on equipment can relate to determining which cabinet in a plant or which part in a system (e.g., industrial automation system) contains a serviceable part. Determining which cabinet in a plant and/or which part in a system contains a serviceable part can be prone to mistakes, particularly when there are many similar cabinets in the plant or many similar parts in the system.

To facilitate determining which cabinet in a plant or which part (e.g., component or other portion) in a system contains a serviceable part, the sensor component 104 of the ARD 102 can employ one or more sensors that can sense the location and/or orientation of the user and/or the location and/or orientation of equipment (e.g., cabinet, device, unit, . . . ), as more fully described herein. The sensors of the sensor component 104 can employ the location sensor (e.g., 206) (e.g., GPS) and/or the orientation sensor (e.g., 208) to facilitate sensing the location and/or orientation of the user and/or the location and/or orientation of the equipment. The image capture component 202, scanner component 210, recognition component 212, and/or another sensor(s) 216 of the sensor component 104 can be employed to capture images of parts (e.g., capture identification information (e.g., part code) on a part), scan respective part codes (e.g., scan a bar code) associated with respective parts, perform object recognition on parts to facilitate identifying or recognizing respective parts or respective part codes associated therewith, and/or other sensing to generate sensor data that can facilitate identifying parts in a plant or system.

The IMC 108 can analyze the sensor data and/or other data, wherein the other data can be obtained from the data store 114 or another data source(s) (e.g., database(s)). Based at least in part on the results of the such data analysis, the IMC 108 can identify respective parts, identify respective locations and/or orientations of respective parts, determine respective parts that are serviceable, and determine (e.g., make a positive determination regarding) whether a particular cabinet or particular portion of a system contains a serviceable part.

The IMC 108 can facilitate presenting, via the interface component 106, customized information (e.g., augmented and/or virtual reality information) to the user to notify or indicate to the user regarding which parts are serviceable parts, which cabinet or portion of the system contains a serviceable part, the location and/or orientation of the user, the location and/or orientation of the cabinet or portion of the system that contains the serviceable part, and/or other pertinent information. The customized information can be presented as visual information (e.g., image of the serviceable part, part code of the part, travel route to the part, . . . ) via display screen of the display component 302, as audio information (e.g., part code of the part, travel route to the part, . . . ) via a speaker of the audio component 304, and/or as haptic feedback via the haptic component 306 (e.g., ARD 102 can emit haptic feedback to the user when the user is in proximity to the serviceable part and/or associated cabinet or system portion).

To guide the user to the serviceable part, the customized information also can comprise a travel route from the user's current location to the location of the cabinet or portion of the system that contains a serviceable part. The customized information further can include identification information (e.g., image of the part, part code of the part, visual indicator that highlights the part on the display screen, . . . ) that can identify the serviceable part to the user, so that the user can recognize the part when the user sees it (e.g., inside or on the cabinet, or inside or on a component or device associated with the system portion) and can distinguish it from other parts.

The customized also can comprise cabinet or system portion identification information (e.g., image of the cabinet or system portion, identifier or code that identifies the cabinet or system portion, visual indicator that highlights the cabinet or system portion on the display screen, . . . ) that can identify the cabinet or system portion that contains the serviceable part to the user, so that the user can recognize the cabinet or system portion when the user sees it.

As disclosed herein, other aspects, embodiments, and techniques relating to using the ARD 102 to assist in (e.g., to perform or facilitate performing (e.g., enabling or enhancing performance of) maintenance-related activities or tasks can comprise the same or similar aspects, embodiments, and techniques relating to using the ARD 102 to assist in (e.g., to perform or facilitate performing (e.g., enabling or enhancing performance of) assembly-related activities or tasks, as more fully described herein.

The ARD 102 also can similarly be used for enhancing design of industrial machines and systems as well as HMI design activities (e.g., industrial and HMI design assistance). Various problems may arise during industrial machine and HMI design. For example, keeping track of multiple layers of data regarding parts (e.g., electrical nodes, connection points, input/output (I/O) points, ducts, gears, pumps, buttons, . . . ) during machine design and HMI design can be overwhelming and/or burdensome to users, and can be prone to error by users. The looking up of data also can be time consuming and burdensome. As another example, determining reliability of a design by keeping components within manufacturer's guidelines can be time consuming and unintuitive. As yet another example, determining functional safety can be done, in part, by considering what-if scenarios at each node and part. This can be undesirably (e.g., exceedingly) time consuming and unintuitive. As still another example, visualizing thermal and crosstalk issues at a system level can be difficult. Further, in attempting to fit all pertinent information and control on a physical HMI screen, it can be difficult to maintain viable and/or readable sizes of the information. Moreover, communicating system hazards, warnings, and tips to end users often can be limited by having to use undesirably small labels and user manuals.

In accordance with various implementations, with the user (e.g., operator) interacting with or wearing the ARD 102, the ARD 102 can assist the user in a number of ways, such as disclosed herein, to improve speed of the user and of the design of industrial machines or systems and/or design of HMIs, quality of design of industrial machines or systems and/or design of HMIs, security of design of industrial machines or systems and/or design of HMIs, and safety of the design of industrial machines or systems and/or design of HMIs. The ARD 102 can advise or instruct the user through visual signals, audible signals, and/or haptic feedback to facilitate enhancing the design process (e.g., enhancing, the speed, quality, security, and safety associated with the design process).

As stated, keeping track of multiple layers of data regarding parts (e.g., electrical nodes, wires, connection points, I/O points, ducts, gears, pumps, buttons, . . . ) during machine design and HMI design potentially can be overwhelming or burdensome, and can be prone to error. Further, it can be undesirably time consuming for a user to have to look up data in connection with machine design or HMI design.

To overcome these and other issues, the IMC 108 of the ARD 102 can determine, generate, and provide multiple layers of data about any point (e.g., device) of a system (e.g., industrial automation system) by presenting the information regarding or relating to such device of the system. The IMC 108 can keep track of multiple layers of data regarding respective parts (e.g., electrical nodes, wires, connection points, I/O points, ducts, gears, pumps, buttons, . . . ) during machine design and HMI design. The IMC 108 can determine and generate, and can facilitate presenting to the user (e.g., designer), via the display screen of the ARD 102, desired information (e.g., enhanced information) regarding devices, wires, I/O points, etc., of a system, wherein the ARD 102 can overlay the desired (e.g., enhanced) information on the actual/live scene being perceived by the user through the lens component of the ARD 102.

The IMC 108 can receive or obtain data (e.g., identification data, configuration data, current and/or historical operational data, data relating to conditions, specifications, user manuals, warning data or indicators, . . . ) regarding respective devices, nodes, components, wires, or points of the system from sensors of the sensor component 104 and/or other data obtained from the data store 114 or other sources (e.g., external databases). To access and view data regarding a particular device (or node, component, wire, or point of the system), the user can select the particular device (or node, component, wire, or point of the system), for example, by viewing the particular device via the live view (e.g., via the lens component) of the ARD 102 and/or via some other technique of selecting the device (e.g., making a hand gesture that can be captured by the image capture component 202 to select the device; issuing a voice command to the ARD 102, via the audio sensor component 204, to select the device; or selecting a control on the ARD 102, via the key/control component 308). In response, the IMC 108 can identify and facilitate presenting, via the interface component 106 (e.g., via the display screen of the interface component 106), at least a portion of the data (e.g., device identification data, summary of the data, current data, most pertinent data, and/or warning data, . . . ) associated with the particular device. It is to be appreciated and understood that, while the example embodiments relate to accessing and viewing data associated with a particular device, the user can employ the ARD 102 to access and view desired data with regard to any device, node, component, wire, or point of the system.

As desired, the user can select which additional information (e.g., regarding the particular device or the system) that the user wants to view (e.g., on the display screen of the ARD 102) using, for example, verbal instructions issued to the ARD 102, via the audio sensor component 204, or using defined gestures (e.g., hand, eye, or facial gestures) that can be captured by the image capture component 202. Such information associated with the particular device can include, for example, tag names at each I/O point in the design, configuration information regarding components, parts, or points, of the system, voltages (e.g., in numerical format, oscilloscope format, heat-map format, . . . ), frequencies, Internet Protocol (IP) addresses, flow rate, datasheets, schematic diagrams, ladder diagrams, CAD drawings, range of setpoints, expected values, or possible (e.g., historical) values for a given node, and/or other items of data of the portion of the data, etc.

For instance, the user can make a first type of hand gesture to select an item(s) of the data associated with the particular device for viewing. The image capture component 202 can capture that first type of hand gesture. In response to the first type of hand gesture, the IMC 108 can identify and/or obtain the item(s) of the data and can facilitate presenting, via the display screen of the interface component 106 (and/or via the audio component 304), the selected item(s) of the data to the user for viewing. As desired, the user can make a second type of hand gesture to drill down and select more detailed data associated with the particular device for viewing (e.g., drill down from one layer of data to another layer(s) of data). The image capture component 202 can capture that second type of hand gesture. In response to the second type of hand gesture, the IMC 108 can identify and/or obtain the more detailed data and can facilitate presenting, via the display screen of the interface component 106 (and/or via the audio component 304), the more detailed data to the user for viewing.

Another issue that can arise is that determining reliability of a machine design or HMI design by maintaining components within manufacturer's guidelines can be time consuming and unintuitive. The disclosed subject matter can overcome these and other problems relating to machine design and HMI design.

The IMC 108 of the ARD 102 can access design documents and manufacturer datasheets associated with a system (e.g., devices, processes, assets, . . . , of the system). The IMC 108 also can receive sensor data from the sensors of the sensor component 104, wherein the sensor data can relate to conditions, parameters, device or process configurations, interrelationships between devices or nodes, and/or other features of the system. For instance, the sensor component 104, another device, and/or the user(s) can perform live measurements of conditions and parameters associated with devices, processes, and/or assets, etc., of the system (e.g., industrial automation system), wherein the data relating to the live measurements can be received by the IMC 108.

The IMC 108 can analyze the data obtained from the design documents and manufacturer datasheets, the sensor data, and/or live measurement data associated with the system. Based at least in part on the data (e.g., raw data) and/or the results of analyzing the data, the IMC 108 can generate a visual presentation, comprising a color enhancement, and/or other visual cues (e.g., visual indicators) that can report and indicate which devices within the user's field of view through the lens component of the ARD 102, or otherwise in proximity to the user, are determined to be close to or are exceeding manufacturer ratings, other pertinent threshold values (e.g., pertinent threshold ratings), and/or other attributes of the devices of the system. The IMC 108 can facilitate presenting (e.g., overlaying), via the display screen of the interface component 106, the visual presentation, comprising the color enhancement relating to the devices, to the user, wherein the user can view the information in the visual presentation on the display screen as the user perceives the devices in the user's field of view through the lens component of the ARD 102.

Figure 7:
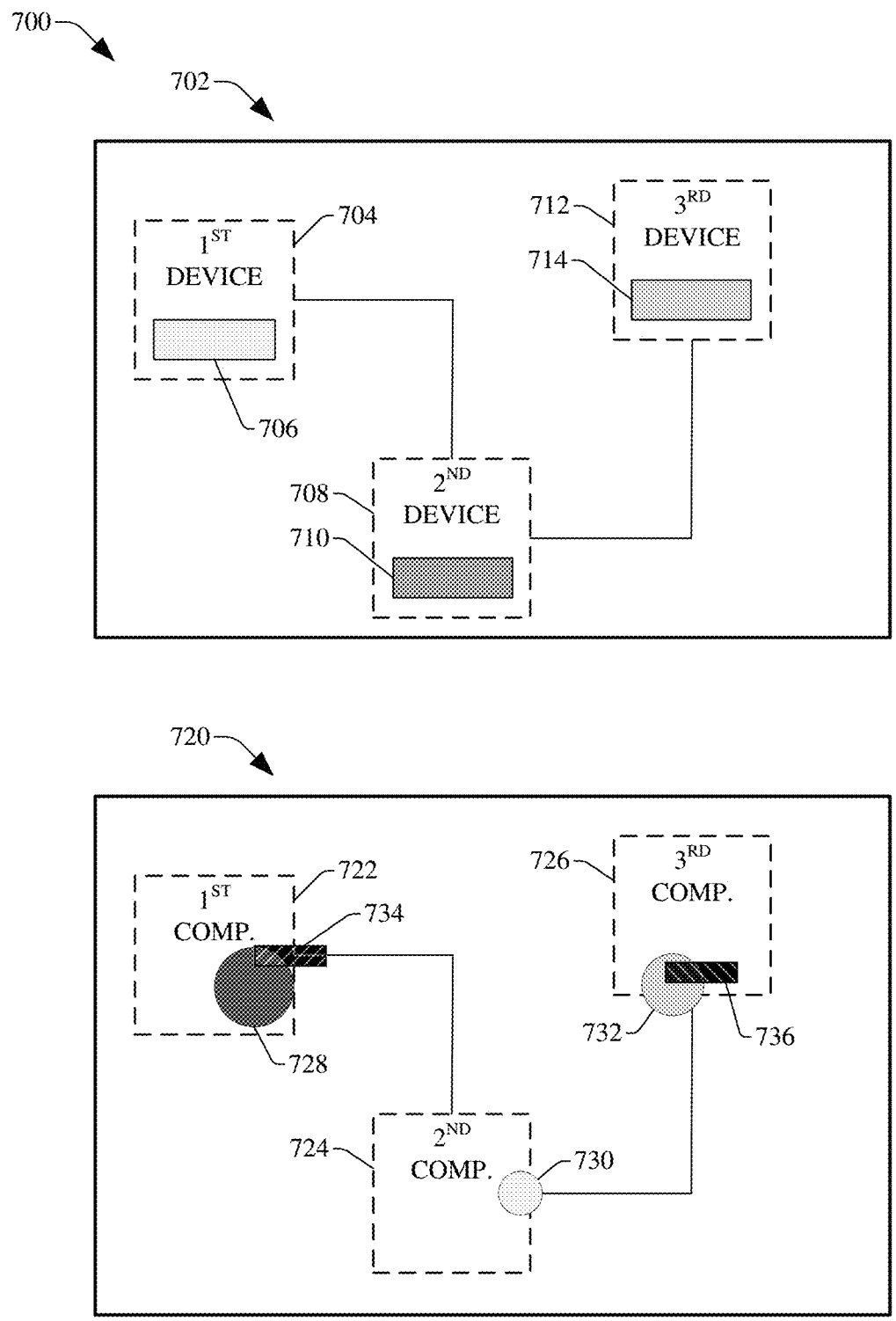
FIG. 7 depicts a diagram of various example visual presentations comprising data and/or visual indicators relating to components of a system that are in the field of view of (or otherwise in proximity to) the user through the ARD, in accordance with various aspects and embodiments of the disclosed subject matter.

Referring to FIG. 7 (along with FIG. 1), FIG. 7 depicts a diagram of various example visual presentations 700 comprising data (e.g., pertinent data) and/or visual indicators relating to components (e.g., devices, nodes, connections, . . . ) of a system that are in the field of view of (or otherwise in proximity to) the user through the ARD 102, in accordance with various aspects and embodiments of the disclosed subject matter. The example visual presentations 700 can comprise, for example visual presentation 702 that can comprise a color enhancement and/or other visual cues (e.g., visual indicators) relating to devices of a system that are in the field of view of (or otherwise in proximity to) the user through the ARD 102, in accordance with various aspects and embodiments of the disclosed subject matter. The IMC 108 can generate the visual presentation 702, based at least in part on the results of analyzing the sensor data and/or the other data, in accordance with the defined information management data and/or preferences of a user, as more fully described herein.

If, for example, the IMC 108 determines that a first device 704 is or has been close to exceeding a manufacturing rating or another pertinent threshold value associated with the first device 704, the IMC 108 can utilize apply a first color enhancement or visual cue 706 having a first color (e.g., yellow) to indicate that the first device 704 is or has been close to exceeding the manufacturing rating or other pertinent threshold value associated with the first device 704. As the user perceives the first device 704 (e.g., the actual first device) in the user's field of view through the lens component of the ARD 102, the IMC 108 can facilitate presenting, via the display screen of the interface component 106, the first color enhancement or visual cue 706 having the first color over or in proximity to the first device 704 in the field of view of the user.

As another example, if the IMC 108 determines that a second device 708 (e.g., in the user's field of view) is or has exceeded a particular manufacturing rating or other pertinent threshold value associated with the second device 708, the IMC 108 can utilize apply a second color enhancement or visual cue 710 having a second color (e.g., red) to indicate that the second device 708 is or has exceeded the particular manufacturing rating or other pertinent threshold value associated with the second device 708. As the user perceives the second device 708 (e.g., the actual second device) in the user's field of view through the lens component of the ARD 102, the IMC 108 can facilitate presenting, via the display screen of the interface component 106, the second color enhancement or visual cue 710 having the second color over or in proximity to the second device 708 in the field of view of the user.

As still another example, if the IMC 108 determines that a third device 712 (e.g., in the user's field of view) has not been close to exceeding and has not exceeded a particular manufacturing rating or other pertinent threshold value associated with (e.g., applicable to) the third device 712, the IMC 108 can utilize apply a third color enhancement or visual cue 714 having a third color (e.g., green) to indicate that the third device 712 has not been close to exceeding and has not exceeded the particular manufacturing rating or other pertinent threshold value associated with the third device 712. As the user perceives the third device 712 (e.g., the actual third device) in the user's field of view through the lens component of the ARD 102, the IMC 108 can facilitate presenting, via the display screen of the interface component 106, the third color enhancement or visual cue 714 having the third color over or in proximity to the third device 712 in the field of view of the user.

The ARD 102, by generating and presenting the visual presentation 702, can thereby enable the user to quickly visualize the respective attributes of respective devices of the system. This can lead to or result in improving the reliability and lifetime of the devices of the system. It is to be appreciated and understood that, while the above example visual presentation 702 utilizes three particular colors with respect to three different types of conditions associated with three devices, the disclosed subject matter is not so limited. For instance, the IMC 108 can determine and generate visual presentations comprising color enhancements that can employ a higher level of granularity with regard to respective conditions or attributes of respective devices of a system, including employing more and/or different colors, more and/or different shades of colors, other types of visual indicators besides or in addition to colors, and/or can provide data in desired detail or can facilitate enabling the user to drill down into the visual presentation 702 (e.g., by selecting a device) to obtain additional data (e.g., other data layers comprising other data), in accordance with the defined information management data and/or preferences of a user.

With regard to derating and reliability, the IMC 108 of the ARD 102 also can compare these factors (e.g., manufacturing ratings, other pertinent threshold values, and/or other attributes) associated with devices of the system to respective corporate or industry derating guidelines relating to the devices. For instance, the IMC 108 can compare the statistics (e.g., voltage, frequency, current, load, flow, . . . ) associated with the devices (or nodes, components, points, . . . ) of the system to manufacturing datasheets and engineering (e.g., good-engineering) or corporate derating guidelines. The IMC 108 can determine differences between the factors associated with the respective devices and the respective corporate or industry (e.g., engineering) derating guidelines relating to the respective devices, based at least in part on the results of the comparison, wherein the comparison results can relate to derating and reliability associated with the system. The IMC 108 can facilitate presenting, to the user, via the display screen of the ARD 102, the comparison results relating to derating and reliability associated with the system.

The IMC 108 also can determine respective color enhancements or visual cues for respective ratings, threshold values, and/or other attributes associated with respective devices of the system based at least in part the respective corporate or industry derating guidelines relating to the respective devices. The IMC 108 can facilitate presenting, via the display screen of the interface component 106 the respective color enhancements or visual cues associated with respective devices with respect to the respective corporate or industry derating guidelines, in proximity to (e.g., alongside of) the other color enhancements or visual cues (e.g., 706, 710, 714) associated with the devices, or in a separate visual presentation, wherein the user can select (e.g., using gestures, verbal commands, textual or control commands) between presentation of the respective visual presentations, or respective portions (e.g., on a device basis) thereof, on the display screen in the field of view of the user.

Another problem that can arise can relate to what-if scenarios in connection with a machine design or HMI design. For instance, determining functional safety can be done, in part, by considering what-if scenarios at each node and part. However, this can be undesirably time consuming and unintuitive. The disclosed subject matter can overcome these and other issues relating to machine design or HMI design.

In some implementations, the user, using the ARD 102, can select one or more nodes, or all nodes (and parts), on which the IMC 108 can perform what-if scenarios (e.g., safety what-if scenarios) to check the functional safety of the design of the system. The user can use the ARD 102 to test various desired attributes or conditions associated with the design of the system, wherein the desired attributes or conditions can comprise, for example, overvoltage, overcurrent, fail open, fail closed, overheat, stuck bit, etc., associated with a node or part of the system. The IMC 108 can maintain data to track what was tested with regard to the nodes or part of the system by the ARD 102, and what portions (e.g., other nodes or parts) of the system remain to tested on a checklist (e.g., a virtual checklist matrix).

The IMC 108 can analyze the data obtained from the design documents and manufacturer datasheets, the sensor data, and/or live measurement data associated with the system. Based at least in part on the data (e.g., raw data) and/or the results of analyzing the data, the IMC 108 can generate what-if scenarios (e.g., safety what-if scenarios) performed on selected nodes of the system. The IMC 108 can facilitate presenting, to the user, via the display screen of the interface component 106, scenario result information regarding the results of the what-if scenarios performed on the selected nodes of the system, in accordance with the defined information management criteria and/or user preferences.

The IMC 108 also can determine possible or potential what-if scenarios associated with respective nodes of the system. The IMC 108 can maintain and track a list of the possible or potential what-if scenarios associated with certain respective nodes, and can facilitate presenting, to the user, via the display screen of the interface component 106, the list (e.g., hovering or virtual checklist) of the possible or potential what-if scenarios associated with respective nodes. The possible or potential what-if scenarios associated with respective nodes can be or relate to, for example, an overvoltage condition, an overcurrent condition, a fail open condition, a fail closed condition, an overheat condition, a stuck bit, and/or another condition(s) associated with the respective nodes.

The IMC 108 of the ARD 102 also can compare such what-if scenario factors (e.g., scenario results) or conditions to applicable corporate or industry derating guidelines associated with respective devices or nodes. The IMC 108 can determine differences between the what-if scenario factors or conditions associated with the respective nodes or devices and the respective corporate or industry derating guidelines relating to the respective nodes or devices, based at least in part on the results of the comparison. Based at least in part on the comparison results, the IMC 108 can generate and facilitate presenting, via the display screen of the interface component 106, a visual presentation that can comprise the results of the comparison of the what-if scenario factors or conditions associated with the respective nodes or devices with the respective corporate or industry derating guidelines associated with the respective nodes or devices.

By employing the disclosed techniques and features, the ARD 102 can thereby assist the user in intuitively visualizing the system (e.g., the device and nodes of the system) and data relating to the system, while the ARD 102 can perform the what-if scenarios and can maintain data that can track the completeness of the analysis of data (e.g., on a virtual checklist), including the results of what-if scenarios, and/or what portions of the system remain to be tested or evaluated (e.g., by performing a what-if scenario), in the data store 114 or on another device (e.g., a computer, a server, an external data store, . . . ) associated with (e.g., communicatively connected to) the ARD 102 (e.g., via a wireless or wireline communication connection).

In connection with the what-if scenarios, the user of the ARD 102 can employ the ARD 102 to make various adjustments to a system, perform various tests, or perform other desired tasks. For instance, the user can use the ARD 102 to manipulate a virtual component (e.g., an as-yet-unplaced virtual component) associated with the system to facilitate determining a desired (e.g., enhanced, optimal, suitable, or acceptable) placement of the virtual component in relation to other portions (e.g., node, wire, connection, I/O point, . . . ) of the system with respect to wire length, thermal considerations, crosstalk, or other desired attributes or characteristics, in accordance with the defined information management criteria and defined design criteria. The virtual component can correspond to (e.g., model) an actual component of the system. The user can employ hand gestures, voice commands, or text or control commands, for example, which can be received or detected by the ARD 102, as disclosed herein, to facilitate manipulating the placement of the virtual component.

In response to the manipulation of the virtual component to adjust the placement of the virtual component by the user, the IMC 108 can perform tests (e.g., what-if scenarios) on desired (e.g., selected) or relevant nodes or points of the system to facilitate determining whether the new (e.g., adjusted) placement is desirable (e.g., enhanced, optimal, suitable, or acceptable). If, based at least in part on the test results, the new placement of the virtual component is desirable, as determined by the user or the IMC 108, the user can use the ARD 102 to select the new placement of the virtual component for the design. If, based at least in part on the test results, the new placement of the virtual component is not desirable, as determined by the user or the IMC 108, the user can use the ARD 102 to manipulate the virtual component to adjust the placement of the virtual component, wherein desired testing can be performed by the IMC 108 based on the new placement.

As an example, the user can use the ARD 102 to manipulate placement of a virtual fan, corresponding (e.g., modeling) an actual fan of the system, and virtual fan speed (e.g., corresponding to actual fan speed), to achieve a desirable (e.g., enhanced, optimal, suitable, or acceptable) heat flow with regard to a system. The ARD 102 can be employed to perform testing and/or further adjustments to placement of the virtual fan and/or fan speed, based at least in part on test results, to facilitate determining a desired placement of the virtual fan in the system and a desired fan speed, in accordance with the defined information management criteria and defined design criteria.

As another example, the user can utilize the ARD 102 to test one or more components of the system by forcing or toggling states using one or more virtual controls generated by the IMC 108 or another device, which can provide the one or more virtual controls to the ARD 102. For instance, the IMC 108 can generate one or more virtual controls for a system, based at least in part on the results of analyzing data, such as sensor data received from the sensor component 104 and/or other data relating to the system or controls obtained from the data store 114 or another data source(s) by the IMC 108. The user and/or the IMC 108 can manipulate the one or more virtual controls to force or toggle states of one or more components of the system to obtain test results relating to the response of the one or more components to such control manipulations. The test results can be used by the user or IMC 108 to facilitate determining whether modifications are to be made to the one or more components with respect to the design.

Yet another issue that can arise in connection with machine design or HMI design can relate to thermal and crosstalk issues associated with a design. For instance, visualizing thermal and crosstalk issues at a system level can be difficult for users. The disclosed subject matter, employing the ARD 102, can mitigate or overcome issues relating to thermal and crosstalk issues and/or other problems associated with machine design or HMI design.

As disclosed herein, the ARD 102 can be utilized to generate and present (e.g., in real time or substantially real time) visual presentations that can include color or other visual enhancements (e.g., a color-coded heat map) that can visualize temperatures (e.g., IR temperatures of various portions of the system obtained using the temperature sensor and/or the image capture component 202 and translated to visible, visual depictions or indicators) of a system, as perceived through the sensor component 104 of the ARD 102. By being able to correlate the system in real time, or at least substantially real time, and multi-dimensional (e.g., 3-D) viewing (e.g., via the heat map), the ARD 102 can make it easier for the user to understand and correct issues (e.g., temperature issues, unacceptable component operation, and/or abnormal parameters, . . . ) relating to components (e.g., devices, connections, wires, . . . ) of the system.

The ARD 102 also can extend these aspects, as the ARD 102 also can visualize high frequencies, high current, and/or other physical (but invisible) attributes associated with components of the system that can cause crosstalk or mutual interference between components of the system. For instance, the IMC 108 can receive sensor data from sensors of the sensor component 104 and/or other data from the data store 114 or another data source(s). The IMC 108 can analyze the sensor data and/or the other data. Based at least in part on the results of the analysis, the IMC 108 can determine respective temperatures associated with respective components (e.g., devices, connections, wires, . . . ) of the system, including components (e.g., internal components of a cabinet) that are not readily visible to the user, and can translate the respective temperatures to respective visual representations or indicators, in accordance with the defined information management criteria and/or user preferences.

Further, based at least in part on the results of the analysis, the IMC 108 can determine respective frequencies, current, and/or other physical attributes (including attributes that are not visible) associated with the respective components (e.g., devices, connections, wires, . . . ) of the system, including components (e.g., internal components of a cabinet) that are not readily visible to the user. The IMC 108 can translate the respective frequencies, current, and/or other physical attributes associated with the respective components to respective visual representations or indicators, in accordance with the defined information management criteria and/or user preferences. The IMC 108 can generate a visual presentation that can comprise a heat map and/or a crosstalk and interference map, based at least in part on the respective visual representations or indicators relating to the temperatures and/or the respective visual representations or indicators relating to the respective frequencies, current, and/or other physical attributes. For instance, the heat map can depict respective visual representations or indicators associated with the respective components of the system, and the crosstalk and interference map can depict respective visual representations or indicators associated with the respective frequencies, current, and/or other physical attributes associated with the respective components.

The IMC 108 can position the various respective visual representations or indicators in the visual presentation such that, when displayed on the display screen, the various respective visual representations or indicators can be overlaid and displayed in proximity to the actual components of the system in the field of view of the user as the user views the actual components through the lens component of the ARD 102. In some implementations, the IMC 108 can facilitate presenting the heat map and the crosstalk and interference map on the display screen simultaneously (e.g., when in accordance with the defined information management criteria and/or user preferences). In other implementations, the IMC 108 can facilitate presenting the heat map and the crosstalk and interference map on the display screen separately at different instances, as the respective maps are selected by the user, for example, via hand gestures, voice commands, or control or key commands (e.g., when in accordance with the defined information management criteria and/or user preferences). As the user moves and the user's field of view is changed accordingly, and/or if conditions associated with the components of the system change, the IMC 108 can update (e.g., modify in real time or substantially real time) the heat map and/or the crosstalk and interference map to account for and reflect the changes in the user's field or view and/or the change in conditions of the components.

The visual representations or indicators of the heat map can be similar to the visual representations or indicators employed in the heat map 504 of FIG. 5. The visual representations or indicators relating to the respective frequencies, current, and/or other physical attributes associated with the respective components that are presented in the crosstalk and interference map can be relatively similar in some ways to the visual representations or indicators employed for the heat map, but can be different overall to facilitate differentiating between the visual representations or indicators used in the heat map from the visual representations or indicators used in the crosstalk and interference map. For example, the visual representations or indicators used in the crosstalk and interference map can use different colors (or no color), different markings (e.g., a region with a particular (e.g., unique) line pattern running across the region, wherein the region can have a particular color or no color), different sizes (e.g., a visual representation relating to temperature can cover a region having a first size associated with that temperature, and a visual representation relating to frequencies, current, and/or other physical attributes can have a different (e.g., smaller) size that is sufficient to point out the component associated with such visual representation, without obstructing the visual representation relating to temperature), and/or other different characteristics.

Referring again briefly to FIG. 7 (along with FIG. 1), FIG. 7 further comprises example visual presentation 720 that can comprise a heat map and a crosstalk and interference map associated with the system, in accordance with various aspects and embodiments of the disclosed subject matter. As depicted in the visual presentation 720 (e.g., in the field of view of the user), the visual presentation 720 can comprise a first component (comp.) 722, second component 724, and third component 726, which can be arranged in relation to each other and/or connected to each other, in accordance with the design. With respect to the heat map portion of the visual presentation 720, the IMC 108 can facilitate presenting a first visual representation or indicator 728 having a first color (e.g., red) to represent a high temperature region associated with the first component 722, a second visual representation or indicator 730 having a second color (e.g., yellow) to represent a moderate temperature region associated with the second component 724, and a third visual representation or indicator 732 having a third color (e.g., blue) to represent a relatively cooler temperature region associated with the third component 726. The respective temperatures of the heat map can be determined by the IMC 108, based at least in part on data analysis results, as disclosed herein. Other temperature regions of the field of view have been omitted for reasons of brevity and clarity.

With respect to the crosstalk and interference map portion of the visual presentation 720, the IMC 108 can facilitate presenting a fourth visual representation or indicator 734 having a first pattern to represent a region having a high current associated with the first component 722, and a fifth visual representation or indicator 736 having a second pattern to represent another region having a high current associated with the second component 724. The IMC 108 can determine the high frequency region and the high current region, based at least in part on data analysis results, as disclosed herein. As depicted in the visual presentation 720, the visual representations or indicators (e.g., 728, 730, 732) associated with the heat map portion can be of a different type than the visual representations or indicators (e.g., 734, 736) associated with the crosstalk and interference map portion of the visual presentation 720. This can facilitate enabling the user to differentiate between the different types of visual representations or indicators and corresponding data.

In some implementations, the IMC 108 can employ different visual representations or indicators for different attributes (e.g., frequencies, current, other physical attributes). In certain implementations, the IMC 108 can determine and generate the heat map and/or the crosstalk and interference map such that respective visual representations or indicators presented in the respective maps can be limited to present only those respective visual representations or indicators that are a problem or potentially a problem (e.g., satisfy (e.g., meet or exceed) a defined temperature threshold level, satisfy a defined threshold relating to crosstalk or interference). This can facilitate the presentation of what is typically more pertinent information, without overwhelming the user with too much information (e.g., information regarding components that are at room temperature or other temperature that is not noteworthy, or information regarding components for which there is little or no risk of crosstalk or interference).

In still other implementations, the IMC 108 can generate and facilitate presenting different crosstalk and interference maps, based at least in part on different attributes associated with the respective components of the system, in accordance with the defined information management criteria and/or user preferences of the user. For example, the IMC 108 can generate and facilitate presenting a first crosstalk and interference map, based at least in part on a first attribute (e.g., frequencies), and a second crosstalk and interference map, based at least in part on a second attribute (e.g., current levels).

With further regard to the crosstalk and interference map, the ARD 102, by presenting the visual presentation, comprising the crosstalk and interference map that can visualize the respective frequencies, current, and/or other physical attributes associated with the respective components of the system, can enable the user viewing such map to identify and make decisions regarding high frequencies, high current, and/or other physical (but potentially invisible) attributes that can cause or potentially cause unacceptable cross talk or mutual interference issues.

Another potential issue that can arise in connection with machine design or HMI design can relate to putting a significant amount of data on a display screen. For example, when fitting or attempting to fit all pertinent information and control on a physical HMI screen, it may be difficult to maintain viable and/or readable sizes that can be ascertained or readily ascertained by a user.

The user can use the ARD 102 to facilitate identifying components, I/O points, etc., associated with the system by using the ARD 102 to focus and select the components, I/O points, etc. This can make it is relatively easier for the user of the ARD 102 to construct a logic routine and also HMI screens that can use them and/or other features or components of a machine or HMI design.

For instance, the IMC 108 can analyze sensor data relating to sensed conditions associated with the system from the sensor component 104 and/or other data relating to the system from the data store 114 or another data source(s). The IMC 108 can determine customized information, comprising augmented and/or reality information, that can include a virtual representation of the components, I/O points, etc., of the system (e.g., virtual components, virtual I/O points, etc., of the system), based at least in part on the results of the analysis of the sensor data and/or other data. The IMC 108 also can determine other customized information, comprising other augmented and/or reality information, that can include a virtual representation of HMIs, including virtual HMI components (e.g., measurements, controls, . . . ) associated with the system, based at least in part on the results of the analysis of the sensor data and/or other data.

The IMC 108 can facilitate presenting, to the user, via the display screen of the interface component 106, the customized information that can include the virtual representation of the components, I/O points, etc., of the system. The user can use the ARD 102 to focus, magnify, and/or select desired virtual components, virtual I/O points, and/or other virtual objects of the virtual representation of the system. For example, based at least in part on a hand gesture of the user (e.g., captured by the outward-facing camera of the image capture component 202), focus or movement of the eye of the user (e.g., captured by the inward (user)-facing camera of the image capture component 202), a voice command (e.g., received via the audio sensor component 204), or textual or control command (e.g., received via the key/control component 308), the IMC 108 can determine that the user desires to focus or magnify a portion of the virtual representation of the system, comprising certain virtual components, virtual I/O points, or other virtual objects. In response, the IMC 108 can emphasize and/or magnify the portion of the virtual representation to bring it into enhanced (e.g., sharper) focus, and/or can de-emphasize and/or reduce in size another portion of the virtual representation. In some implementations, the de-emphasizing of the other portion of the virtual representation can comprise a blurring of the other portion of the virtual representation.

Figure 8:
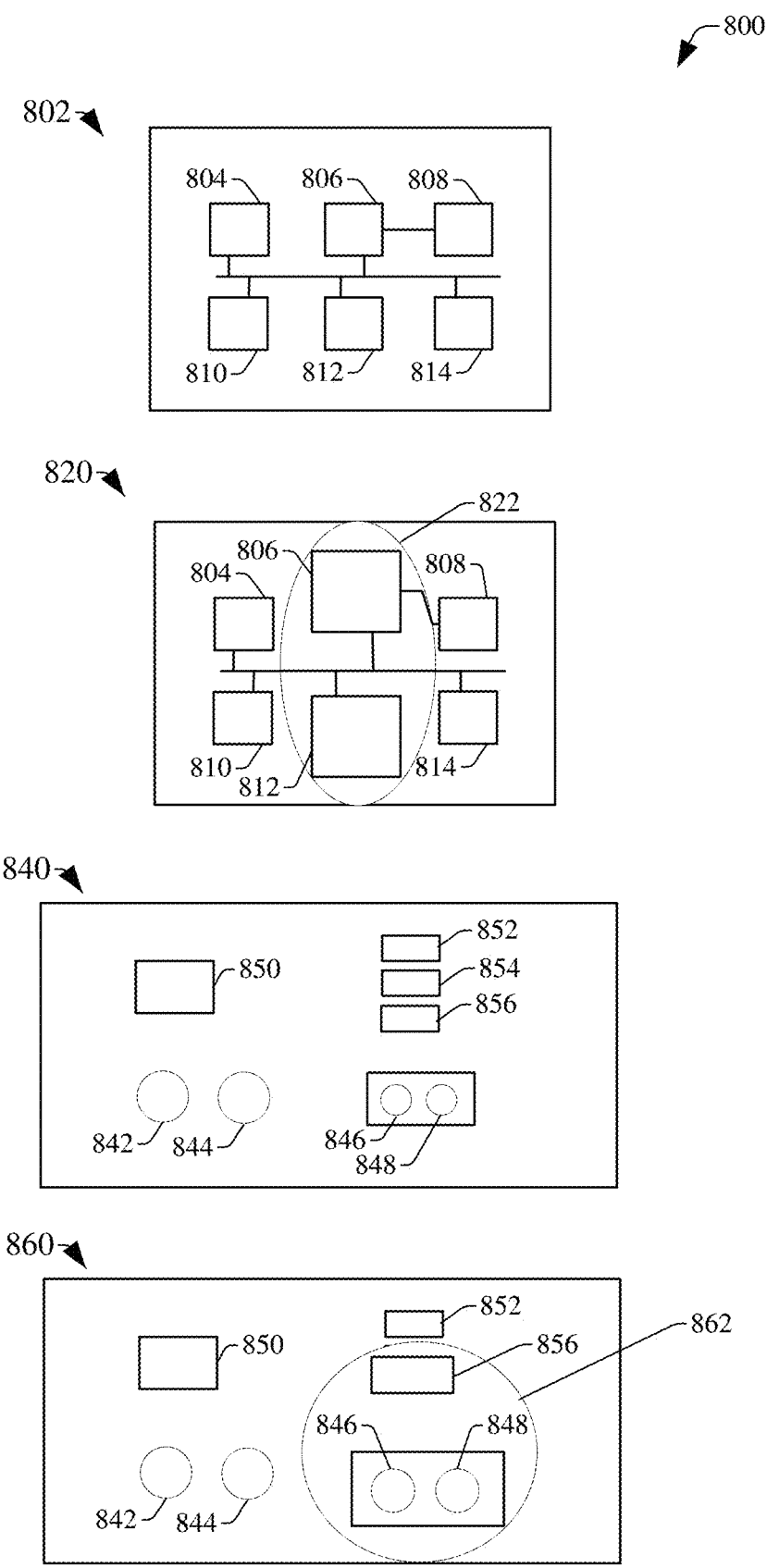
FIG. 8 illustrates a diagram of various example visual presentations that can facilitate enabling a user to identify, focus on, and/or select desired items of data associated with a system, in accordance with various aspects and embodiments of the disclosed subject matter.

Referring to FIG. 8 (along with FIG. 1), FIG. 8 illustrates a diagram of various example visual presentations 800 that can facilitate enabling a user to identify, focus on, and/or select desired items of data (e.g., components, controls, . . . ) associated with a system, in accordance with various aspects and embodiments of the disclosed subject matter. The example visual presentations 800 can comprise, for example visual presentation 802 that can comprise a virtual representation of components, I/O points, etc., of the system (e.g., virtual components, virtual I/O points, etc., of the system), based at least in part on the results of the analysis results. The visual presentation 802 can comprise various example components and I/O points, wherein the components can comprise, for example, components 804, 806, 808, 810, 812, and 814 that can be arranged in relation to each other and/or associated with each other via connections, in accordance with the design.

The user of the ARD 102 may desire to focus on components 806 and 812 for some reason. In accordance with various aspects, in response to a command (e.g., gesture-related command, eye-related command, verbal command, or key or control command) received by the IMC 108 that indicates that the user wants to focus on components 806 and 812, the IMC 108 can modify the visual presentation 802 to generate visual presentation 820 to enhance the focus or emphasis on the components 806 and 812. For instance, as depicted in the visual presentation 820, the components 806 and 812, and associated connections, within the window 822 have been enlarged (e.g., magnified) relative to the other components (e.g., 804, 808, 810, and 812). This can enhance the focus on these components 806 and 812 for the user, enable significantly more information to be displayed in the window 822 (e.g., area of focus), and/or can enable the user to see more details with regard to these components 806 and 812, and their associated connections.

In some implementations, the IMC 108 also can generate a virtual representation of an HMI, including virtual HMI components (e.g., measurements, controls, . . . ) associated with the system, based at least in part on the results of the analysis of the sensor data and/or other data. With further reference to FIG. 8, visual presentation 840 can comprise a virtual HMI that can comprise various virtual components, including various virtual controls and various items of data (e.g., measurement data). The IMC 108 can generate the virtual HMI to have it correspond to an actual (e.g., physical) HMI of the system, wherein the actual HMI can comprise actual components (e.g., actual controls, measurement data) that can correspond to the virtual components of the virtual HMI, and wherein the actual HMI can be associated with (e.g., placed or installed on) a cabinet of the system. The IMC 108 also can connect or facilitate connecting the virtual HMI to the actual HMI to facilitate enabling the user to use the ARD 102 to manipulate the virtual controls of the virtual HMI to correspondingly modify the corresponding actual controls of the actual HMI.

As depicted in the visual presentation 840, the virtual HMI can comprise virtual controls 842, 844, 846, and 848, and items of data 850, 852, 854, and 856, which can be arranged in the virtual HMI to correspond to the arrangement of the actual controls and items of data in the actual HMI. The user of the ARD 102 may desire to focus on virtual controls 846 and 848 (which are smaller in size on the virtual HMI than the other virtual controls 842 and 844) and/or item of data 856, for some desired reason of the user. In accordance with various aspects of the disclosed subject matter, in response to a command (e.g., gesture-related command, eye-related command, verbal command, or key or control command) received by the IMC 108 that indicates that the user wants to focus on virtual controls 846 and 848 and/or the item of data 856, the IMC 108 can modify the visual presentation 840 to generate visual presentation 860 to enhance the focus or emphasis on the virtual controls 846 and 848 and/or the item of data 856. For instance, as depicted in the visual presentation 860, the virtual controls 846 and 848 and the item of data 856, within the window 862 have been enlarged (e.g., magnified) relative to the other virtual controls (e.g., 842, 844) and other items of data (e.g., 850, 852). Further, due to the size of the window 862, the item of data 854 has been obscured and the virtual control has been partially obscured. The enhancing of the virtual controls 846 and 848 and the item of data 856 can enhance the focus on the virtual controls 846 and 848 and the item of data 856 for the user, enable more information to be displayed (and/or be more readable) in the window 862 (e.g., area of focus) with regard to the virtual controls 846 and 848 and the item of data 856, and/or can enable the user to see more details with regard to the virtual controls 846 and 848 and the item of data 856.

The ARD 102, having the ability to place virtual HMI components (e.g., measurements, controls, . . . ) anywhere within the user's field of view as the user perceives the environment via the lens component of the ARD 102, can enable significantly more information to be presented (e.g., displayed) to the user, via the display screen of the interface component 106 of the ARD 102, up to and/or exceeding the entire surface of a cabinet (e.g., the electrical cabinet) where a physical HMI would otherwise have been placed.

Still another potential problem that can be associated with machine design or HMI design can involve the presentation of hazards, warning, tips, or other information to users. For instance, communicating system hazards, warnings, and/or tips to end users often can be limited by having to use undesirably small labels and/or user manuals, which can result in readability issues for end users.

To facilitate addressing and overcoming these and/or other issues, the ARD 102 can be configured to encode warnings, hazard information, and/or tips (e.g., assistance, guidance) into the ARD 102. The IMC 108 can facilitate presenting the warnings, hazard information, and/or tips to the user of the ARD 102 merely in response to the sensor component 104 (e.g., inward-facing camera of the image capture component 202) sensing that the user is viewing the system or components, or portion thereof, through the lens component of the ARD 102 and/or in response to a hand gesture command, verbal command, and/or key or control command received by the ARD 102 from the user.

The warnings, hazard information, tips, and/or other desired information (e.g., pertinent or valuable information) can be encoded into the ARD 102 in text and/or as a visual representation, for example, in a way (e.g., virtual labels) that can be similar to actual labels (e.g., actual warning labels, actual hazard labels, . . . ). The IMC 108 can facilitate presenting (e.g., displaying) such virtual labels on the display screen of the interface component 106 to correspond to the locations of the devices in the field of view of the ARD user such that the virtual labels can appear to be projected on to the devices of the system as if the virtual labels are actual labels.

Additionally or alternatively, the ARD 102 (e.g., the IMC 108 of the ARD 102) can encode the warnings, hazard information, tips, and/or other desired information in other desired ways. For example, the IMC 108 can generate or draw a ring or cast a color over a zone around a hazard (e.g., hazard keepout zones, such as arc-flash zones). When the user is in, or in proximity to, the zone, the sensor component 104 and/or IMC 108 can detect the user's location relative to the location of the zone. In response, the IMC 108 can facilitate presenting, via the display screen of the interface component 106, the ring or colored region over the zone comprising the hazard to facilitate notifying the user of the hazard.

Additionally or alternatively, the user can use the ARD 102 to tag and define hazards, hazard keepout zones, and/or safety critical regions associated with a system. In response, the IMC 108 can perform the tagging and defining of the hazards, hazard keepout zones, and/or safety critical regions associated with the system. If the sensor component 104 detects a tag associated with, for example, a hazard associated with the system, the IMC 108 can determine that the user is in proximity to the hazard, based at least in part on the sensor data relating to the tag from the sensor component 104. The IMC 108 can identify the hazard and its location in relation to the user based at least in part on the sensor data relating to the tag, sensor data relating to the location of the user, and/or other data. The IMC 108 can generate and facilitate presenting, via the interface component 106, a warning indicator and/or warning information to the user to warn the user of the hazard and its location, and/or to provide relevant information regarding the type of hazard to the user. The warning indicator and/or warning information can be presented, via the display screen of the display component 302, to the user (and/or via audio indicator and/or information presented via the audio component 304, and/or haptic feedback via the haptic component 306).

Additionally or alternatively, the ARD 102 (e.g., the IMC 108 of the ARD 102) can encode and/or present the warnings, hazard information, tips, and/or other desired information in still other desired ways that can be more than or other than visual. For example, the IMC 108 can generate audible indicators and/or haptic indicators that can be associated with the zone and/or hazard. In response to detecting that the user is in, or in proximity to, the zone, the IMC 108 can facilitate presenting, via the audio component 304 and/or the haptic component 306 of the interface component 106, the audible indicators and/or the haptic indicators to facilitate notifying the user of the hazard.

In some implementations, the ARD 102 can obtain manuals (e.g., entire manuals) relating to respective components and systems, wherein such manuals can be stored in the data store 114 or in an external data store. The IMC 108 can make all or a desired portion of the manuals available for viewing on the display screen of the interface component 106 by the user, for example, in response to a request or command received from the user. The IMC 108 also can provide a search engine that can allow the user to enter search requests, via the interface component 106, to search for desired information in a manual(s). The search engine can perform the search and generate search results, based at least in part on the search request, and can present, via the display screen, the search results to the user. The user can select a desired search result, via the interface component 106, to view the information from the manual(s) associated with the search result.

Users also can use the ARD 102 to create or build integration screens (e.g., electronic operator interfaces (EOIs)) for different (e.g., custom) views and different users (e.g., operators) associated with the system. For instance, the IMC 108 can receive instructions and/or other information from an ARD user via the interface component 106 (e.g., using hand gestures, verbal information, and/or textual or control input). The instructions and/or other information can relate to controls that are to be employed on a screen, respective locations of the controls on the screen, respective regions for respective types of data, the respective types of data to be presented in the respective regions on the screen, and/or other features or parameters of the screen. The IMC 108 can generate the screen based at least in part on the results of analyzing the instructions and/or other information. The IMC 108 can facilitate presenting, via the display screen of the display component 302, the screen (e.g., customized screen) to the user (e.g., in response to a request for or selection of the screen, and/or dynamically or automatically, in response to detected conditions associated with the system related to the screen).

In some implementations, the ARD 102, employing the IMC 108, can generate and display (e.g., the user can use the ARD 102 to generate and display) ladder logic and screens as such ladder logic and screens are created or built. For instance, the IMC 108 can receive instructions and/or other information from the user via the interface component 106 (e.g., using hand gestures, verbal information, and/or textual or control input). The instructions and/or other information can relate to various aspects (e.g., components, nodes, controls, desired data, desired routines, nets, I/O points, . . . ) relating to ladder logic or a screen. The IMC 108 can generate (e.g., create, build) the ladder logic or the screen based at least in part on the results of analyzing the instructions and/or other information. The IMC 108 can facilitate presenting, via the display screen of the display component 302, the ladder logic or the screen to the user when selected by the user or at other suitable times.

In connection with the building of ladder logic or a screen, the ARD 102, via the IMC 108 and the display screen of the interface component, also can light up or make active affected nodes, nets, I/O points, or other elements, when they are affected (e.g., modified or set) or selected (e.g., by the user). This can facilitate letting the user know that a particular node, net, I/O point, or other element has been affected by an action performed by the user or by the ARD 102.

In some implementations, in connection with the building of ladder logic or a screen, the user also can use the ARD 102 for instruction lookup or lookup of other elements of ladder logic or a screen. For example, the user can submit a request for instructions (e.g., ladder logic instructions), screen elements, or other logic using natural language via the interface component 106 (e.g., by providing verbal input information, textual input information, or other information). The IMC 108 can analyze the request received in natural language, and employing natural language recognition, the IMC 108 can interpret the natural language of the request to determine a refined search request, based at least in part on the natural language request.

The IMC 108 can employ a search engine to perform the refined search of a database(s) (e.g., in the data store 114 or from another data source(s)) that can comprise ladder logic instructions, screen elements, various other types of logic, or various other types of elements. The search engine can generate and provide search results based at least in part on the refined search. The IMC 108 can facilitate presenting, via the interface component 106 (e.g., display screen), the search results to the user, wherein the search results can be recommended or suggested ladder logic instructions, screen elements, other logic, other elements for the user to consider in connection with building the ladder logic or screen. The user can select one or more of the desired search results and can use the associated ladder logic instructions, screen elements, other logic, and/or other elements to facilitate building the ladder logic or screen. The IMC 108 can facilitate generating the ladder logic or screen based at least in part on the search results and associated instructions or elements selected by the user. The IMC 108 can facilitate presenting, via the display screen of the display component 302, such ladder logic or the screen to the user, for example, when selected by the user or at other suitable times. The ARD 102, by enabling the user to use the ARD 102 for instruction lookup or lookup of other elements can enable or allow a natural language gateway to precision logic encoding in connection with the design.

The ARD 102 can enable a user to ask (e.g., verbally or with eye (e.g., sight or focus), facial, or hand gestures), via the interface component 106, what a particular thing is (e.g., a wire, tag, I/O, component, voltage, configuration, element,) and ask for assistance or for additional information, such as, for example, datasheets, application notes, or schematics relating to the design of the system. The IMC 108 can analyze the question, assistance request, and/or information request presented by the user. Based at least in part on the analysis results, the IMC 108 can determine a response to the question (e.g., the item you inquired about is a wire connected between device A and device B in the system design) and present the response to the user, can determine a suitable response to the assistance request and/or can provide or facilitate providing the requested assistance, and/or can retrieve (e.g., from the data store 114 or other data source) and present the requested information to the user. The response to the question, the response to the assistance request and/or the requested assistance, and/or the additional information can be presented to the user as visual information via the display screen of the display component 302, and/or as audio information via the audio component 304.

In some embodiments, the ARD 102 also can employ a virtual eagle eyes feature that can enable the user of the ARD 102 to magnify a portion of the field of view of the user as the user views the environment through the lens component (e.g., lenses) of the ARD 102. The magnification by the ARD 102 can be enabled and controlled by the IMC 108, and can be implemented via the image capture component 202 of the sensor component 104, and the display screen of the display component 302 of the interface component 106. The magnification of the virtual eagle eyes feature implemented by the ARD 102 can be a magnifying glass, a virtual magnifying glass, a microscope, or a virtual microscope.

The ARD 102, via use of the lens component of the ARD 102, the sensor component 104 (e.g., the image capture component 202), and the interface component 106 (e.g., display component), can allow area magnification, for example, using eyeball focus of the user (e.g., on an object(s)) to place or position the virtual magnifying glass. The sensor component 104, using the user-facing camera(s) of the image capture component 202, can detect the focus of the eyes of the user as the user views through the lens component. The interface component 106 can receive instructions from the user (e.g., textual instructions, verbal instruction, visual instructions or gestures) via the interface component 106 and/or the sensor component 104 can detect conditions associated with the user (e.g., the facial expression of the user, the movement of the eyes or eye portion of the face), wherein the instructions or conditions can indicate that the user wants to or at least potentially wants to utilize the virtual eagle eyes function. Based at least in part on the results of analyzing the instructions or conditions, the IMC 108 can determine whether the virtual eagle eyes function is to be implemented and how (e.g., to what degree of magnification) it is to be implemented.

In accordance with various embodiments, the IMC 108 can control the sensor component 104 (e.g., the image capture component 202 of the sensor component 104) and the display component 302 of the interface component 106 to employ a boxed magnification version or a distorted view version of the object(s) in the environment that is to be magnified. With regard to boxed magnification, the IMC 108 can facilitate creating a boxed region (e.g., rectangular shaped, round shaped, or irregular shaped region) over a portion of the area viewable by the user based at least in part on the eye focus of the user, as determined by sensor data from the sensor component 104 (e.g., the user-facing camera(s) of the image capture component 202). The IMC 108 can determine a level of magnification to employ to magnify at least a portion of the visual data (e.g., object(s) or portion of the object(s)) in the boxed region, based at least in part on the results of the analysis of the instructions, the sensor information, user preferences, and/or other information, in accordance with the defined information management criteria. The IMC 108, employing the interface component 106 (e.g., the display screen of the display component 302), can facilitate magnifying (e.g., presenting a magnified view of) at least the portion of the visual data in the boxed region, while the remaining visual data outside of the boxed region can be presented on the display screen of the ARD 102 at a non-magnified level or can be de-emphasized (e.g., demagnified).

With regard to distorted view version of magnification, the IMC 108 can facilitate creating a region (e.g., rectangular shaped, round shaped, or irregular shaped region) over a portion of the area viewable by the user based at least in part on the eye focus of the user, as determined by sensor data from the sensor component 104 (e.g., the user-facing camera(s) of the image capture component 202). The IMC 108 can determine a level of magnification to employ to magnify at least a portion of the visual data (e.g., object(s) or portion of the object(s)) in the region associated with (e.g., corresponding to) the eye focus of the user, based at least in part on the results of the analysis of the instructions, the sensor information, user preferences, and/or other information, in accordance with the defined information management criteria. The IMC 108, employing the interface component 106 (e.g., the display screen of the display component 302), can facilitate magnifying (e.g., presenting a magnified view of) at least the portion of the visual data in the region, while the remaining visual data outside of the region can be presented on the display screen of the ARD 102 as being blurred, distorted, or otherwise de-emphasized.

The ARD 102, by employing such magnification techniques, can cause objects within the gaze of the user to appear larger than life to the user of the ARD 102 when the user is viewing the objects (e.g., magnified objects) via the display screen of the interface component 106. The IMC 108 of the ARD 102 also can generate and provide additional metadata, such as tags, or other information by voice or gesture command received by the sensor component 104 and/or interface component 106 from the user to call for (e.g., to request) these additional layers of information (e.g., datasheet, price and availability on maintenance stock shelves, virtual voltage probe, conformity to derating guidelines, etc.). The ARD 102 further can facilitate performing one or more additional actions, such as modifying (e.g., forcing or toggling) states or bits associated with a system (e.g., a device of the system), for example, in response to a voice or gesture command received by the ARD 102 (e.g., the sensor component 104 or interface component 106) from the user, wherein the voice or gesture command requests or instructs that the state or bit be modified.

In accordance with various implementations or embodiments, the ARD 102 can be used to facilitate enhancing security (e.g., security assistance), for example, by identification of operators, peers, and location, as well as security policy enforcement. It can sometimes be desired (e.g., due to importance) to restrict access of users or devices to certain devices, systems and functions based at least in part on security credentials (e.g., user or operator security credentials, device security credentials). However, it may be difficult to robustly assess user identity, and existing methods of determining identity can be deficient, as, for example, passwords of a user can be shared with others or hacked, keys can be duplicated, etc.

The ARD 102 can facilitate enhancing security associated with a system by desirable identification of operators, peers, and location, as well as security policy enforcement. The disclosed subject matter describes various modes of identifying a user for purposes of security (e.g., security of the system, or a device or functions associated with the system). In some implementations, the ARD 102 can use multifactor identification, employing a number of the capabilities of the ARD 102 (e.g., the features and capabilities of sensors of the sensor component 104 and/or the interfaces of the interface component 106), wherein the sensors, interfaces, and/or IMC 108 can interact with upstream databases and computing power.

The ARD 102 can employ various security factors to facilitate identifying or authenticating a user of the ARD 102. The various security factors that the ARD 102 can employ can comprise, for example, 1) audible information, such as a spoken password, voice recognition of a user's voice, audibly reading a human-only-readable text, and/or answering security questions; 2) user-facing video to assess iris, retina, facial dimensions, and/or eye focus of the user; 3) outward facing video to enable the use of gestures of a user to enter passwords, answer security questions, perform defined gestures (e.g., which can be compared to the user's previously recorded motion and mannerism), fingerprints, hand, and/or other body dimensions of the user; and/or 4) accelerometers and/or another sensor to recognize a gait of a user.

With regard to the audible information, the IMC 108 can request that the user present, via the audio sensor component 204, a spoken password, a sample of the voice of the user (e.g., recite a particular phrase), a reading of a human-only-readable text by the user, and/or an answer(s) to one or more security questions. When a spoken password is the security factor, the IMC 108 can analyze the spoken password submitted by the user and can compare it to a stored password (e.g., spoken password), which can be retrieved from the data store 114 or another data source (e.g., external data store), to determine whether the spoken password submitted by the user matches, or at least substantially matches, the stored password. In response to determining that the spoken password matches or substantially matches the stored password, the IMC 108 can determine that the spoken password satisfies the defined security criteria relating to spoken passwords. In response to determining that the spoken password does not match or substantially match the stored password, the IMC 108 can determine that the spoken password does not satisfy the defined security criteria relating to spoken passwords.

When a sample of the voice of a user is the security factor, the IMC 108 and/or the recognition component 212 can analyze and employ voice recognition techniques on the user's voice sample to identify voice characteristics of the user's voice. The IMC 108 can retrieve stored voice characteristics or a stored voice sample from the data store or another data source. In the case of a stored voice sample, the IMC 108 and/or the recognition component 212 can analyze and employ voice recognition techniques on the stored voice sample to identify voice characteristics of the stored voice sample. The IMC 108 can compare the voice characteristics of the user's voice to the (stored) voice characteristics of the stored voice sample to determine whether the voice characteristics of the user's voice matches or substantially matches the (stored) voice characteristics of the stored voice sample. In response to determining that the voice characteristics of the user's voice matches or substantially matches the (stored) voice characteristics of the stored voice sample, the IMC 108 can determine that the user's voice sample satisfies the defined security criteria relating to voice recognition. In response to determining that the voice characteristics of the user's voice do not match or substantially match the (stored) voice characteristics of the stored voice sample, the IMC 108 can determine that the user's voice sample does not satisfy the defined security criteria relating to voice recognition.

When a reading of a human-only-readable text by the user is the security factor, the IMC 108 can analyze the reading of the human-only-readable text submitted by the user and can compare it to a stored human-only-readable text (e.g. in text or audible form), which can be retrieved from the data store 114 or another data source (e.g., external data store), to determine whether the human-only-readable text submitted by the user matches, or at least substantially matches, the stored human-only-readable text. In response to determining that the submitted human-only-readable text matches or substantially matches the stored human-only-readable text, the IMC 108 can determine that the submitted human-only-readable text satisfies the defined security criteria relating to human-only-readable text. In response to determining that the submitted human-only-readable text does not match or substantially match the stored human-only-readable text, the IMC 108 can determine that the submitted human-only-readable text does not satisfy the defined security criteria relating to human-only-readable text.

When the answering of a security question is the security factor, the IMC 108 can analyze the security question answer submitted by the user and can compare it to a stored security question answer (e.g., spoken or textual security question answer), which can be retrieved from the data store 114 or another data source (e.g., external data store), to determine whether the security question answer submitted by the user matches, or at least substantially matches, the stored security question answer. In response to determining that the submitted security question answer matches or substantially matches, the stored security question answer, the IMC 108 can determine that the submitted security question answer satisfies the defined security criteria relating to security questions. In response to determining that the submitted security question answer does not match or substantially match the stored security question answer, the IMC 108 can determine that the submitted security question answer does not satisfy the defined security criteria relating to security questions.

With regard to using user-facing video to assess iris, retina, facial dimensions, and/or eye focus of the user as a security factor, the IMC 108 and/or the recognition component 212 can analyze and employ biometric recognition techniques on the user's biometric information (e.g., iris, retina, facial dimensions, and/or eye focus of the user) to identify characteristics of the user's biometric information. The IMC 108 can retrieve stored characteristics or stored biometric information from the data store or another data source. In the case of stored biometric information, the IMC 108 and/or the recognition component 212 can analyze and employ biometric recognition techniques on the stored biometric information to identify characteristics of the stored biometric information. The IMC 108 can compare the characteristics of the user's biometric information to the (stored) characteristics of the stored biometric information to determine whether the characteristics of the user's biometric information matches or substantially matches the (stored) characteristics of the stored biometric information. In response to determining that the characteristics of the user's biometric information matches or substantially matches the (stored) characteristics of the stored biometric information, the IMC 108 can determine that the user's biometric information satisfies the defined security criteria relating to biometric recognition. In response to determining that the characteristics of the user's biometric information do not match or substantially match the (stored) characteristics of the stored biometric information, the IMC 108 can determine that the user's biometric information does not satisfy the defined security criteria relating to biometric recognition.

With regard to using outward-facing video to assess gestures or biometric features of the user as a security factor, the IMC 108 can request that the user present, via the image capture component 202, gestures to enter a password or answer security questions, perform defined gestures, and/or submit biometric information. When a password is the security factor, the IMC 108 can analyze the password submitted via a hand gesture(s) of the user and can compare it to a stored password, which can be retrieved from the data store 114 or another data source, to determine whether the submitted password matches, or at least substantially matches, the stored password. In response to determining that the submitted password matches or substantially matches the stored password, the IMC 108 can determine that the submitted password satisfies the defined security criteria relating to passwords. In response to determining that the submitted password does not match or substantially match the stored password, the IMC 108 can determine that the submitted password does not satisfy the defined security criteria relating to passwords.

When answering of a security question is the security factor, the IMC 108 can analyze the security question answer submitted by the user using a gesture(s) and can compare it to a stored security question answer, which can be retrieved from the data store 114 or another data source, to determine whether the security question answer submitted by the user matches, or at least substantially matches, the stored security question answer. In response to determining that the submitted security question answer matches or substantially matches the stored security question answer, the IMC 108 can determine that the submitted security question answer satisfies the defined security criteria relating to security questions. In response to determining that the submitted security question answer does not match or substantially match the stored security question answer, the IMC 108 can determine that the submitted security question answer does not satisfy the defined security criteria relating to security questions.

With regard to using performed defined gestures as a security factor, the IMC 108 can analyze defined gestures performed by the user and can compare the performed defined gestures to stored defined gestures, which the IMC 108 can retrieve from the data store 114 or another data source. The stored defined gestures associated with the user can comprise, for example, previously performed defined gestures of the user that have been recorded. The motions and mannerisms of the user in performing the defined gestures can be assessed along with the gestures themselves. The gestures can involve the user using one or more of the user's finger(s), hand(s), and/or other body parts in particular ways (e.g., to make particular gestures, motions, or mannerisms). In response to determining that the performed defined gestures match or substantially match the stored defined gestures, the IMC 108 can determine that the performed defined gestures satisfy the defined security criteria relating to performed defined gestures. In response to determining that the performed defined gestures do not match or substantially match the stored defined gestures, the IMC 108 can determine that the performed defined gestures do not satisfy the defined security criteria relating to performed defined gestures.

With regard to using biometric information of the user as a security factor, the IMC 108 and/or the recognition component 212 can analyze and employ biometric recognition techniques on the user's biometric information (e.g., fingerprint(s), hand, and/or body dimensions of the user) to identify characteristics of the user's biometric information, and/or on stored biometric information to identify characteristics of the stored biometric information (e.g., if characteristics of the stored biometric information have not already been determined). The IMC 108 can compare the characteristics of the user's biometric information to the (stored) characteristics of the stored biometric information to determine whether the characteristics of the user's biometric information matches or substantially matches the (stored) characteristics of the stored biometric information. In response to determining that the characteristics of the user's biometric information matches or substantially matches the (stored) characteristics of the stored biometric information, the IMC 108 can determine that the user's biometric information satisfies the defined security criteria relating to biometric recognition. In response to determining that the characteristics of the user's biometric information do not match or substantially match the (stored) characteristics of the stored biometric information, the IMC 108 can determine that the user's biometric information does not satisfy the defined security criteria relating to biometric recognition.

With regard to using the gait of the user as a security factor, the IMC 108 can analyze sensor data relating to the gait of the user to determine characteristics of the gait of the user, wherein the sensor data can be obtained from an accelerometer or other sensor of the sensor component 104. The IMC 108 can compare the characteristics of the gait of the user to stored characteristics of the gait of the user, which can be retrieved from the data store 114 or another data source. The stored characteristics of the gait of the user can be determined by analyzing previous sensor data relating to the gait of the user. The IMC 108 can compare the characteristics of the gait of the user to the stored characteristics of the gait of the user. In response to determining that the characteristics of the user's gait matches or substantially matches the stored characteristics of the user's gait, the IMC 108 can determine that the user's gait satisfies the defined security criteria relating to gait recognition. In response to determining that the characteristics of the user's gait do not match or substantially match the stored characteristics of the user's gait, the IMC 108 can determine that the user's gait does not satisfy the defined security criteria relating to gait recognition.

In accordance with various embodiments, the ARD 102 can employ one, more than one, or all of those security factors (or another security factor(s)) to facilitate identifying or authenticating a user of the ARD 102. For example, the IMC 108 of the ARD 102 can request that a user present audible information in the form of a spoken password to the audio sensor component 204, and provide biometric information in the form of retina characteristics, as detected by the image capture component 202. The IMC 108 can determine whether the user is sufficiently identified or authenticated, based at least in part on the results of analyzing those two security factors (e.g., spoken password and retina assessment).

As another example, the IMC 108 of the ARD 102 can request that a user present audible information in the form of a human-only-readable text to the audio sensor component 204, provide biometric information in the form of a fingerprint, as detected by the image capture component 202, and perform defined gestures. The IMC 108 can determine whether the user is sufficiently identified or authenticated, based at least in part on the results of analyzing those three security factors (e.g., human-only-readable text, fingerprint, and perform defined gestures).

In some embodiments, the IMC 108 can randomly select the number of security factors to employ, and/or the types of security factors to employ, to identify or authenticate a user of the ARD 102. In some implementations, the IMC 108 can utilize a random number generator (e.g., real or pseudo random number generator) to generate a random value(s) and/or a randomizing function(s), wherein the random value(s) and/or randomizing function(s) can be used by the IMC 108 to randomize the selection of the number of security factors to employ, and/or the types of security factors to employ, to identify or authenticate a user of the ARD 102. In other implementations, an authorized person can determine and the select the number and/or type of security factors to employ to identify or authenticate a user of the ARD 102.

For example, on a first occasion, utilizing the random number(s) and/or randomizing function(s), the IMC 108 can randomly determine that two security factors are to be employed, and can randomly select a spoken password and a fingerprint scan as the two types of security factors to be employed to identify or authenticate a user of the ARD 102. On a second occasion, utilizing the random number(s) and/or randomizing function(s), the IMC 108 can randomly determine that three security factors are to be employed, and can randomly select answering a security question, a retina scan, and a password entered via gestures of the user as the three types of security factors to be employed to identify or authenticate a user of the ARD 102.

Employing randomization in determining the number and/or type of security factors to be employed to identify or authenticate a user can enable the security process to be relatively fast and flexible. The random and/or multi-factor security process can be flexible or approximate in some areas, which can allow variability (e.g., allow for daily, periodic, or aperiodic variability with regard to the number and/or type of security factors used), as desired (e.g., by the authorized person). The flexibility or approximation of the security process can be balanced with the multi-security factor process, as the employment of multiple and/or random security factors in the security process can compensate for any approximation in some areas associated with the security process. The security process, by employing randomized sampling and selection of multiple security factors, can provide robust security for the ARD 102 and associated information, devices, and/or systems and can make it relatively difficult for imposters (e.g., unauthorized or malicious persons or entities) to fake an identity of another person (e.g., an authorized user).

If the user does not pass the security check (e.g., authentication), the IMC 108 can deny the user access rights to the ARD 102 and/or associated devices or systems (e.g., industrial automation system), or can grant limited access rights to the ARD 102 and/or associated devices or systems (e.g., limited rights that can be granted to non-authenticated users or guests). If the user (e.g., operator, or supervisor) does pass the security check (e.g., authentication), the IMC 108 can grant a set of access rights to the user to access and use the ARD 102 and/or associated devices or systems, in accordance with the set of access rights granted to the user, the defined information management criteria, and/or the defined security criteria. The IMC 108 can control access to the ARD 102, information, activities, screens (e.g., HMIs, EOIs,), devices, processes, assets, changes (e.g., changes made to data; changes made to machine, HMI, or system design; changes made to parameters), virtual penetration (e.g., inside the box view and action), and/or force/run manipulation, etc., based at least in part on the set of access rights granted to the user.

The set of access rights granted to the user can be based at least in part on the role (e.g., operator, or supervisor) of the user, security clearance of the user, the location of the user (e.g., in relation to the system; is user in a remote location away from the system or is the user in the same location as the system), and/or other desired factors relating to access rights, in accordance with the defined information management criteria and/or defined security criteria (e.g., as specified by the defined security policy). The set of access rights can indicate or specify which information, activities, screens, devices, processes, assets, changes, virtual penetration, and/or force/run manipulation, etc., that the user (e.g., authenticated and authorized user) is permitted to access, use, or perform, accordingly.

In accordance with various embodiments, the ARD 102 can employ security scan and patrol by checking (e.g., using out-facing cameras of the image capture component 202) other personnel in the area. For example, the ARD 102 can analyze video, images (e.g., photographs), and/or audio captured by the ARD 102 (e.g., image capture component 202, audio sensor component 204). Based at least in part on the analysis results, the ARD 102 can determine who other persons near the user of the ARD 102 are, determine whether such other persons have authorization to be in the area where the ARD 102 is currently located and at the stations (e.g., work stations) where such other persons are located. The ARD 102 (e.g., IMC 108 of the ARD 102) also can determine information regarding such other persons (e.g., name, years of experience, security level, etc., of the other person), wherein the ARD 102 can present that information (e.g., visual information, or audio information) to the user (e.g., goggle wearer) wearing the ARD 102.

For instance, the ARD 102 can use out-facing cameras of the image capture component 202 and/or other sensors (e.g., audio sensor component 204) of the sensor component 104 to facilitate identifying other personnel (e.g., workers) that are within the field of view of the out-facing cameras or within the field of view of any cameras (even facing behind the user) of the image capture component 202 by and based at least in part on any number and/or type of the security factors (e.g., audible information, such as spoken password, voice recognition of other person's voice, other person audibly reading a human-only-readable text, and/or other person answering security questions; assess, iris, retina, facial dimensions, and/or eye focus of the other person; use of gestures of other person to enter passwords, answer security questions, performed defined gestures, fingerprints, hand, or other body dimensions of the other person; and/or recognize gait of the other person), as disclosed herein.

For example, the ARD 102 can employ (e.g., randomly select) performing facial recognition on the other person and requesting the other person provide a spoken password as the security factors for identifying or authenticating the other person. The user of the ARD 102 can employ the outward-facing camera(s) of the image capture component 202 to capture an image of the face (or portion thereof) of another person (e.g., ARD user or other person not using an ARD) in proximity to the user (e.g., within the field of view of the user or outside the field of view of (e.g., behind) the user). The IMC 108 and/or recognition component 212 can employ facial recognition techniques to perform facial recognition on the image of the face (or portion thereof) of the other person to identify or authenticate, or attempt to identify or authenticate, the other person. The IMC 108 and/or user can request the other person to provide a valid spoken password, and the audio sensor component 204 (e.g., microphone) can sense or capture the spoken password provided by the other user. The IMC 108 can compare the spoken password submitted by the other person to a stored password to identify or authenticate, or attempt to identify or authenticate, the other person.

Based at least in part on the identification or authentication of other persons (e.g., in proximity to the user of the ARD 102), the IMC 108 of the ARD 102 can determine whether any or all of the other persons are authorized to be working at the station at which they are located. For example, with regard to the other user, if the IMC 108 determines that the other person is identified and/or authenticated, based at least in part on the results of performing facial recognition and analyzing the spoken password submitted by the other user, the IMC 108 can determine whether the other person is authorized to be in the area (e.g., particular work station in the area) in which the person is located based at least in part on the set of access rights associated with the other person and the defined security criteria. For instance, the IMC 108 can determine the location of the other user (and/or determine the work station at which the other person is located) based at least in part on the results of analyzing sensor data relating to the location of the other user and obtained from the sensor component 104. The IMC 108 can analyze the set of access rights associated with the other person to determine the locations (and/or work stations) that the other person is authorized to access, and can determine whether the other person is authorized to be at the location (and/or work station) the other person is currently located, based at least in part on the results of comparing the current area (and/or work station) where the other person is located to the locations (and/or work stations that the other person is authorized to access.

If the IMC 108 determines that the other person is authorized to be at the current location (and/or work station), no further action is needed. If the IMC 108 determines that the other person is not authorized to be at the current location (and/or work station), the IMC 108 or the user can take action (e.g., call security personnel, transmit notification and/or identifying information (e.g., image, such as a photograph, of the other person) or other information (e.g., location of the other user) to device (e.g., ARD) of security personnel, request that the other person leave the area or work station) to address the issue of an unauthorized person being in that location (and/or work station).

In response to identification or authentication of the other person(s) by the ARD 102, the ARD 102 also can provide feedback to the user of the ARD 102 about the other person(s). For example, with regard to the other person, in response to identification or authentication of the other person by the ARD 102, the IMC 108 can generate customized information, comprising augmented reality information, relating to the other person. The IMC 108 can obtain information relating to the other user from the data store 114 and/or another data source(s) (e.g., a database(s) associated with the company), and can process such information to generate the customized information. The IMC 108 can facilitate presenting, via the display screen of the interface component 106 (or via the audio component 304), the customized information, or desired portion thereof, to the user to provide the user additional information regarding the other person. The customized information relating to the other person can comprise, for example, the name of the other person, the years of employment experience or resume of the other person, security level granted to the other person, job function of the other person, the frequency or history of the user meeting with the other person (e.g., history of relationship between the user and other person), and/or other pertinent information or details that can facilitate improving security and efficacy of the personnel (e.g., team of users) and the system. This also can allow human augmentation of security aspects associated with the system.

The security policy enforcement employed or implemented by the ARD 102 (e.g., employing the defined information management criteria and the defined security criteria), can provide advantages relating to industrial activities including maintenance, design, safety, etc., associated with the industrial automation system(s). Such security policy enforcement can be implemented and can enhance other aspects to improve the industrial protection of processes. For example, the security policy enforcement employed or implemented by the ARD 102 can facilitate improving the design environment associated with a system by providing a secure development environment whose virtues can be extolled elsewhere. The security policy enforcement employed or implemented by the ARD 102 also can facilitate improving the assembly process to assure that all parts are assembled by legitimate and authorized users (e.g., operators). Safety often can be intertwined with security, and the security policy enforcement employed or implemented by the ARD 102 can facilitate improving safety with regard to the system and users associated therewith.

The ARD 102 also can be employed to enhance safety of people, industrial machines, systems, and processes, and machine and HMI design activities (e.g., the ARD can provide safety assistance). Problems sometimes can arise that can impair safety in an industrial environment. Such problems can include or relate to, for example, the inability to adequately determine hazards and hazardous zones, inability to call for help easily in some situations, navigating in a visibility restricted area, reviewing incidents, and/or controlling machines from a safe distance.

The disclosed subject matter, employing the ARD 102, can overcome or address these and/or other issues relating to safety and hazards. In accordance with various embodiments, with the user (e.g., operator) interacting with or wearing the ARD 102, the ARD 102 can assist the user in a number of ways, such as disclosed herein, to improve speed of the user with regard to performing work tasks (e.g., maintenance, assembly, or security) tasks, quality of work performed, security of the performance of work tasks, and safety of the user and the environment in the performance of work tasks. The ARD 102 can advise or instruct the user through visual signals, audible signals, and/or haptic feedback to facilitate enhancing the safety associated with the system and the user, and assisting in the performance (e.g., safe performance) of work tasks associated with the system (e.g., enhancing the safety associated with the performance of work tasks associated with the system).

The ARD 102 can be employed to overcome issues relating to an inability or inadequate ability to determine hazards and hazardous zones in an area (e.g., an outdoor area, a building, a plant, . . . ). In some implementations, a designer, using the ARD 102 (or another device), can encode information relating to hazardous components and/or hazardous regions, and the safe zones (e.g., keepout zones, arc flash zones, . . . ) that can surround users in an area(s) associated with a system (e.g., industrial automation system). For instance, a user (e.g., designer) and/or the IMC 108 of the ARD 102 can identify or determine the respective locations of hazardous components and/or hazardous regions in an area, for example, by, based at least in part on sensor data relating to the conditions (e.g., environment conditions) associated with such hazardous components and/or hazardous regions, respective locations of such hazardous components and/or hazardous regions, and/or other data (e.g., specifications, hazard or warning information, or other information regarding components) obtained from another source (e.g., data store 114 or an external database(s)). The sensor data can indicate the respective locations, orientations, and/or movements of respective components (e.g., hazardous components) and/or regions (e.g., hazardous regions. The sensor data also can indicate hazardous conditions (e.g., hot temperature, high voltage, high current, chemical hazard, explosive hazard, . . . ) associated with components and/or regions in the area.

Based at least in part on the results of analyzing the sensor data and/or the other data, the IMC 108 can determine one or more hazardous components and/or hazardous regions in the area, and the respective locations of the one or more hazardous components and/or hazardous regions. The IMC 108 can be used (e.g., by the user) to encode information regarding the one or more hazardous components and/or hazardous regions. The encoded information regarding a hazardous component or hazardous region can comprise, for example, the type of hazard, the hazard level of the hazard, the location of the hazardous component or hazardous area, a component identifier of the component associated with the hazard, and/or other desired information. The IMC 108 can store the encoded information regarding the one or more hazardous components or hazardous regions in the data store 114 of the ARD 102 and/or in an external data store, and/or can provide the encoded information to other ARDs.

Also, based at least in part on the results of analyzing the sensor data and/or the other data, the IMC 108 can identify or determine one or more safe zones (e.g., keepout zones, arc flash zones, . . . ) that can surround the one or more hazardous components or hazardous regions in the area, and the respective locations of the one or more safe zones. The IMC 108 can be used (e.g., by the user) to encode information regarding the one or more safe zones. The encoded information regarding a safe zone can comprise, for example, an indication or identifier that the zone is a safe zone, the safety level of the safe zone, the location of the safe zone, and/or other desired information. The IMC 108 can store the encoded information regarding the one or more safe zones in the data store 114 of the ARD 102 and/or in an external data store, and/or can provide this encoded information to other ARDs.

As the user of the ARD 102 uses, wears, or interacts with the ARD 102 to view the environment in the location where the user is located and/or moves through the area, the IMC 108 of the ARD 102 can determine the location, orientation, and/or motion (e.g., movement) of the user, and the user's field of view through the lens component of the ARD 102, based at least in part on the sensor data relating to location, orientation, and/or motion of the user that is received from the sensors of the sensor component 104, as disclosed herein. The IMC 108 also can access the encoded information from the data store 114 or other data source (e.g., external data store) and analyze the encoded information in view of the location, orientation, motion, and field of view of the user.

Based at least in part on the results of analyzing the encoded information, the IMC 108 can determine whether there is a hazardous component, hazardous region, or safe zone (e.g., associated with the area and associated system) in the field of view of, or in proximity to, the user. In response to determining that there is a hazardous component, hazardous region, or safe zone in the field of view of, or in proximity to, the user, the IMC 108 can generate customized information, comprising augmented reality information and/or virtual reality information, relating to the hazardous component, hazardous region, and/or safe zone. The customized information can include visual and/or audio information (e.g., hazard indicator and/or other hazard-related information; safe zone indicator or information), and/or haptic feedback (e.g., vibratory signals or other haptic signals).

The hazard indicator (e.g., hazard warning indicator) or other hazard-related information can indicate or specify the type of hazard (e.g., high temperature, high voltage level, high current level, chemical hazard, or explosion hazard, . . . ), the location (and total region) where the hazard exists or is a threat, the hazard level (e.g., highly hazardous, moderately hazardous; hazard level is 5, . . . hazard level is 8, hazard level is 9, . . . ), parameter values related to the hazard (e.g., temperature is 300 degrees) and/or other desired data. The safe zone indicator or other safe zone related information can indicate or specify the type of safe zone (e.g., (e.g., keepout zone, arc flash zone, . . . ), the location (and total region) where the safe zone exists, the safety level(s) (e.g., moderately safe, very safe; safety level is 1, safety level is 2, . . . ), parameter values related to the safe zone, and/or other desired data.

The IMC 108 can facilitate presenting, via the display screen of the display component 302, audio component 304, and/or the haptic component 306, the customized information to the user. The user can perceive the customized information presented by the ARD 102 to the user and can thereby discover the hazardous component(s) and/or hazardous region(s), as well as the safe zone(s), in the field of view of, or in proximity to, the user, and pertinent information regarding the hazardous component(s), hazardous region(s), and/or safe zone(s). The customized information (e.g., augmented and/or virtual reality information) presented to the user by the ARD 102 can enable the user to safely navigate around or otherwise avoid such hazards.

The customized information can include, for example, a visual hazard indicator and/or visual object (e.g., virtual object) that can be a particular color (e.g., red) or color cast (e.g., a correspondingly colored color cast) that can be presented on the display screen (e.g., overlaid on the user's field of view) over the hazardous component or hazardous region as the user views the hazardous component or hazardous region in the user's field of view. The visual hazard indicator and/or visual object also can include lines or other markers (e.g., first-down-markers) that can be associated with the color or color cast, wherein, for example, the lines can be spheres or concentric lines surrounding, and extending outward from, the location of a hazard. In some implementations, the visual hazard indicator and/or visual object can be blinking on the display screen or can be solidly displayed on the display screen. The lines or markers can indicate hazard perimeters (e.g., arc or spark perimeters, perimeters based on electrical safe work practices, perimeters based on occupational safety and health administration (OSHA) standards or requirements, . . . ) determined based at least in part on design (e.g., system design), rules, and/or active or live measurements of voltage and temperature associated with the hazardous component or region (e.g., as sensed or measured by the sensor component 104). Other types of visible indications of the hazardous component or hazardous region can be employed by the ARD 102 as well.

In certain implementations, when the user is initially detected to be in proximity to a hazardous component or region, the IMC 108 can facilitate presenting a visual hazard indicator or visual object as blinking on the display screen to begin warning the user of the hazard. If the user continues to get closer to the hazardous component or region, or reaches out to touch the hazardous component, or enters the hazardous region, the IMC 108 can facilitate presenting a solid visual hazard indicator or visual object on the display screen to facilitate warning the user that the risk posed by the hazard to the user is increasing. As desired, alternatively, a solid hazard indicator or object can be the initial hazard warning, and a blinking hazard indicator or object can indicate to the user that the risk posed by the hazard to the user is increasing.

With further regard to safe zones, the customized information can comprise, for example, a visual safe zone indicator and/or visual safe zone object (e.g., virtual object) that can be a particular color (e.g., yellow or green) or color cast (e.g., correspondingly colored color cast) that can be presented on the display screen (e.g., overlaid on the user's field of view) over the portion(s) of the area in the user's field of view where the safe zone(s) exist(s) as the user views the safe zone(s) in the user's field of view. In some implementations, the visual safe zone indicator and/or visual safe zone object can be blinking on the display screen or can be solidly displayed on the display screen associated with the lens component of the ARD 102 and the field of view of the user. Other types of visible indications of the safe zone can be employed by the ARD 102 as well.

As another example of a hazard warning, when the user of the ARD 102 approaches or enters a hazardous region bodily (e.g., hand, foot, or whole body) or with a tool, the IMC 108 can detect the location of the user in relation to the hazardous region (e.g., can detect that the user is approaching or has entered the hazardous region with a part of his body or a tool), based at least in part on the results of analyzing sensor data relating to the location, orientation, and/or motion of the user, sensor data relating to the location of the hazardous region, and/or sensor data relating to the user's body and/or associated tool (e.g., images of the body of user from the image capture component 202). In response to such detection, the IMC 108 can generate and facilitate presenting a warning or notification to the user visually (e.g., via the display screen of the display component 302), audibly (e.g., via the audio component 304), and/or haptically (e.g., via the haptic component 306) to warn or notify the user that the user is approaching or has entered the hazardous region.

It is to be appreciated and understood that, as also disclosed herein, with regard to another hazardous component or region for which there is no encoded information (e.g., a new hazard), the IMC 108 can identify or determine the other hazardous component or region based at least in part on sensor data obtained from sensors of the sensor component 104 and/or other data. In response, the IMC 108 can generate and facilitate presenting, to the user, via the display screen, audio component 304, and/or haptic component 306, customized information, comprising augmented and/or virtual reality information, relating to the hazardous condition or region to facilitate warning and informing the user of the hazardous condition or region, as more fully described herein.

The ARD 102 or a user (e.g., system designer) also can determine hazardous components or hazardous regions using other encoded information regarding voltages, temperatures, or other conditions associated with the system. The IMC 108 or the user can determine temperatures associated with components or regions in the area (e.g., associated with the system) based at least in part on sensor data relating to temperatures obtained from one or more sensors (e.g., temperature sensor, such as an IR temperature sensor) of the sensor component 104 or a camera(s) (e.g., out-facing camera(s), such as an IR camera(s)) of the image capture component 202, and/or other data obtained from another data source(s) (e.g., other sensor data obtained from system sensors associated with the system; and/or other data stored in an external database). Similarly, the IMC 108 or the user can determine voltages associated with components or regions in the area based at least in part on sensor data relating to voltages obtained from one or more sensors (e.g., voltage sensor) of the sensor component 104 and/or system sensors (e.g., temperature sensors) associated with the system, and/or from other data obtained from another data source(s) (e.g., other data stored in an external database).

Knowing the hazards in an area, the IMC 108 or the user (e.g., system designer) can determine or calculate hazardous regions surrounding hazards (e.g., hazardous components or other hazards based at least in part on industry criteria (e.g., OSHA criteria, standards, or requirements, Underwriters Laboratories (UL) criteria, standards, or requirements, . . . ) and/or corporate criteria (e.g., corporate standards). The IMC 108 of the ARD 102 or the user can create or build (e.g., dynamically create or build) the hazardous regions, which can be, for example, virtual versions (e.g., 3-D virtual versions) of the actual hazardous regions in the area associated with the system.

With regard to the determined or calculated hazardous regions surrounding hazards, in response to detecting that the user and associated ARD 102 is located in proximity to, or is viewing through the ARD 102, a hazardous region in an area, the IMC 108 can facilitate presenting, via the display screen of the interface component 106, the hazardous region (e.g., a 3-D virtual version of the hazardous region), and/or information (e.g., hazard-related information or other pertinent information), an alert, or a notification regarding the hazardous region to provide the user relevant information regarding the hazardous region. As the user is viewing a portion of the area associated with the system wherein the hazardous region is located through the lens component of the ARD 102, the IMC 108 can facilitate presenting, via the display screen associated with the lens component, the 3-D virtual version of the hazardous region such that the 3-D virtual version of the hazardous region is overlaid in the user's field of view to appear over the position of the actual hazardous region in the user's field of view. The IMC 108 also can facilitate presenting other customized information relating to the hazardous region to the user to notify or warn the user of the hazardous region and its location, wherein the customized information can comprise audio information presented by the audio component 304 and/or haptic feedback presented by the haptic component 306.

The ARD 102 also can be employed to address or overcome issues relating to an inability of a person to call for help easily in certain situations. Some hazards associated with a system can cause users (e.g., operators) to be restricted in their means of calling for help if a problem or injury occurs.

For instance, if a user of an ARD 102 is injured, the user may or may not be able to use the ARD 102 or other device to call for help and no other person may be around to hear the user's call for help. If the user is able to call for help, the user can use the ARD 102 or other device to make a call or send a message for help (e.g., due to an injury to the user or for another need or desire of the user). The ARD 102 can be associated with a communication network, as more fully described herein, and the ARD 102 can communicate (e.g., transmit, broadcast) a help or assistance message or call of the user to other devices associated with other users (e.g., listeners) anywhere within the plant (e.g., industrial plant comprising the system), the state, the country, or the planet.

In certain instances, the user of the ARD 102 also may desire to make a call or send a message to another device (e.g., ARD or other device) to request assistance or information, for example, to facilitate performing an activity or task with remote assistance (e.g., remote expert assistance) from another person. In such instances, the user can use the ARD 102 to communicate, via call or message, to the other device through the communication network.

In some instances though, if the user is injured or incapacitated in a way that the user cannot readily call for help, the ARD 102 can be employed to detect (e.g., automatically detect) that the user is injured, unconscious, or otherwise facing a problem for which assistance for the user is desired (e.g., necessary), and can communicate (e.g., automatically communicate) a message or call to other devices and/or persons. For instance, the sensors (e.g., image capture component 202) of the sensor component 104 can sense gestures (e.g., hand, eye, or facial gestures) that can indicate that the user is injured and/or desires or requests assistance; the sensors (e.g., gyroscope or accelerometer) can sense the orientation, acceleration, and/or motion of the user (e.g., to detect that the user is falling or has fallen down, and/or has bumped into an object); the sensors can detect a pulse rate of the user, wherein, for example, a very low pulse rate or a very high pulse rate can indicate that the user is facing a health problem and can desire assistance; the sensors can sense whether the user is conscious or not conscious (e.g., the user-facing camera of the image capture component 202 can sense eye movement or focus (if any) of the user; the accelerometer or gyroscope can sense whether the user is moving at all); and/or the sensors (e.g., audio sensor component 204) can detect verbal communications from the user or other sounds in proximity to the user, wherein the verbal communications of the user can indicate or specify that the user desires or at least may desire assistance.

The IMC 108 can analyze the sensor data relating to the conditions of the user obtained from the sensors of the sensor component 104 and/or other data. Based at least in part on the results of the analysis, the IMC 108 can determine whether assistance is to be provided to the user and the location of the user. The IMC 108 can communicate (e.g., transmit, broadcast) a request for assistance message or emergency assistance message, and/or an associated alert, to one or more other devices (e.g., ARDs, communication devices) associated with the communication network to facilitate notifying other users or entities that the user is or may be in need of assistance, the location of the user, and/or other details relating to the condition of the user (e.g., detected heart rate of user, detection of substance that may be blood in proximity to the user, detection that user is unconscious). If the request for assistance message or emergency assistance message, and/or associated alert, is broadcasted by the ARD 102, a number of ARDs or other communication devices can receive such message(s) and/or associated alert. If the request for assistance message or emergency assistance message, and/or associated alert, is transmitted by the ARD 102 to a particular device, such device can receive the message and/or alert.

In some embodiments, in response to determining that a request for assistance (e.g., emergency assistance) is to be sent, the IMC 108 can employ automatic arc-flash detection to wirelessly transmit a distress call or message to another device or entity to indicate that the user or another person desires (e.g., needs) assistance.

Another issue that can arise can relate to a user (e.g., operator or other employee, emergency person, or first responder) having to navigate in a visibility restricted area. The disclosed subject matter, employing the ARD 102, can enable a user to navigate in a visibility restricted area and/or in an area where hazards may not be visible or readily visible.

The ARD 102 can employ the sensor component 104 to obtain (e.g., detect) location information and/or orientation information relating to the location and/or orientation of the user to facilitate determining a location and/or orientation of the user, as more fully described herein. The IMC 108 of the ARD 102 also can determine the layout of an area (e.g., a building, an industrial automation system, structure, an outdoor area), including the relative and respective locations of objects and/or other features in the area, based at least in part on sensor data obtained from sensors of the sensor component 104 and/or other data from another data source(s) (e.g., data store 114 or external data store). For instance, sensors (e.g., camera and/or IR camera of the image capture component 202, recognition component 212, environment sensors, . . . ) of the sensor component can sense and detect the layout of the area, including objects and other features of the area, and the relative and respective locations of the objects and other features in the area to each other. The objects and other features can include, for example, walls, doorways, doors, furniture, barriers, machines, devices, assets (e.g., industrial assets), appliances, stairs, building fixtures, lighting fixtures, wires (e.g., electrical wires, cable wires, . . . ), railings, rails, logs, tracks, trees, plants, holes, ditches, wells, fences, hills, curbs, precipices, vehicles, and/or any other type of object or features having a defined physical presence or shape. The sensors of the sensor component 104 can generate sensor data relating to the objects and other features of the area. The other data can comprise, for example, plans, blueprints, or layout information for a building, other structure, or system (e.g., industrial automation system), map(s) of the area, and/or aerial or satellite images.

The IMC 108 can analyze the sensor data and/or the other data, and can determine the layout of the area, including the relative and respective locations of objects and/or other features in the area, based at least in part on the sensor data and/or the other data. The IMC 108 also can detect one or more hazardous conditions or regions (e.g., high temperature, high voltage, high current, fire, smoke, chemical hazard, explosive hazard, . . . ), and the relative locations of the one or more hazardous conditions in the area, based at least in part on the sensor data and/or other data, as more fully described herein.

Based at least in part on the results of the analysis of the sensor data and/or the other data, the IMC 108 can generate a layout of the area, including the objects and other features of the area, and the relative and respective locations of the objects and other features in the area to each other, and/or including the one or more hazardous conditions (if any) and their respective locations in the area, and/or can generate a travel route or travel guide (comprising the layout of the area) that can provide travel-related guidance (e.g., directions, such as GPS-type directions) to the user that can enable the user to safely enter, navigate through, and/or exit the area, which may contain one or more hazardous conditions, in addition to the hazards or potential hazards a user may face from the objects or other features of the area as the user navigates through the area with restricted or no visibility. The layout, travel route, and/or travel guide also can include a current location of the user relative to the respective locations of the objects, features, and/or hazardous conditions in the area.

The IMC 108 can facilitate presenting, via the display screen of the interface component 106, the layout, travel route, and/or travel guide to the user, wherein the layout, travel route, and/or travel guide can be or can appear to be overlaid on the user's field of view as the user views the area (or portion of the area in the field of view) through the lens component of the ARD 102. Presenting the layout, travel route, and/or travel guide, the user's location, and the travel-related guidance (e.g., GPS-like directional or travel guidance) to the user can facilitate enabling the user to know the user's location relative to objects, barriers, and/or hazardous conditions in the area to enable the user to safely enter, navigate through, or exit the area, which may contain a hazard(s). This can be especially helpful if there is restricted visibility in the area, for example, from smoke or loss of light or power. This also can easily and advantageously be used by impaired users (e.g., temporarily impaired users) who, for example, may have been impaired by an incident such as an incident that caused arc flash blindness or visual impairment to a user.

For example, as part of the layout, travel route, and/or travel guide, the IMC 108 can generate and facilitate presenting, via the display screen, visual information that can virtualize objects, barriers, and/or hazardous conditions in the area, and, even though the user may or may not actually be able to see the actual objects, barriers, and/or hazardous conditions in the area, the user can perceive (e.g., see) virtualized versions of the objects, barriers, and/or hazardous conditions (and the respective and relative locations of such objects, barriers, and/or hazardous conditions) in the area relative to the location of the user to facilitate enabling the user to safely navigate around the objects, barriers, and/or hazardous conditions in the area. In some implementations, the IMC 108 can generate and facilitate presenting (e.g., emitting), via the audio component 304 and/or haptic component 306, audible information (e.g., sounds, such as voice commands, audible warnings or indicators) and/or or haptic information (e.g., ARD device vibrations or other type of haptic signals) to facilitate guiding the user through the area and/or notifying or warning the user when the user is in proximity to an object, barrier, and/or hazardous condition to enable the user to safely navigate around the objects, barriers, and/or hazardous conditions in the area.

Figure 9:
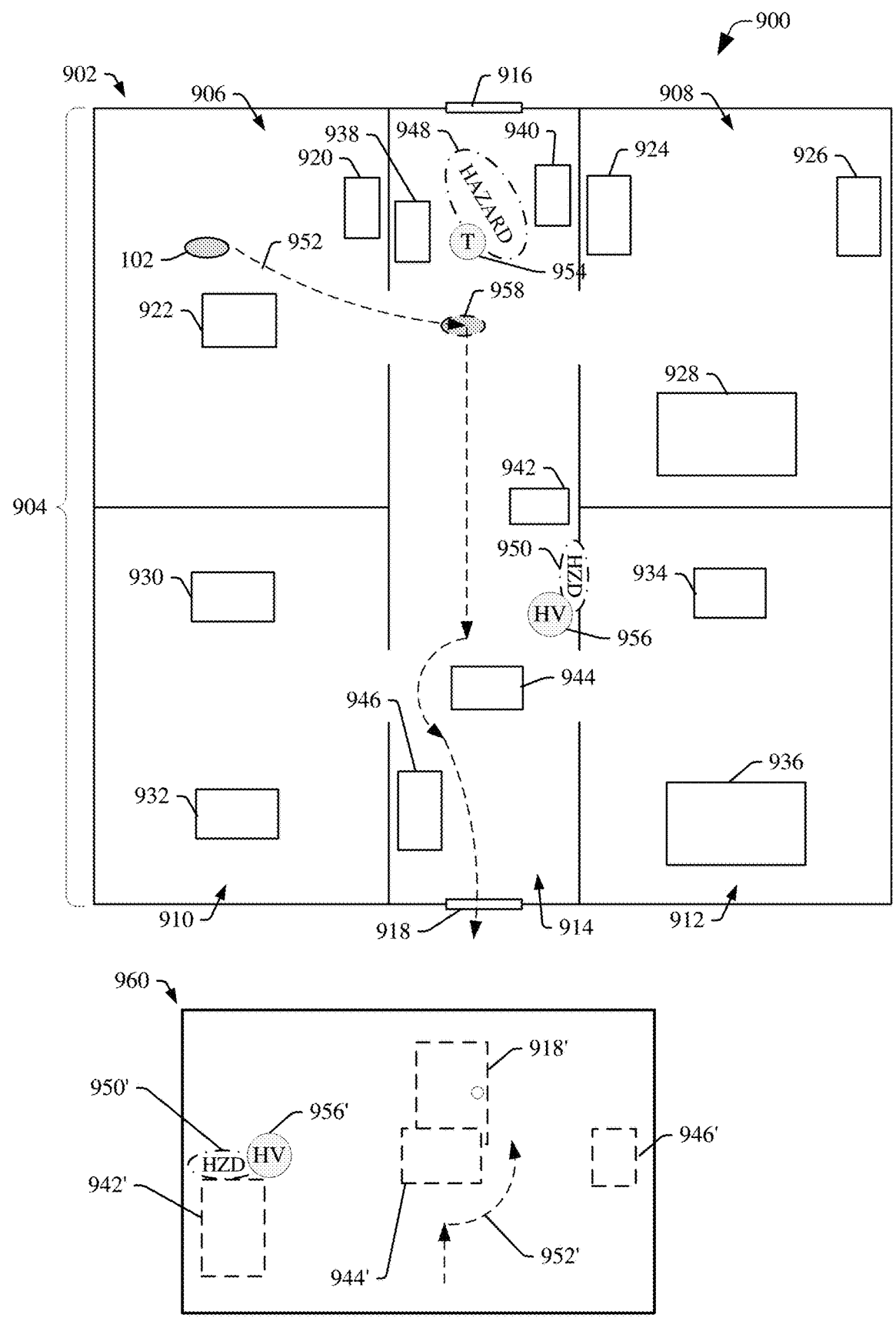
FIG. 9 illustrates a diagram of example visual presentations that can be presented to the user of the ARD to enable the user to safely navigate through an area and around objects, barrier, and/or hazardous conditions in the area, in accordance with various aspects and embodiments of the disclosed subject matter.

Referring briefly to FIG. 9 (along FIG. 1), FIG. 9 illustrates a diagram of example visual presentations 900 that can be presented to the user of the ARD 102 to enable the user to safely navigate through an area and around objects, barrier, and/or hazardous conditions in the area, in accordance with various aspects and embodiments of the disclosed subject matter.

The example visual presentations 900 can include visual presentation 902 that can include customized information (e.g., augmented and/or virtual reality information) comprising an example travel guide that can include a layout of an area and travel guidance for the user to facilitate enabling the user to safely navigate through the area and around objects, barrier, and/or hazardous conditions in the area, in accordance with various aspects and embodiments of the disclosed subject matter. The travel guide, including the layout of the area, can be determined, and the visual presentation 902, comprising the travel guide, can be generated by the IMC 108 based at least in part on the results of analyzing sensor data obtained from the sensor component 104 and/or other data, as more fully described herein.

As depicted in the travel guide of the visual presentation 902, the area 904 (e.g., area of a building) can comprise rooms, such as rooms 906, 908, 910, and 912, a hallway 914, a first door 916 at one end of the hallway 914, and a second door 918 at another end of the hallway 914. The respective rooms 906, 908, 910, and 912 can comprise respective objects (e.g., cabinets, desks, furniture, terminals, devices, or system components, . . . ), wherein the respective objects comprise objects 920, 922, 924, 926, 928, 930, 932, 934, and 936. The hallway 914 can comprise objects 938, 940, 942, 944, and 946. The area 904 also can include a first hazard 948, such as a fire that has reduced visibility significantly in the area 904, particularly in the hallway 914 and room 906, where the user and associated ARD 102 are initially locate, wherein the reduced visibility can make it difficult for the user to determine a safe way to exit the area 904, perceive the objects and hazards in the area 904. The area 904 also can include a second hazard 950 (HZD), which can be a hazard due to a high voltage condition that can be hazardous to the user.

The IMC 108 can determine the layout of the area 904, determine the location and/or orientation of the user and associated ARD 102, identify the respective objects (e.g., 920 through 946) in the respective rooms (e.g., 906, 908, 910, and 912) and hallway 914 of the area 904 and the respective locations of the objects, identify the respective locations of doors 916 and 918, and detect or determine the respective hazards 948 and 950 in the hallway 914 of the area 904, based at least in part on the results of analyzing the sensor data and/or the other data, as more fully described herein. Further, based at least in part on the results of analyzing the sensor data and/or the other data, including determining the layout of the area 904, the objects, the hazards, etc., the IMC 108 can determine and generate a travel guide that can comprise a travel route 952 that the user can travel to safely navigate through the area 904 and around any objects (e.g., 920 through 946), hazards (e.g., 948, 950), and/or other barriers (e.g., walls of the rooms or hallway) that the user may encounter as the user tries to exit the area 904. The travel guide also can include certain information regarding the hazards 948 and 950. For example, the IMC 108 can include a high temperature (T) indicator 954 (and/or fire indicator) with regard to hazard 948 (e.g., fire) to indicate that there is a high and/or dangerous temperature (and fire) in the region where that hazard 948 is located; and the IMC 108 can include a high voltage (HV) indicator 956 with regard to hazard 950 (e.g., high voltage of a component) to indicate that there is a high and/or dangerous voltage level in the region where that hazard 950 is located. The IMC 108 can facilitate presenting, via the display screen of the interface component 106, the travel guide, comprising the layout of the area 904 and the travel route 952, to the user.

As the user travels along, or at least attempts to travel along, the travel route 952, the IMC 108 can determine and update the user's location and/or orientation to indicate a current location, orientation, and/or movement of the user in the area 904, based at least in part on sensor data from the sensor component 104 and/or other data, as more fully disclosed herein. If, for some reason, the user travels off of the travel route 952, or conditions (e.g., hazards) in the area 904 change, the IMC 108 can determine (e.g., update) and facilitate presenting, via the display screen, an updated travel route for the user to enable the user to safely navigate through and exit the area 904.

In certain embodiments, based at least in part on the results of analyzing the sensor data and/or the other data, the IMC 108 also can determine, generate, and facilitate presenting, via the display screen of the interface component 106, other customized information (e.g., other augmented and/or virtual reality information) that can overlay, in the field of view (e.g., through the lens component) of the user of the ARD 102, other visual information relating to the area 904, the rooms (e.g., 906, 908, 910, and 912), the hallway 914, the doors (e.g., 916, 918), the objects (e.g., 920 through 946), the hazards (e.g., 948, 950), and/or other barriers (e.g., walls of the rooms or hallway), as well as the travel route 952.

As an example, the visual presentations 900 can comprise visual presentation 960 that can be a field of view of the user as the user views a portion of the area 904 (e.g., a portion of the hallway 914) through the lens component of the ARD 102 as the user travels and navigates along the travel route 952. At this point, the user has traveled along the travel route 952 from room 906 to the hallway 914 in between rooms 906 and 908, as depicted at reference numeral 958 in the visual presentation 902. As visibility of the user has been significantly diminished by smoke from the hazard 948, the IMC 108 can enhance the view of the user through the ARD 102 by generating and facilitating presenting virtual objects corresponding to the objects in the hallway (e.g., hallway 914 in visual presentation 902) of the area 904, visual indicators relating to hazards (e.g., hazard 950 in visual presentation 902), and the travel route (e.g., travel route 952 in visual presentation 902) to enable the user to navigate around the objects and hazards and exit through the door (e.g., door 918 in visual presentation 902).

The field of view of the user through the ARD 102 in the visual presentation 960 can comprise a portion of the hallway 914' (a different and/or virtual view of hallway 914), wherein virtual objects 942', 944', and 946' (which can be a virtual view of objects 942, 944, and 946) can be located in respective locations in the hallway 914' in the field of view perceived by the user via the display screen and lens component (e.g., over laid on the lens component) of the ARD 102. The field of view in the visual presentation 960 also can include a virtual door 918' (which can be a virtual view of the door 918). The field of view in the visual presentation 960 further can comprise a virtual hazard object 950' (corresponding to hazard 950) and high voltage indicator 956' (corresponding to high voltage indicator 956). The field of view in the visual presentation 960 also can comprise a portion of the travel route 952' (corresponding to a portion of the travel route 952). From the field of view in visual presentation 960 (presented to the user on the ARD 102), the user can perceive and identify the virtual objects (e.g., 942', 944', and 946'), virtual hazard object 950', travel route 952', high voltage indicator 956' associated with the virtual hazard object 950', and the virtual door 918' (corresponding to the actual door through which the user can exit from the hallway and the area 904). The user can use this information (e.g., virtual objects, virtual hazard object, travel route, . . . ) presented in the visual presentation 960 to safely navigate around the actual objects and actual hazards (and actual barriers, such as walls) in the hallway of the area 904 to exit the door (e.g., 918), even if the visibility of the user is impaired, making it difficult or impossible for the user to perceive the objects, hazards, and barriers in the area 904.

In some embodiments, the ARD 102 can enable "over the shoulder" or "through the lens" viewing by a second or remote user (e.g., remote expert) to help guide or monitor the user for safety of the user of the ARD 102 (including during a "man down" situation). There can be instances where the user of the ARD is incapacitated, injured, and/or can desire guidance from another person. To facilitate assisting or guiding the user of the ARD 102, a second or remote user, using another ARD or another device, can communicate with the ARD 102 and/or the user of the ARD 102, and can access the IMC 108, sensor component 104, interface component 106, and/or other components of the ARD 102.

With access to the components of the ARD 102, the second or remote user can use the other ARD or device can see the field of view of the user on the other ARD or other device, have access to and see data available to the user of the ARD 102 and/or presented on the display screen of the ARD 102, manipulate controls (e.g., virtual controls) presented on the ARD 102, and/or communicate commands to the ARD 102 for execution by the ARD 102. This can enable the second or remote user to assess the situation (e.g., visibility conditions, hazardous conditions, injury to the user, . . . ) that the user of the ARD 102 is facing, and can enable the second or remote user to facilitate guiding the user to safety from any potential dangers associated with the situation. Such techniques and features of the disclosed subject matter also can enable the second or remote user to review work tasks performed by the user to facilitate assessing how well the user has performed the work tasks and/or can enable the second or remote user to provide the user guidance or instruction regarding how to perform a work task.

In certain implementations, the ARD 102 can detect and use the proximity of a user to a portion of a system (e.g., industrial automation system) to remove (e.g., discontinue or shutdown) power from and/or de-energize circuits and systems upon approach of the user of the ARD 102 to the portion of the system. Based at least in part on the results of analyzing sensor data obtained from the sensor component and/or other data from another data source(s), the IMC 108 can determine the location, orientation, and/or motion of the user of the ARD 102, determine a layout of an area (e.g., an area where a system and/or facility is located), including identifying objects, barriers, and/or hazardous conditions in the area and their respective and relative locations to each other, and generate a map (e.g., 3-D map) of the layout, as more fully described herein. The map can be based at least in part on the design (e.g., the layout of machines, devices, processes, assets, . . . ) of the system or facility in the area. The ARD 102 can employ the cameras (e.g., cameras with object recognition) of the image capture component 202, recognition component 212, environment component 214, and/or other sensors to facilitate identifying the objects, barriers, and/or hazards in the area, and generating the map. In some implementations, the cameras can be enhanced by having a 360 degree or full spherical view of the area to facilitate enabling the user to perceive and avoid hazards (e.g., live electrical wires, a sharp object, an object which may cause the user to trip and fall, a ditch, a precipice,) in any direction.

As the user is moving throughout the area, the IMC 108 of the ARD 102 can continue to monitor and determine the location, orientation, and/or motion of the user, based at least in part on sensor data received from the sensor component 104 and/or the other data, wherein sensors, such as near field wireless sensors and/or other sensors (e.g., location sensors, GPS system or sensors), of or associated with the sensor component 104 can monitor and sense the location of the ARD 102 and associated user, as more fully described herein. In some embodiments, in response to detecting the user in proximity to the portion of a system (e.g., industrial automation system), the IMC 108 can communicate a message to another device to inform the other device that the user is in proximity to the portion of the system. In response to receiving the message, the other device can remove (e.g., discontinue or shutdown) power from and/or de-energize the circuits and systems. In other embodiments, in response to detecting the user in proximity to the portion of a system, the IMC 108 can remove power from and/or de-energize the circuits and systems.

The ARD 102 also can be employed to address issues relating to reviewing incidents. The ARD 102 can employ the image capture component 202 (e.g., outward-facing camera(s)) and audio sensor component 204 to capture (e.g., record) video and audio of procedures or tasks (e.g., associated with a system) being performed. In some instances, during the performance of the procedures or tasks, an incident (e.g., unacceptable procedure or task performance, improved or optimal procedure or task performance, mistake, accident, injury or death, property damage, disaster) may occur.

Information (e.g., visual or audio information) in the recorded procedure or task can be used by the ARD 102, another device, and/or a person (e.g., a supervisor or expert) to review the procedure or task, and/or end product associated with (e.g., being produced by) a system. In some implementations, the ARD 102 can provide (e.g., communicate) the captured video and audio to devices of certain users (e.g., experts) who can review the captured video and audio live as it is captured and communicated by the ARD 102 to the devices of the certain users or who can review the captured video and audio at a later time. When an incident has occurred, the ARD user and/or certain users can review the video or audio to determine the correctness or appropriateness of actions taken by people during the incident.

This can be helpful to facilitate avoiding such incident in the future or better managing the response to such incident in the future. Also, information in the recorded procedure or task can be used to develop improvement suggestions to the process (e.g., like learning from a game film). Information in the recorded procedure also can be used to review incidents for legal reasons (e.g., mistakes, accidents, or disasters).

In accordance with various embodiments, the ARD 102 can be used to enable the user of the ARD 102 to facilitate controlling machines from a safe distance from a machine or device associated with a system. The IMC 108 of the ARD 102 or a user (e.g., system designer) can determine and generate an HMI, which can be a virtual HMI that can correspond to, and/or can be arranged to appear as, an actual HMI of a system, for example, with regard to controls, data presented, and/or functionality, based at least in part on the results of the analysis of the sensor data and/or other data (e.g., data from another data source(s), such as an external database). The IMC 108 can generate and facilitate presenting, via the display screen of the interface component 106, the virtual HMI to the user. Using the ARD 102, the user can utilize the virtual HMI from a desired distance away from the actual HMI it represents and/or from other components, which can include potentially hazardous components (e.g., in proximity to the actual HMI). The user can view data presented on the virtual HMI displayed on the display screen of the ARD 102 and/or can adjust virtual controls on the virtual HMI using gestures, verbal commands, and/or textual or control commands, as disclosed herein, to facilitate performing tasks associated with the actual HMI and associated system from a remote location that, for example, can be a safe distance away from any potential hazard associated with the actual HMI or system.

In some implementations, a virtual HMI or another virtual operator interface, which can be created in a manner that can be the same as or similar to the creation of the virtual HMI, as disclosed herein, can be employed to facilitate performing tasks or operations in a manner that can be beneficial for hygiene and/or medical related purposes. The virtual operator interface can correspond to an actual operator interface and can be used to access data and perform tasks in a manner same as or similar to how the actual operator interface accesses data and performs tasks, wherein the virtual operator interface can be associated with the actual operator interface. A user of the ARD 102 can use the virtual operator interface (e.g., use or manipulate virtual buttons, controls, levels, and/or parameters, etc., on the virtual operator interface) to control the actual operator interface (e.g., buttons, controls, levels, parameters, etc., on the actual operator interface) to perform tasks or operations without physically touching the actual operator interface (e.g., without touching buttons, controls, levels, parameters, etc., on the actual operator interface). This can be beneficial for hygiene and/or medical related purposes (e.g., food processing, medical equipment or procedures (e.g., medical equipment and/or actual medical procedures, surgeries, intravenous medicine administration, . . . )).

Figure 10:
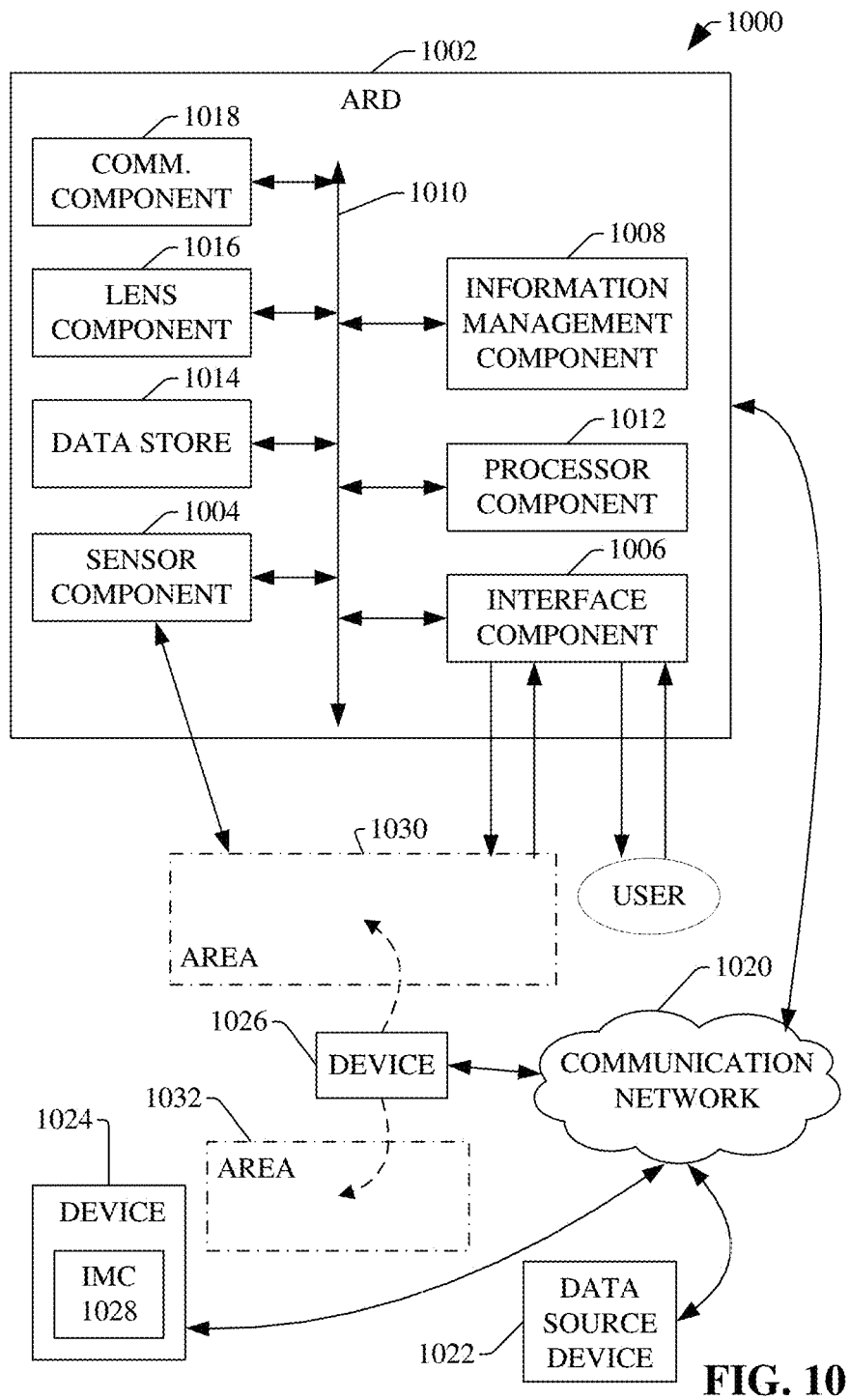
FIG. 10 illustrates a block diagram of an example system that can employ an ARD in a communication network to facilitate performance and/or enhancement of various activities and tasks, in accordance with various embodiments and aspects of the disclosed subject matter.

FIG. 10 illustrates a block diagram of an example system 1000 that can employ an ARD in a communication network to facilitate performance and/or enhancement of various activities and tasks, in accordance with various embodiments and aspects of the disclosed subject matter. The system 1000 can comprise an ARD 1002. While the ARD 1002 is referenced as an augmented reality device, it is to be understood and appreciated that the ARD 1002 also can employ virtual reality functions and features, in addition to augmented reality functions and features, as more fully described herein.

The ARD 1002 can comprise a sensor component 1004, an interface component 1006, an IMC 1008, a bus component 1010, a processor component 1012, and a data store 1014. The ARD 1002, the sensor component 1004, the interface component 1006, the IMC 1008, the bus component 1010, the processor component 1012, and the data store 1014 can respectively be the same as or similar to, and/or can comprise the same or similar functionality as, respective components (e.g., respectively named components), as more fully described herein.

The ARD 1002 also can include a lens component 1016 that can comprise a desired number of lenses (e.g., one lens, two lenses, four lenses, or other desired number of lenses), wherein the lenses can be see-through lenses that a user, who is interacting with or wearing the ARD 1002, can see through the lenses to perceive objects that can be viewable by the user using the user's eyes. In some implementations, one or more display screens of the display component (e.g., 302) can be associated with (e.g., integrated with) the lenses of the lens component 1016 to facilitate presentation (e.g., display) of data (e.g., augmented reality information, images, and/or textual data, . . . ) to the user of the ARD 1002.

The ARD 1002 further can comprise a communicator component 1018 (comm. component) that can facilitate communication of information between the ARD 1002 and other devices via a wireless or wireline communication connection or channel. The communicator component 1018 can utilize one or more communication technologies, such as a cellular technology, an Internet Protocol (IP)-based technology, wireless fidelity (Wi-Fi) technology, Wi-Max technology, gigabit wireless (Gi-Fi) technology, Hi-Fi technology (e.g., providing higher gigabit data communication than Gi-Fi or Wi-Fi), Bluetooth technology, ZigBee technology, near field communication (NFC) technology, near field communication interface protocol (NFI), and/or other type of communication technology(ies) to facilitate communicating data between the ARD 1002 and other devices.

The system 1000 can include a communication network 1020 that can facilitate data communication between the ARD 1002 and other devices associated with the communication network 1020. In some implementations, the communicator component 1018 can facilitate communication of data between the ARD 1002 and other devices in a communication network environment via a communication connection with the communication network 1020. The communication network 1020 can comprise a macro communication network and/or a micro communication network. The macro communication network can be, can comprise, or can be associated with a core network, a cellular network, an IP-based network, Wi-Fi, Wi-Max, Gi-Fi network, Hi-Fi network, Bluetooth, ZigBee, etc. The micro communication network can be associated with the macro communication network, wherein the micro communication network typically can operate in a defined local area (e.g., in or in proximity to a building, a house, a room, or other defined area). The micro communication network can be, can comprise, or can be associated with Wi-Fi, Wi-Max, Gi-Fi, Hi-Fi, Bluetooth, ZigBee, etc., and/or can be associated with (e.g., connected to) the macro communication network. The micro communication network can be or can comprise, for example a local area network (LAN) or wireless LAN (WLAN), that can facilitate connecting certain devices (e.g., ARD 1002 and/or other devices) associated with the micro communication network to each other and/or to the macro communication network. In accordance with various implementations, The macro communication network and/or a micro communication network can employ radio communication, microwave communication, satellite communication, optical communication, sonic communication, electromagnetic induction communication, or any other desired (e.g., suitable) communication technology.

In some implementations, respective communication devices (e.g., ARD 1002, data source device 1022, device 1024, and/or device 1026 (e.g., communication device), . . . ) can be associated with (e.g., communicatively connected to) the communication network 1020 via a wireless communication connection (e.g., via a cell and associated base station) or a wireline (e.g., wired) communication connection. The respective communication devices (e.g., ARD 1002, data source device 1022, device 1024, and/or device 1026, . . . ) can operate and communicate in the communication network environment. At various times, a communication device (e.g., ARD 1002, data source device 1022, device 1024, and/or device 1026, . . . ) can be communicatively connected via a wireless communication connection(s) to one or more radio access networks (RANs) (not shown), which can comprise one or more base stations (not shown) to communicatively connect the communication device to the communication network 1020 to enable the communication device to communicate with other communication devices associated with (e.g., communicatively connected to) the communication network 1020 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 1020 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, wherein x can be virtually any desired integer or real value; Wi-Fi; Gi-Fi; Hi-Fi; etc. The communication network 18 can facilitate routing voice and data communications between a communication device(s) (e.g., ARD 1002, data source device 1022, device 1024, and/or device 1026,) and another communication device (e.g., another of the ARD 1002, data source device 1022, device 1024, and/or device 1026, . . . ) associated with the communication network 1020 in the communication network environment. The communication network 1020 also can allocate resources to the communication devices in the communication network 1020, convert or enforce protocols, establish and enforce quality of service (QOS) for the communication devices, provide applications or services in the communication network 1020, translate signals, and/or perform other desired functions to facilitate system interoperability and communication in the communication network 1020 (e.g., wireless portion of the communication network 1020 or wireline portion of the communication network 1020). The communication network 1020 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., ARD 1002, data source device 1022, device 1024, and/or device 1026, . . . ) is moved through a wireless communication network environment, at various times, the communication device(s) can be connected (e.g., wirelessly connected) to one of a plurality of access points (APs) (e.g., macro or cellular AP, femto AP, pico AP, Wi-Fi AP, Gi-Fi AP, Hi-Fi AP, Wi-Max AP, hotspot (e.g., hotspot 1.x, hotspot 2.x, wherein xis an integer number; communication device (e.g., communication device functioning as a mobile hotspot)) that can operate in the wireless communication network environment. An AP (e.g., a macro base station or micro base station) can serve a specified coverage area to facilitate communication by the communication device(s) (e.g., ARD 1002, data source device 1022, device 1024, and/or device 1026, . . . ) or other communication devices in the wireless communication network environment. An AP can serve a respective coverage cell (e.g., macrocell, femtocell, picocell,) that can cover a respective specified area, and the AP can service mobile wireless devices, such as the communication device(s) (e.g., ARD 1002, data source device 1022, device 1024, and/or device 1026, . . . ) located in the respective area covered by the respective cell, where such coverage can be achieved via a wireless link (e.g., uplink (UL), downlink (DL)). When an attachment attempt is successful, the communication device(s) (e.g., ARD 1002, data source device 1022, device 1024, and/or device 1026, . . . ) can be served by the AP and incoming voice and data traffic can be paged and routed to the communication device(s) through the AP, and outgoing voice and data traffic from the communication device(s) can be paged and routed through the AP to other communication devices in the communication network environment. In some aspects, the communication device(s) (e.g., ARD 1002, data source device 1022, device 1024, and/or device 1026, . . . ) can be connected and can communicate wirelessly using virtually any desired wireless technology, including, for example, cellular, Wi-Fi, Gi-Fi, Hi-Fi, Wi-Max, Bluetooth, WLAN, etc.

In some embodiments, the ARD 1002 can establish a direct communication connection (e.g., a direct wireline or wireless communication connection) with another device(s) (e.g., another ARD, a communication device, . . . ) and can communicate with the other device(s) without using the communication network 1020.

The system 1000 also can include one or more data source devices, such as, for example, the data source device 1022, that can be associated with one or more data sources. The one or more data source devices (e.g., 1022) can be connected to the communication network 1020 to facilitate establishing a communication connection with the ARD 1002 and/or the device 1024. The one or more data sources, via the one or more data source devices (e.g., 1022), can provide data (e.g., extrinsic data) to the ARD 1002 and/or the device 1024 via the communication network 1020. The one or more data sources can comprise data relating to, for example, industrial assets (e.g., industrial devices, industrial processes, . . . ), industrial automation systems, specification or technical information associated with industrial assets or other devices, products, product assembly, safety issues, security issues, training (e.g., job or task training), design assistance (e.g., industrial or HMI design or configuration assistance), weather conditions, environmental conditions, hazardous conditions, emergency conditions, language translation, literature, music, and/or news, etc.

The ARD 1002 (e.g., the IMC 1008 of the ARD 1002) and/or the device 1024 (e.g., an IMC 1028 of the device 1024) can utilize and analyze the data (e.g., extrinsic data) from the one or more data sources, along with other data sensed or otherwise obtained by the ARD 1002 or the device 1024, to facilitate determining or generating desired data (e.g., customized data, such as augmented reality data) that can be presented to the user via the ARD 1002 (e.g., via the interface component 1006 of the ARD 1002).

In some implementations, the device 1024 can comprise the IMC 1028. The IMC 1028 can comprise all or a desired portion of the components, functions, and/or features of the IMC 1008 of the ARD 1002, and/or can have the capability to perform all or a desired portion of the operations and/or tasks that can be performed by the IMC 1008 of the ARD 1002. In some embodiments, the IMC 1008 of the ARD 1002 and the IMC 1028 of the device 1024 can communicate with each other to coordinate performance of operations or tasks.

For example, the IMC 1008 of the ARD 1002 can communicate and coordinate with the IMC 1028 of the device 1024 to have the IMC 1028 perform certain operations or tasks on behalf of the IMC 1008. This can be done to, for example, offload the certain operations or tasks to the IMC 1028 to (e.g., free up resources of the IMC 1008 to) enable the IMC 1008 to utilize some of its resources to perform other operations or tasks, and/or to enable parallel performance of operations or tasks (e.g., parallel processing of data) by the IMC 1008 and the IMC 1028, which can increase the speed at which desired data (e.g., customized data, such as augmented reality data) can be presented to the user via the ARD 1002. The IMC 1028 (or another component) of the device 1024 can communicate data relating to the performance of the certain operations or tasks to the IMC 1008 of the ARD 1002, via the communication network 1020, for further processing by the IMC 1008 (if further processing is desired or necessary) or for presentation (e.g., via the interface component 1006 of the ARD 1002) to the user of the ARD 1002.

In some implementations, the ARD 1002 can be employed by the user to have the ARD 1002 communicate with, interact with, and/or control (e.g., communicate with, remotely interact with and/or control) one or more devices, such as, for example, the device 1026 via the communication network 1020 and/or via a direct communication connection (e.g., direct wireless or wireline communication connection) between the ARD 1002 and the one or more devices (e.g., 1026). The one or more devices (e.g., 1026) can be located in an area 1030 where the user is located or that is in proximity to the location of the user and associated ARD 1002, or can be located in another area 1032 that is remote from the location of the user and associated ARD 1002. The one or more devices (e.g., 1026) can be, can be part of, and/or can be associated with a robotic device, a drone, a SCADA system, an industrial device or other type of device, an industrial process, a network component that facilitates communication network communications, a house, a building, another type of structure, law enforcement, a fire department, an emergency response entity, a hazard response entity, and/or another entity.

The ARD 1002, and the user via the ARD 1002, can communicate with, interact with, and/or control (e.g., communicate with, remotely interact with and/or control) the device 1026 to monitor operations and conditions of the device 1026 and/or components associated with or in proximity to the device 1026, obtain data regarding operations and conditions of the device 1026 and/or components associated with or in proximity to the device 1026, modify one or more parameters of the device 1026, detect a hazardous condition of or associated with the device 1026 and/or components associated with or in proximity to the device 1026, adjust parameters or operation of the device 1026 to mitigate (e.g., alleviate, reduce, or eliminate) the hazardous condition, utilize and control the device 1026 to perform operations or tasks (e.g., perform an assembly task to facilitate assembling a product, perform a task to mitigate a hazardous condition), and/or have other interactions with or control over the device 1026, without the user having to touch or physically view the device 1026 and/or components associated with or in proximity to the device 1026.

For instance, from the location where the ARD 1002 and user are located, the ARD 1002 can be employed by the user to communicate with, interact with, and control (e.g., remotely communicate with, interact with, and control) the device 1026 to perform (e.g., remotely perform) tasks in the area (e.g., area 1030 or area 1032) where the device 1026 is located. For example, there can be an oil pump (e.g., a relatively dangerous oil pump) in an area (e.g., area 1032). It can be desirable for the user of the ARD 1002 to control operations of the oil pump in that area (e.g., area 1032) without the user having to physically go to the oil pump and perform tasks to control operations of the oil pump, in order to keep the user from being subjected to the potential dangers of being in physical proximity to the oil pump.

The user can employ the ARD 1002 and the device 1026, which can be, for example, a drone or other robotic device, to perform the tasks with respect to the oil pump without the user being in physical proximity to the oil pump. The user, through voice commands, written commands, and/or gestures representing commands to the ARD 1002, can use the ARD 1002 to perform operations and tasks to control (e.g., remotely control) the device 1026, to have the device 1026 move (e.g., navigate, fly, or otherwise travel) to the oil pump and perform the tasks on the oil pump that the user desires to have performed to enable suitable and safe operation of the oil pump. For example, the device 1026 can be a drone and the user can employ the ARD 1002 to control the drone to have the device 1026 (e.g., drone) move (e.g., fly) to the oil pump and perform the tasks on the oil pump. As another example, the device 1026 can be a robotic device, and the ARD 1002 can control a drone to have the drone transport the device 1026 (e.g., robotic device) to the oil pump, and can control the device 1026 (e.g., robotic device) to perform the tasks on the oil pump.

In connection with controlling the operation of the device 1026, the ARD 1002 can receive information (e.g., images, sensor data from sensors of the device 1026, audio information, . . . ) from the device 1026 and/or information (e.g., images, sensor data from other sensors, audio information, . . . ) from one or more other data sources (e.g., via data source device 1022 and/or the IMC 1028 of device 1024), wherein such information can relate to the operation of the device 1026, the operation or conditions of the oil pump, and/or the operation or conditions of other components associated with (e.g., in proximity to) the oil pump.

The IMC 1008 of the ARD 1002 (and/or the IMC 1028) can determine data (e.g., customized data, such as augmented reality information) that can useful and relevant to the user in using the ARD 1002 to control operations of the device 1026 to perform the desired tasks on the oil pump. For example, automatically, dynamically, or based at least in part on instructions or feedback from the user, the IMC 1008 (and/or the IMC 1028) can determine that images (e.g., live images provided by the device 1026, with other relevant data, such as, a heat map of the oil pump, a hazard warning indicator (if any) associated with the oil pump, parameter information (e.g., in textual form or in graphic or meter form) associated with the oil pump, virtual objects associated with the oil pump (e.g., objects inside the oil pump that are not visible in the images), and/or an abnormal data indicator (if any) associated with the oil pump, are to be presented on the display screen(s) of the ARD 1002 for observation and use by the user, in accordance with the defined information management criteria and/or user preferences. The IMC 1008 can facilitate presenting the customized data, comprising the augmented reality data and/or virtual reality data (e.g., the images and the other relevant data), on the display screen(s) of the ARD 1002 to the user. The ARD 1002 can update (e.g., modify) the images and the other relevant data associated with the oil pump presented on the display screen(s) of the ARD 1002 to the user in real time, or at least in substantially real time (e.g., on a subsecond basis). The user can use such data presented on the display screen(s) of the ARD 1002 to decide what action to take with regard to performing tasks with respect to the oil pump. The user can communicate voice, textual, and/or gesture commands, instructions, or requests to the interface component 1006 of the ARD 1002 to control operation of the ARD 1002 to have the ARD 1002 control operations and the performance of tasks by the device 1026 on or with respect to the oil pump.

Figure 11:
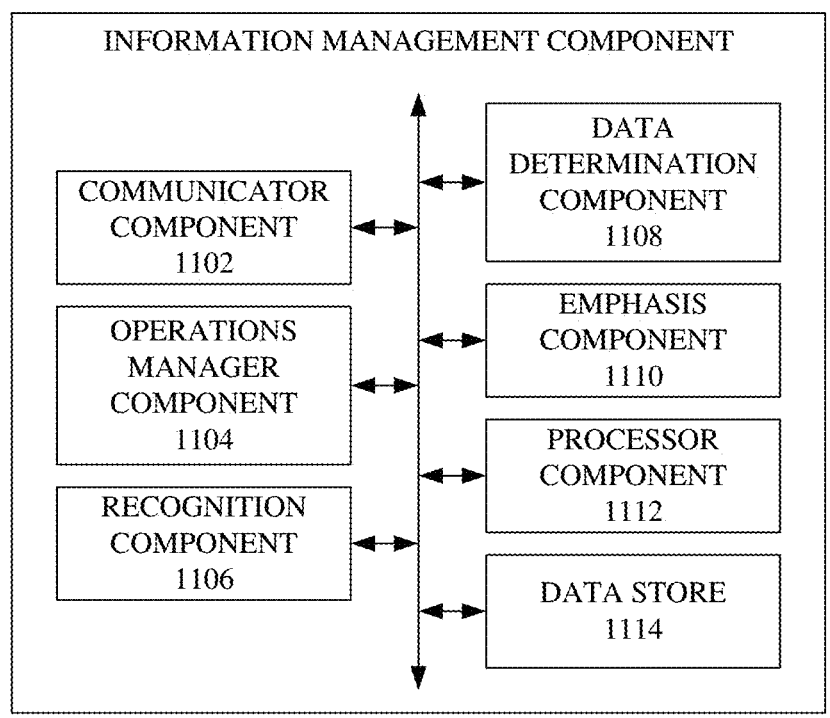
FIG. 11 depicts a block diagram of an example information management component, in accordance with various embodiments and aspects of the disclosed subject matter.

FIG. 11 depicts a block diagram of an example IMC 1100, in accordance with various embodiments and aspects of the disclosed subject matter. In some embodiments, the IMC 1100 can part of an ARD associated with a user. In other embodiments, the IMC 1100 can part of a device that can communicate with an IMC of the ARD to facilitate presenting desired data (e.g., customized data, such as augmented reality data) to the user of the ARD.

The IMC 1100 can comprise, for example, a communicator component 1102, an operations manager component 1104, a recognition component 1106, a data determination component 1108, an emphasis component 1110, a processor component 1112, and a data store 1114.

The communicator component 1102 can communicate data between the IMC 1100 and one or more other components or devices, such as, for example, other components (e.g., the sensor component, the interface component, the bus component,) of the ARD, and devices (e.g., communication device, data source device, . . . ) associated with one or more entities (e.g., another user(s), a data source(s), an emergency response entity, law enforcement, a fire department, . . . ). The communicator component 1102 can communicate information using wireline or wireless communication technologies and protocols, as more fully described herein. The communicator component 1102 also can facilitate communicating desired data (e.g., customized data, such as augmented reality data) for presentation, via the ARD, to a user.

The operations manager component 1104 can control (e.g., manage) operations associated with the IMC 1100. For example, the operations manager component 1104 can facilitate generating instructions to have components of the IMC 1100 perform operations, and can communicate respective instructions to respective components (e.g., communicator component 1102, recognition component 1106, data determination component 1108, emphasis component 1110, . . . ) of the IMC 1100 to facilitate performance of operations by the respective components of the IMC 1100 based at least in part on the instructions, in accordance with the defined information management criteria and the defined information management algorithm(s). The operations manager component 1104 also can facilitate controlling data flow between the respective components of the IMC 1100 and controlling data flow between the IMC 1100 and another component(s) (e.g., the sensor component, the interface component, and/or the bus component, . . . ) of the ARD or a device(s) (e.g., another ARD; a device, such as a communication device, associated with a remote location; a data source device(s)) associated with (e.g., connected to) the IMC 1100.

The recognition component 1106 can employ one or more recognition techniques to detect and/or determine characteristics, features, or conditions of entities or objects to facilitate recognizing or identifying entities or objects. The recognition component 1106 can comprise all or at least a portion of the capabilities and functionality of the recognition component of the sensor component, as more fully described herein, and/or can comprise other capabilities and functionality beyond that of the recognition component of the sensor component. In some implementations, the recognition component of the sensor component can sense or detect characteristics, features, or conditions of entities or objects. The recognition component of the sensor component can recognize or identify the entities or objects based at least in part on the characteristics, features, or conditions of entities or objects. Additionally or alternatively, the recognition component 1106 can analyze the sensor data relating to the characteristics, features, or conditions of entities or objects sensed by the sensor component and/or at least partially analyzed by the recognition component of the sensor component, and the recognition component 1106 can recognize or identify the entities or objects based at least in part on the sensor data (e.g., the detected characteristics, features, or conditions of entities or objects).

The data determination component 1108 can analyze data, including sensor data obtained from the sensor component, data obtained from other data sources, user preference data from a user profile or from instructions from the user, and/or other data. Based at least in part on the results of that analysis, the data determination component 1108 can determine a set of customized data, such as augmented reality data and/or virtual reality data, to present via the interface component (e.g., display screen(s), audio component, haptic component, . . . ) of the ARD to the user, in accordance with the defined information management criteria. The data determination component 1108 can determine what types of data to present (e.g., images (e.g., photographs, IR images, . . . ), virtual images or objects, textual data, audio data, and/or haptic feedback data) via the interface component of the ARD to the user, what respective forms respective items of data are to be presented (e.g., present heat or temperature related data in the form of a heat map; present warning or hazard indicators when abnormal data or hazards are detected; present parameter data in text form or virtual meter form; . . . ) via the interface component of the ARD to the user, what respective locations, on a display screen(s) associated with the lens component of the ARD, the respective items of data are to be presented (e.g., to desirably correspond to the respective locations of objects, entities, environment, etc., that the user can perceive in the user's field of view through the lens component of the ARD and/or on the display screen(s) of the ARD), etc.

The emphasis component 1110 can emphasize or highlight information (e.g., visual information) presented on a display screen(s) of the AR, information presented in audio form via the audio component, or information otherwise presented via the interface component of the AR to the user. For example, the user can be performing assembly tasks in connection with assembly of a product, the data determination component 1108 can determine the next part to be installed as part of the product assembly, based at least in part on analysis of sensor data obtained from the sensor component and/or other data obtained from other data sources. Based at least in part on the determination of the next part to be installed, as the user views through the lens component of the AR, the emphasis component 1110 can emphasize (e.g., highlight) the next part, for example, in a part bin of various parts relative to the other parts in the part bin to facilitate identification and selection of the next part by the user.

For instance, on a display screen associated with the lens component of the AR, the emphasis component 1110 can generate and present a visual indicator (e.g., a colored circular or rectangular ring) on the display screen in proximity to or surrounding the location on the display screen where the user perceives (e.g., sees) the next part through the lens component and associated display screen to emphasize or highlight the next part on the display screen for correct selection by the user. As another example, additionally or alternatively, on the display screen associated with the lens component of the AR, the emphasis component 1110 can magnify the next part (and/or the location of the bin containing the next part) to enlarge the next part (or associated bin) relative to the other parts (or other bins) and/or can otherwise de-emphasize other parts in the part bin (and/or de-emphasize other bins in the part bin) (e.g., by magnifying and/or maintaining clear view of the next part (and associated bin) and blurring or otherwise de-emphasizing the other parts (or other bins)). Conversely, based at least in part on data analysis results from the data determination component 1108 indicating the part the user is attempting to select for installation on the product is not correct, the emphasis component 1110 can emphasize when the user is attempting to select the wrong part for installation as the next part on the product by facilitating presenting a negative indicator (e.g., a red circle with a line through the circle on the display screen of the ARD) over the part (e.g., in a corresponding location on the display screen and lens component, as viewed by the user) to notify the user that the attempted selection of the part is incorrect.

The emphasis component 1110 also can highlight or otherwise emphasize a location on a product (e.g., via emphasis of a corresponding location on the display screen and lens component of the ARD) where the next part is to be installed on the product, based at least in part on a determination of such location (and corresponding location) by the data determination component 1108 (e.g., based at least in part on results of data analysis of sensor data and/or other data by the data determination component 1108). Conversely, based at least in part on data analysis results from the data determination component 1108 indicating an attempt to install the next part at a particular location on the product is not correct, the emphasis component 1110 can emphasize when the user is attempting to install the next part in the wrong location on the product by facilitating presenting a negative indicator (e.g., a red circle with a line through the circle on the display screen of the ARD) over the part and/or attempted location (e.g., in a corresponding location(s) on the display screen and lens component, as viewed by the user) to notify the user that the attempted location on the product is the wrong location to install the part.

The processor component 1112 can operate in conjunction with the other components (e.g., communicator component 1102, operations manager component 1104, recognition component 1106, data determination component 1108, emphasis component 1110, data store 1114, . . . ) to facilitate performing the various functions and operations of the IMC 1100. The processor component 1112 can employ one or more processors (e.g., CPUs, GPUs, FPGAs, etc.), microprocessors, or controllers that can process data, such as data relating to a user of the ARD, data relating to an environment in which the user and the ARD are located, maintenance-related data, safety-related data, security-related data, design-related data (e.g., data relating to design of an industrial automation system, or data relating to design of a product), HMI design-related data, asset-related data (e.g., device data, process data, asset data, system data, etc.) associated with systems (e.g., industrial automation systems) or products, customer or client related data, data relating to parameters associated with systems or products, algorithms (e.g., algorithm(s) relating to recognizing or identifying respective industrial devices, industrial processes, industrial assets, network-related devices, interrelationships between such devices, processes, or assets), etc., to facilitate performing operations and tasks (e.g., in connection with an industrial automation system(s), or in connection with another type of environment); and can control data flow between the IMC 1100 and other components or devices associated with the IMC 1100.

In accordance with various aspects, the data store 1114 can store data structures (e.g., user data, metadata); code structure(s) (e.g., modules, objects, classes, procedures), commands, or instructions; data relating to a user of the ARD, data relating to an environment in which the user and the ARD are located, maintenance-related data, safety-related data, security-related data, design-related data (e.g., data relating to design of an industrial automation system, or data relating to design of a product), HMI design-related data, asset-related data (e.g., device data, process data, asset data, system data, etc.) associated with systems (e.g., industrial automation systems) or products, customer or client related data, data relating to parameters associated with systems or products, algorithms (e.g., algorithm(s) relating to recognizing or identifying respective industrial devices, industrial processes, industrial assets, network-related devices, interrelationships between such devices, processes, or assets), and so on. The processor component 1112 can be functionally coupled (e.g., through a memory bus of a bus component) to the data store 1114 in order to store and retrieve data desired to operate and/or confer functionality, at least in part, to the communicator component 1102, operations manager component 1104, recognition component 1106, data determination component 1108, emphasis component 1110, etc., of the IMC 1100 and/or substantially any other operational aspects of the IMC 1100.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Embodiments, systems, and components described herein, as well as industrial automation or control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drive(s), as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In view of the example systems and/or devices described herein, example methods that can be implemented in accordance with the disclosed subject matter can be further appreciated with reference to flowcharts in FIGS. 12-15. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 12:
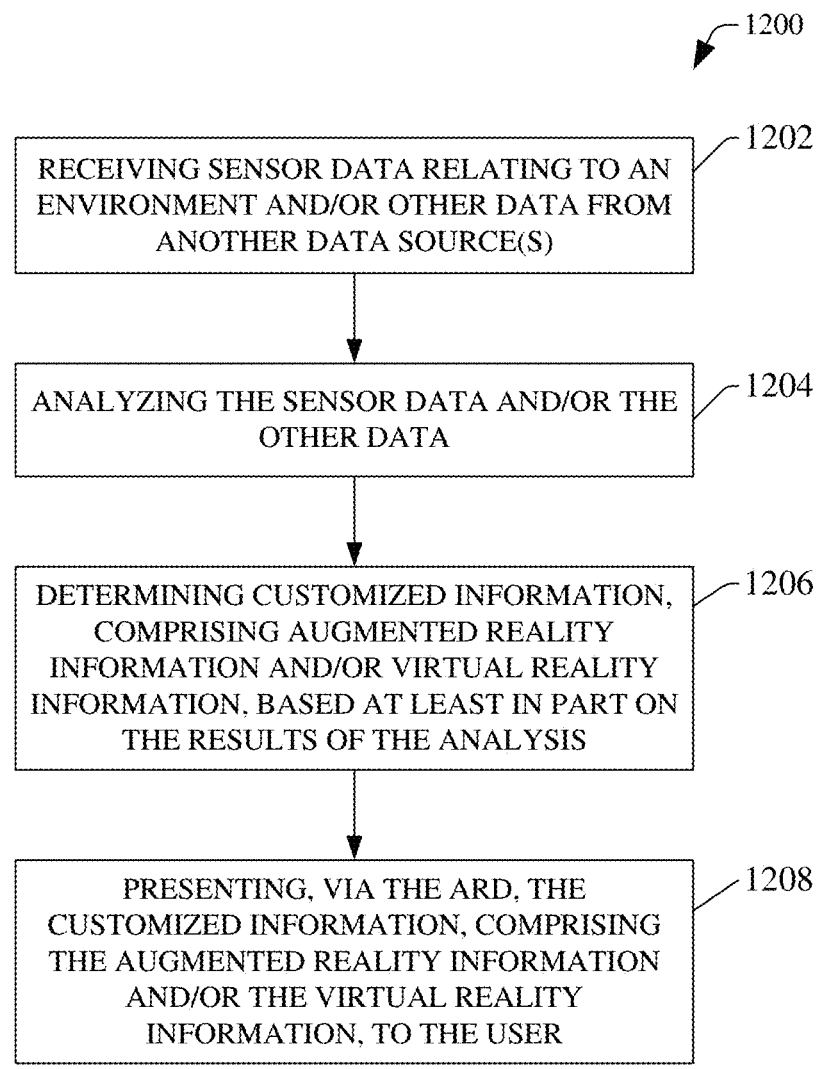
FIG. 12 illustrates a flow chart of an example method that can determine and present customized information, comprising augmented reality information, to a user to facilitate performance of tasks by the user, in accordance with various aspects and embodiments of the disclosed subject matter.

FIG. 12 illustrates a flow chart of an example method 1200 that can determine and present customized information, comprising augmented reality information, to a user to facilitate performance of tasks by the user, in accordance with various aspects and embodiments of the disclosed subject matter. The method 1200 can be employed by, for example, an IMC of an ARD.

At 1202, sensor data relating to an environment and/or other data from another data source(s) can be received. The IMC can receive the sensor data from one or more sensors of the sensor component and/or can receive other data from one or more other data sources. The one or more other data sources can comprise the data store of the ARD and/or one or more external data sources that are external to the ARD, but can be accessed by the ARD (e.g., via a communication network or a direct communication connection). The sensor data can relate to, for example, the environment associated with (e.g., surrounding) the ARD. The other data obtained from the one or more other data sources can relate directly to the environment and/or can otherwise be relevant to the environment or the tasks to be performed or activities of the user of the ARD.

At 1204, the sensor data and/or the other data can be analyzed. The IMC can analyze the sensor data and/or the other data to generate analysis results, to facilitate determining customized information (e.g., augmented reality information and/or virtual reality information) to present, via the ARD, to the user.

At 1206, customized information, comprising augmented reality information and/or virtual reality information, can be determined based at least in part on the results of the analysis. The IMC can determine the customized information, comprising the augmented reality information and/or the virtual reality information, based at least in part on the results of the analysis of the sensor data and/or other data, in accordance with the defined information management criteria and/or user preferences or instructions of the user.

At 1208, the customized information, comprising the augmented reality information and/or the virtual reality information, can be presented, via the ARD, to the user. The IMC can control the interface component to facilitate presenting the customized information, comprising the augmented reality information and/or the virtual reality information, via the interface component of the ARD, to the user. For example, as determined by the IMC, the customized information can be presented via a display screen of the display component of the interface component, presented via the audio component (e.g., speakers) of the interface component, and/or presented via the haptic component of the interface component, to the user.

Figure 13:
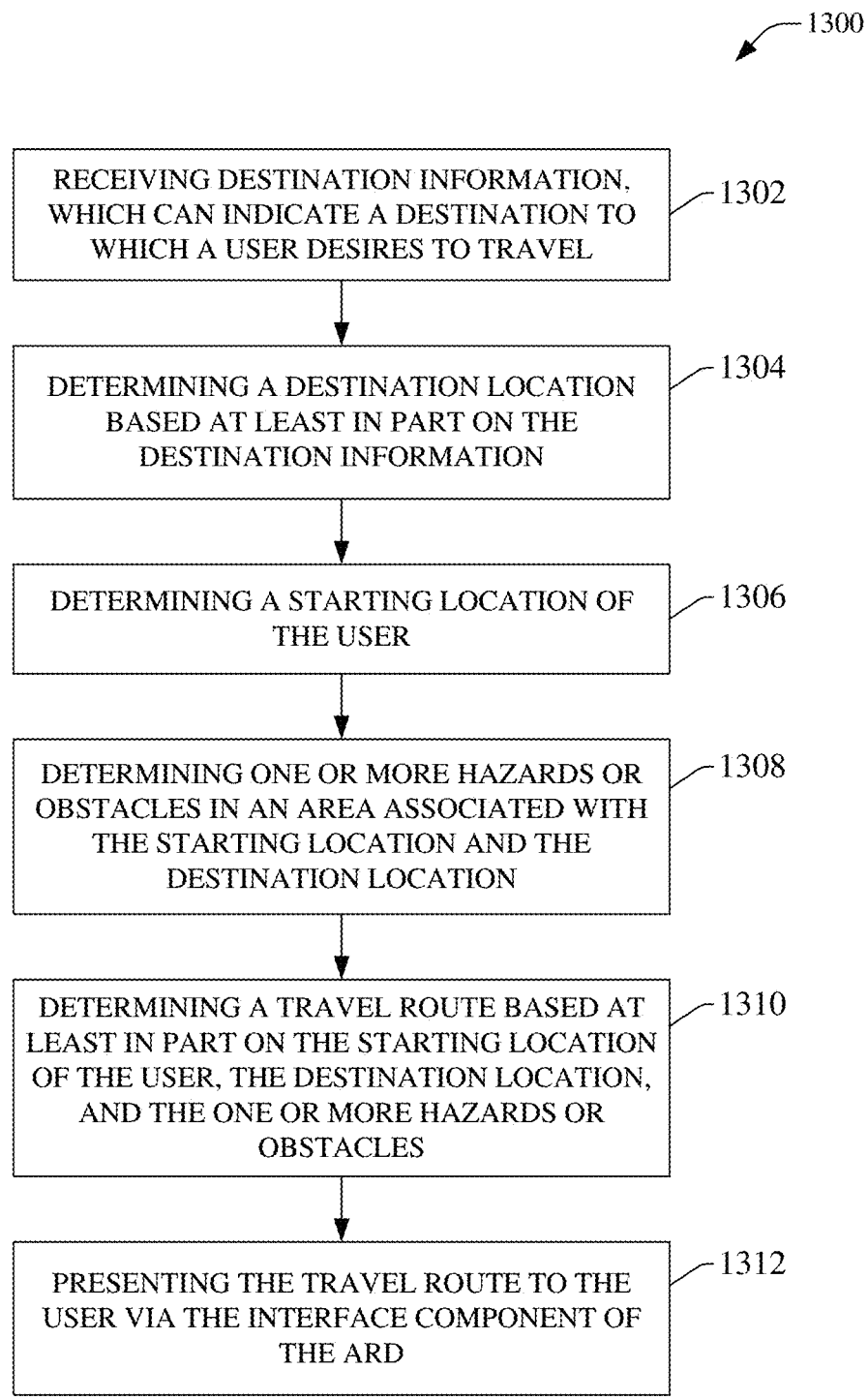
FIG. 13 presents a flow chart of an example method that can determine and present customized information, comprising augmented reality information, to facilitate generating a map comprising a travel route that includes indicators for hazards and/or obstacles, in accordance with various aspects and embodiments of the disclosed subject matter.

FIG. 13 presents a flow chart of an example method 1300 that can determine and present customized information, comprising augmented reality information, to facilitate generating a map comprising a travel route that includes indicators for hazards and/or obstacles, in accordance with various aspects and embodiments of the disclosed subject matter. The method 1300 can be employed by, for example, an IMC of an ARD and/or another component(s) of the ARD.

At 1302, destination information, which can indicate a destination to which a user desires to travel, can be received. The user can submit the destination information via an interface component, wherein the destination information can specify a destination to which a user desires to travel. The user can provide the destination information to the interface component using a keyboard of the interface component, by selecting a link relating to the destination, by speaking the destination information into a microphone of the interface component, or in another desired way. The IMC can receive the destination information from the user via the interface component.

The destination can be a street location (e.g., a house or a building located on a street), a place (e.g., a particular location in a park; a particular location in or on a desert, a mountain, or a wooded area; a particular location on a body of water), a location inside a house or building. The destination information can comprise an address (e.g., street address), a name of the destination, a room number, a room name, a floor number, and/or other information that can indicate the destination.

At 1304, a destination location can be determined based at least in part on the destination information. The IMC can determine or facilitate determining (e.g., a navigation or GPS system of the sensor component) the destination location based at least in part on the destination information.

At 1306, a starting location of the user can be determined. The starting location of the user can be the current location of the user or another location that can be indicated by the user. The IMC or a sensor component (e.g., the navigation or GPS system) can determine the current location of the user based at least in part sensor information relating to location of the user (e.g., location of the ARD of the user) that is sensed by the sensor component. As desired, the user can provide origination information for another location, different from the current location, to use as a starting location via the interface component in a manner similar to providing the destination information. The IMC can determine the starting location based at least in part on the origination information received from the user.

At 1308, one or more hazards or obstacles in an area associated with the starting location and the destination location can be determined. The IMC can determine the one or more hazards or obstacles based at least in part on sensor information received from one or more sensors of the sensor component.

At 1310, a travel route can be determined based at least in part on the starting location of the user, the destination location, and the one or more hazards or obstacles. The IMC can determine or facilitate determining (e.g., via the navigation or GPS system) the travel route between the starting location and the destination location based at least in part on the respective locations of the starting location and the destination location, and the one or more hazards or obstacles. The IMC can tailor or facilitate tailoring the travel route based at least in part on whether the user will be walking, riding a non-motorized vehicle (e.g., bicycle), riding in a motor vehicle (e.g., automobile), and/or whether the user has a disability and, if so, the type of disability (e.g., blind, deaf). The IMC also can tailor or facilitate tailoring the travel route to facilitate avoiding or at least substantially avoiding the one or more hazards or obstacles.

At 1312, the travel route can be presented to the user via the interface component of the ARD. The IMC can facilitate presenting customized information (e.g., augmented reality information and/or virtual reality information), comprising the travel route, to the user via the interface component of the ARD associated with the user. The travel route can provide a map of the travel route, textual directions of the travel route, and/or audio directions of the travel route. The travel route information, such as the map, textual directions, and/or audio directions, can provide information regarding the one or more hazards or obstacles. For example, the map can include one or more indicators at respective locations on the map, wherein the one or more indicators can indicate the respective locations of the one or more hazards or obstacles, the type of hazard or obstacle, a level of danger of a hazard or obstacle, and/or other information regarding the one or more hazards and obstacles.

As the user proceeds from the starting location to the destination location, the IMC can update (e.g., modify or adjust) the travel route information (e.g., update the customized information), for example, to indicate a current location of the user relative to the starting location and destination location, indicate whether the user is currently on the travel route or has deviated from the travel route, update (e.g., modify or adjust) the travel route based at least in part on the current location or the user relative to the destination location and/or a deviation from the travel route, update the travel route based at least in part on a newly discovered hazard or obstacle, and/or notify the user of a new hazard or obstacle (e.g., a "Don't Walk" light at a traffic intersection along the travel path, a curb on a street the user is crossing, or a hostile person or criminal with a weapon, . . . ). The IMC can facilitate presenting, via the interface component of the ARD, the updated travel route information (e.g., updated travel route and map) to the user.

Figure 14:
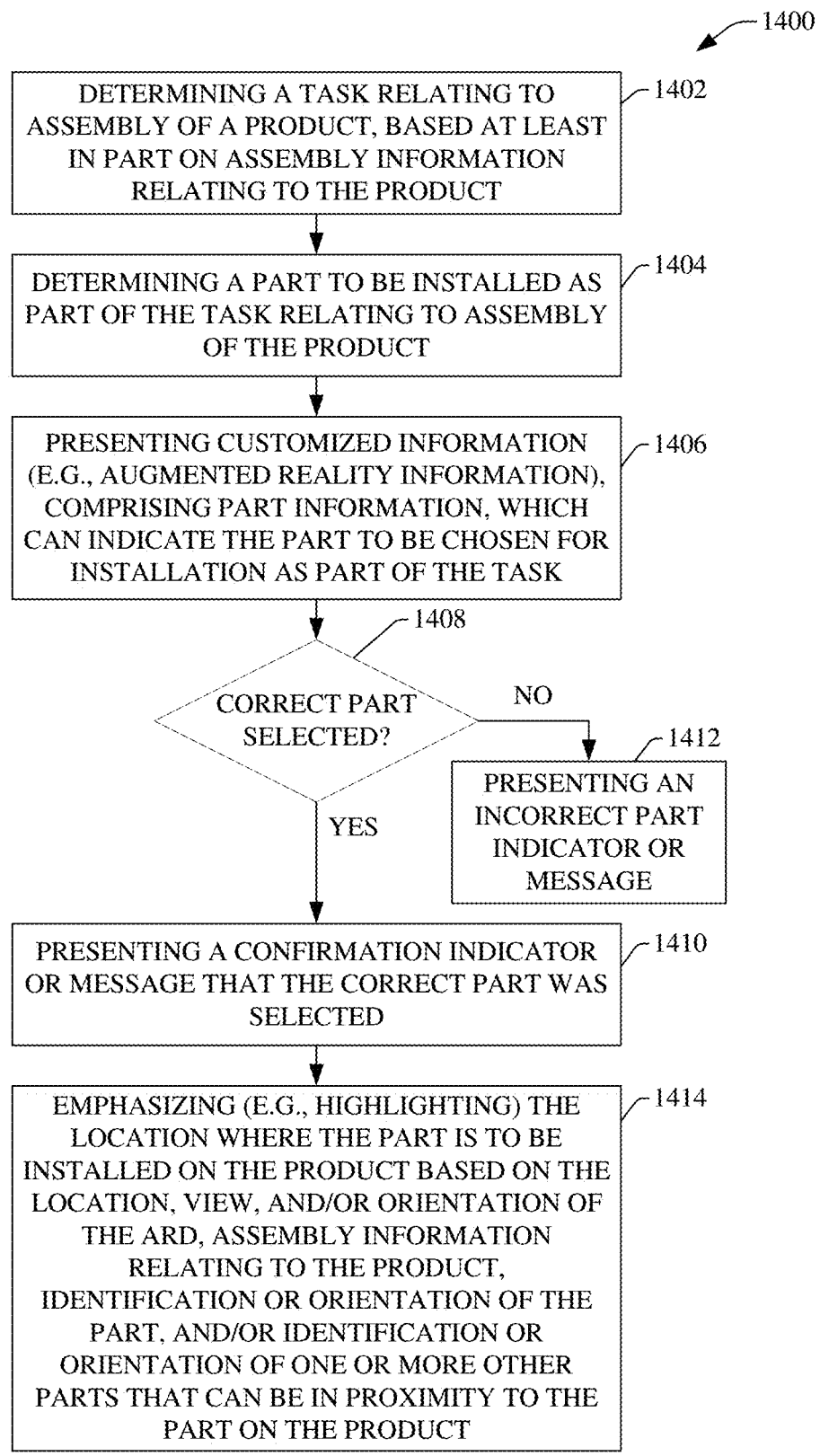
FIG. 14 depicts a flow chart of an example method that can determine and present customized information, comprising augmented reality information, to facilitate performance of product assembly tasks, in accordance with various aspects and embodiments of the disclosed subject matter.

FIG. 14 depicts a flow chart of an example method 1400 that can determine and present customized information, comprising augmented reality information, to facilitate performance of product assembly tasks, in accordance with various aspects and embodiments of the disclosed subject matter. The method 1400 can be employed by, for example, an IMC of an ARD.

At 1402, a task relating to assembly of a product can be determined, based at least in part on assembly information relating to the product received from a data store, a sensor component, and/or a user. The IMC can receive the assembly information, comprising task-related information, from the data store, the sensor component (e.g., one or more sensors) and/or the user. The IMC can analyze the assembly information. Based at least in part on the results of the analysis, the IMC can determine the task (e.g., next task) relating to assembly of the product. The assembly information can comprise directions and images relating to assembling the product, including information regarding the respective parts of the product, the order of installation of parts of the product, respective parameters of respective parts, any notable considerations, conditions, or hazards associated with assembling the product, and/or other types of assembly information. Notable considerations, conditions, or hazards associated with assembling the product can comprise, for example, that part "A" is sharp and is to be handled with care, part "B" is fragile and is to be handled with care, installation of part "C" on the product involves high voltage and potential for electrical shock, so suitable care and precautions should be taken, part "D" has to be installed before part "E" is installed, and/or other considerations, conditions, or hazards associated with assembling the product.

At 1404, a part to be installed as part of the task relating to assembly of the product can be determined. The IMC can identify or determine the part to be installed as part of the assembly task based at least in part on the assembly information relating to assembly of the product, which can be stored in the data store.

At 1406, customized information (e.g., augmented reality information), comprising part information, which can indicate the part to be chosen for installation as part of the task, can be presented to the user. The IMC can generate and/or facilitate presenting, via the interface component of the ARD associated with the user, the customized information, comprising the part information, to the user. The customized information (e.g., augmented reality information), comprising the part information, can include audio information regarding the part information presented via the interface component (e.g., speaker(s) of the ARD), and/or can include a visual presentation regarding the part information (e.g., a drawing of the part (e.g., in space), and/or the part being visually highlighted or emphasized by color, by flashing, and/or by other emphasis means), for example, as if the part is present (e.g., virtually present) in the live view of the assembly of the product (e.g., partial assembly comprising the part) that can be viewable through the ARD by the user. The customized information, comprising the part information, can facilitate instructing the user as to which part to select (e.g., choose) for installation at this point in the assembly process.

At 1408, in response to selection of the part by the user, a determination can be made regarding whether the user selected the correct part. In response to selection of the part by the user, the IMC, employing the sensor component, can determine whether the user selected the correct part. The sensor component (e.g., camera) of the ARD can detect the part selected (e.g., picked up and held) by the user and can provide sensor information relating to detection of the part selected by the user to the IMC. The IMC can determine the part that was selected by the user based at least in part on the sensor information and part identification information obtained from a data store, wherein the part identification information can facilitate identifying the selected part. For example, the IMC can compare an image of the part captured by the sensor component to images of parts stored in the data store and can determine an image of a part in the data store that matches or at least substantially matches the image of the part captured by the sensor component, wherein the image of the part in the data store can be associated with identification information that can identify the part and can identify where and when the part is to be installed in the assembly process.

If, at 1408, it is determined that the user selected the correct part, at 1410, a confirmation indicator or message that the correct part was selected can be presented. For instance, if the IMC determines that the user selected the correct part, the IMC can generate and facilitate presenting, via the interface component (e.g., a display screen and/or an audio speaker of the ARD), the confirmation indicator or message. The confirmation indicator or message, for example, can be a colored (e.g., green) indicator that can highlight or emphasize the selected part (e.g., the selected part can be outlined in green in the visual display of the ARD) to indicate the correct part was selected and/or voice information confirming that the correct part was selected can be communicated via the speaker to the user.

If, at 1408, it is determined that the user did not select the correct part, at 1412, an incorrect part indicator or message can be presented (e.g., via the ARD). If the IMC determines that the user did not select the correct part, the IMC can generate and facilitate presenting, via the interface component (e.g., the display screen and/or audio speaker of the ARD), the incorrect part indicator or message. The incorrect part message, for example, can be a colored (e.g., red) indicator that can highlight or emphasize the selected part (e.g., the selected part can be outlined in red in the visual display of the ARD) to indicate the wrong part was selected by the user and/or voice information indicating that the wrong part was selected can be communicated via the speaker to the user.

At 1414, in response to determining the part to be installed as part of the task, the location where the part is to be installed on the product can be emphasized (e.g., highlighted) based at least in part on the location, view, and/or orientation of the ARD, assembly information relating to the product, identification or orientation of the part, and/or identification or orientation of one or more other parts that can be in proximity to the part on the product. In response to determining the part to be installed as part of the task, the IMC can emphasize, via a display screen of the ARD, the location on the product where the part is to be installed based at least in part on the location, view, and/or orientation of the ARD, the assembly information relating to the product, the identification or orientation of the part, and/or the identification or orientation of the one or more other parts in proximity to the part on the product. The emphasis provided on the display screen of the lens component of the ARD can be, for example, an emphasis or highlight, such as a colored (e.g., green) and shaped (e.g., circular or rectangular shaped) indicator around (e.g., surrounding) the location, an arrow indicator pointing at the location, and/or a message in proximity to the location.

The IMC, employing sensors of the sensor component, can determine the location, orientation, motion, and field of view of the ARD of the user. In some implementations, the IMC can retrieve assembly information relating to the product from the data store, and can determine (e.g., automatically) the location on the product where the part is to be installed based at least in part on the assembly information. The IMC can determine the position in the field of view on the display screen of the lens component of the ARD that corresponds to (e.g., aligns with) the location where the part is to be installed. The IMC can emphasize that position in the display screen of the ARD to facilitate emphasizing the corresponding location where the part is to be installed on the product, wherein, if the position changes due, for example, to the user moving the ARD (e.g., the user moving his head and the ARD thereon), the IMC can move the position on the display screen to continue to have the position on the display screen, and, accordingly, the emphasis on the display screen of the ARD, correspond to the location where the part is to be installed on the product.

In other implementations, the IMC can determine (e.g., dynamically and/or automatically) the location where the part is to be installed based at least in part on the results of an analysis of the part and analysis of other parts associated with the product. For instance, the IMC, employing sensors of the sensor component, can employ object recognition to determine the part and the one or more other parts of the product that are in proximity or connected to the part on the product when the part is installed on the product, including determining the respective orientations of the respective parts, determining respective dimensions or shapes of the respective products, and/or other respective characteristics of the respective parts. For example, if the part is a screw that is to be inserted into a threaded hole at the location on a portion the product, the IMC can identify or determine the dimensions (e.g., diameter and/or length) of the screw, the threading of the screw, the dimensions (e.g., diameter and/or length) of the threaded hole, the threading of the threaded hole, and/or other respective characteristics of the respective screw and threaded hole (and/or respective characteristics of other parts of the product) based at least in part on sensor information from the sensor component and object recognition of the respective parts. If the IMC determines that dimensions and threading of the screw correspond to the dimensions and threading of the threaded hole and/or other assembly information confirms or corroborates that the screw is to be installed in that threaded hole, the IMC can determine that the screw is to be installed in the threaded hole at the location on the portion of the product.

Figure 15:
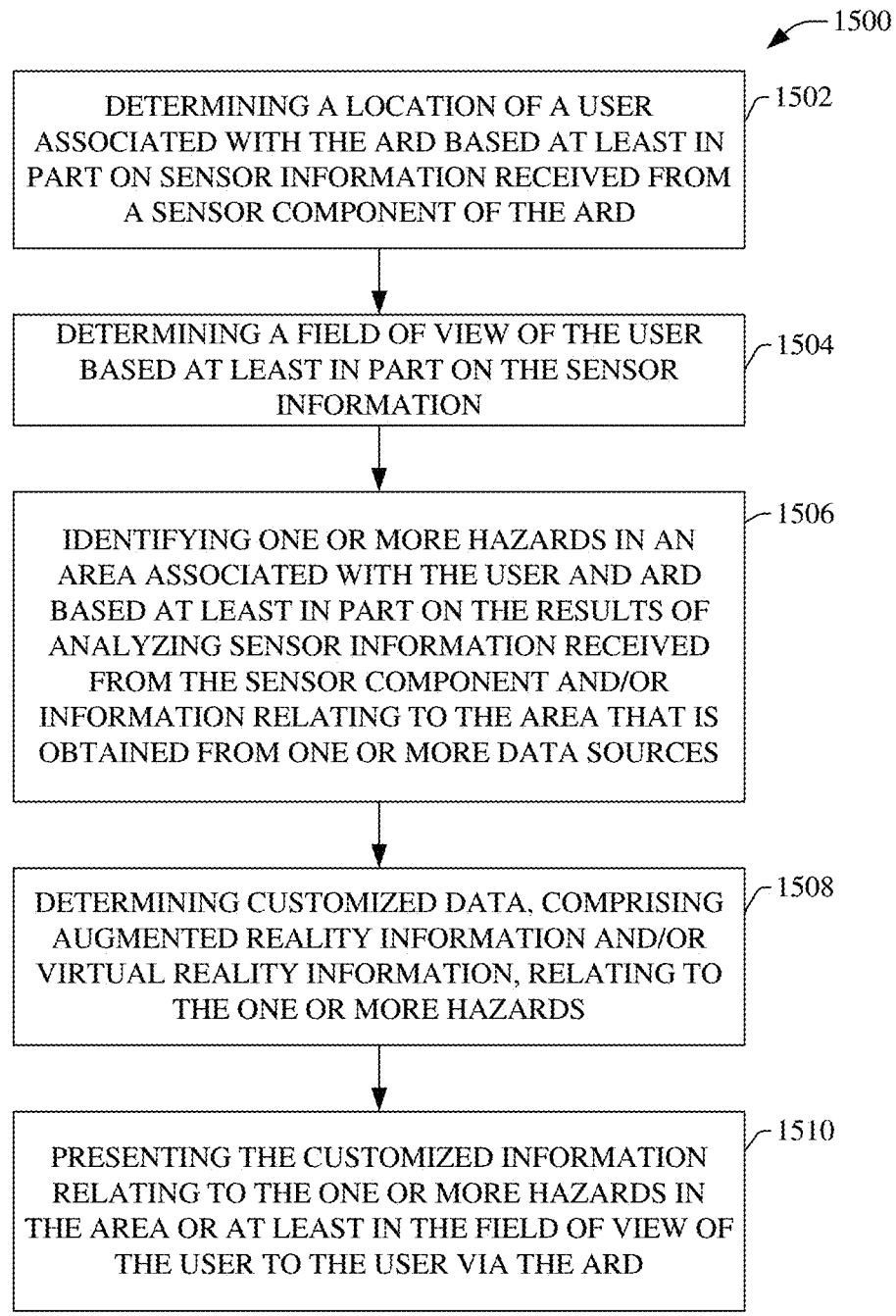
FIG. 15 illustrates a flow chart of an example method that can determine hazards in an area, and can determine and present customized information, comprising augmented reality information, via an ARD to facilitate notifying or advising an ARD user of the hazards in the area, in accordance with various aspects and embodiments of the disclosed subject matter.

FIG. 15 illustrates a flow chart of an example method 1500 that can determine hazards in an area, and can determine and present customized information, comprising augmented reality information, via an ARD to facilitate notifying or advising an ARD user of the hazards in the area, in accordance with various aspects and embodiments of the disclosed subject matter. The area can be located in, for example, a building, a room, a device, a cabinet, or another desired area. The method 1500 can be employed by, for example, an IMC of an ARD.

At 1502, a location of a user associated with the ARD can be determined based at least in part on sensor information received from a sensor component of the ARD. The IMC can receive sensor information relating to location of the ARD and associated user (e.g., user wearing the ARD) from one or more sensors (e.g., sensor(s) of a GPS or navigation system) of the sensor component. The IMC can determine the location of the ARD and the associated user based at least in part on the sensor information.

At 1504, a field of view of the user can be determined based at least in part on the sensor information. For instance, a camera of the sensor component can capture images of the field of view of the user wearing or otherwise associated with the ARD, and can provide sensor information (e.g., captured images) regarding the field of view of the user to the IMC. An orientation component, accelerometer, and/or gyroscope of the sensor component can sense orientation, position, and/or motion of the user wearing or otherwise associated with the ARD, and can communicate the sensor information relating to orientation, position, and/or motion of the user and ARD to the IMC. The IMC can determine the field of view of the user associated with (e.g., wearing) the ARD based at least in part on the sensor information received from the one or more sensors (e.g., camera, orientation component, accelerometer, and/or gyroscope, . . . ) of the sensor component.

At 1506, one or more hazards in an area associated with the user and ARD can be identified based at least in part on the results of analyzing the sensor information received from the sensor component and/or information relating to the area that is obtained from one or more data sources. The area can span a region that is within a desired defined distance (e.g., 5 feet, 10 feet, 20 feet, or other desired larger or smaller distance) of the ARD and user. The area can include open and visible area portions (e.g., open and visible regions) and/or can include closed or obscured area portions (e.g., an inside area of a closed room, an inside area of a closed cabinet, or an inside area of a device, . . . )

One or more sensors (e.g., heat sensor, electrical sensor, chemical sensor,) of the sensor component can sense conditions (e.g., environmental conditions), which can include one or more hazards, in the area associated with the ARD and user. For example, the heat sensor of the ARD can detect temperature conditions of the area, including temperatures in the closed or obscured area portions (e.g., closed or obscured regions) of the area. The one or more sensors can communicate the sensor information relating to the conditions to the IMC.

Additionally or alternatively, the IMC can obtain other information relating to conditions of the area from one or more data sources, such as the data store or an external data source (e.g., via the communication network). For example, information relating to the conditions of the area can comprise information regarding one or more hazards (e.g., electrical hazards, temperature hazards, chemical hazards, explosive hazards, . . . ) that are or potentially may be in the area, including in the closed or obscured area portions.

The IMC can analyze the sensor information and/or the other information, and can determine or identify one or more hazards in the area, including one or more hazards located in the closed or obscured area portions of the area, based at least in part on the results of such analysis.

At 1508, customized data, comprising augmented reality information and/or virtual reality information, relating to the one or more hazards can be determined. The IMC can determine and generate the customized information relating to the one or more hazards based at least in part on the identification of the one or more hazards and results of the analysis of the sensor information and/or the other information. The customized information can comprise, textual information (e.g., words or numbers describing the type of hazard and/or indicating a location of a hazard), audio information (e.g., audible sounds (e.g., words, numbers) describing the type of hazard and/or indicating a location of a hazard), visual information or indicators (e.g., a map, such as a heat map, that can indicate relative conditions, including hazards, of the area or field of view and respective locations of such conditions and hazards; visual indicator that can indicate a hazard and its location), haptic information (e.g., the interface component can emit a vibration or other type of haptic signal to the user when the ARD and user are in proximity to a hazard), and/or other information.

At 1510, the customized information relating to the one or more hazards in the area or at least in the field of view of the user can be presented to the user via the ARD (e.g., via the interface component of the ARD). The IMC can present or facilitate presenting, e.g., via the interface component of the ARD, the customized information to the user to facilitate notifying or warning the user of the one or more hazards in the area or at least in the field of view of the user. For example, in response to determining that a high temperature hazard is located inside a cabinet in the area, the IMC can facilitate presenting, via a display screen of the interface component, a visual indicator in a position on the display screen that can correspond to the location of the cabinet in the area, wherein the visual indicator can indicate the inside of the cabinet contains a high temperature hazard. Additionally or alternatively, the IMC can facilitate presenting a heat map on the display screen, wherein the heat map can indicate relative temperature conditions of respective regions (e.g., inside of the cabinet), objects (e.g., cabinet), etc., in the area or at least in the field of view of the user.

Figure 16:
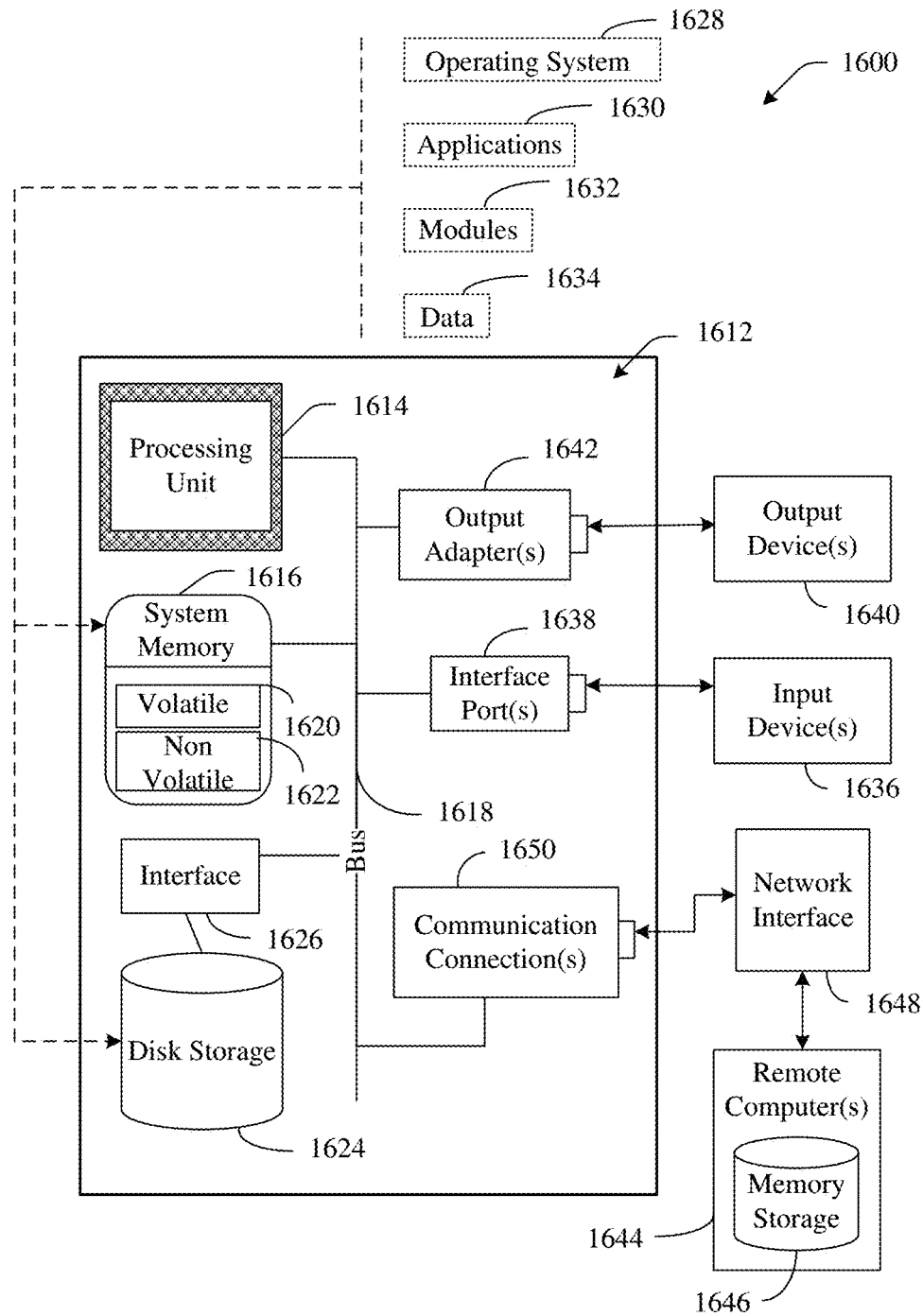
FIG. 16 is an example computing and/or operating environment.
Figure 17:
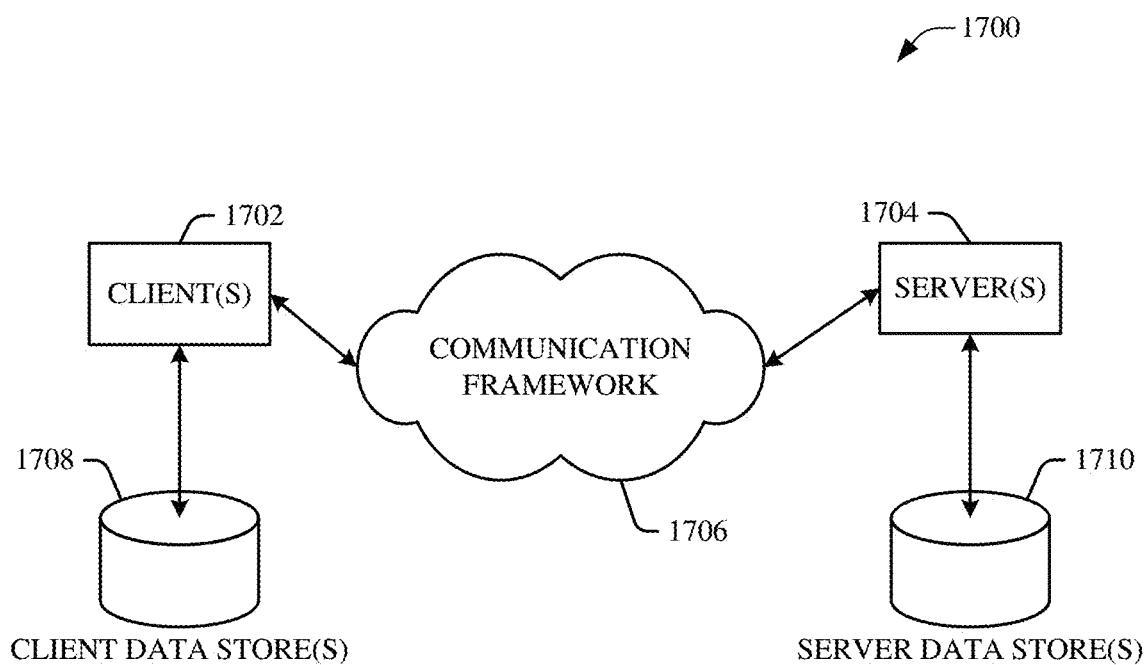
FIG. 17 is an example computing and/or networking environment.

In order to provide a context for the various aspects of the disclosed subject matter, FIGS. 16 and 17 as well as the following discussion are intended to provide a brief, general description of a suitable environment in which the various aspects of the disclosed subject matter can be implemented.

With reference to FIG. 16, an example environment 1600 for implementing various aspects of the aforementioned subject matter includes a computer 1612 (e.g., a computing component that can perform computing operations). The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1600. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing and/or networking environment 1700 with which the disclosed subject matter can interact. The computing and/or networking environment 1700 can include one or more clients 1702. The client(s) 1702 can be hardware and/or software (e.g., threads, processes, computing devices). The computing and/or networking environment 1700 also can include one or more servers 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The computing and/or networking environment 1700 can include a communication framework 1706 that can be employed to facilitate communications between the client(s) 1702 and the server(s) 1704. The client(s) 1702 are operably connected to one or more client data stores 1708 that can be employed to store information local to the client(s) 1702. Similarly, the server(s) 1704 are operably connected to one or more server data stores 1710 that can be employed to store information local to the servers 1704.

What has been described above includes examples of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

It is to be appreciated and understood that components (e.g., ARD, sensor component, interface component, information management component, image capture component, audio sensor component, environment component, location component, scanner component, display component, audio component, haptic component, key/control component, lens component, communicator component, operations manager component, recognition component, emphasis component, data determination component, processor component, data store, or other components), as described with regard to a particular system or method, can include the same or similar functionality as respective components (e.g., respectively named components or similarly named components) as described with regard to other systems or methods disclosed herein.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or application programming interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

What is claimed is:

1. A system, comprising:
a memory that stores executable components; and
a processor, operatively coupled to the memory, that executes the executable components, the executable components comprising:
an information management component configured to perform an analysis of sensor data received from a set of sensors configured to detect a condition associated with a task involving a device that is located inside of a cabinet of a piece of equipment, wherein the information management component is configured to, based on a result of the analysis, determine customized information relating to the condition, and wherein the condition is determined to be located inside of the cabinet; and
an interface component configured to display the customized information.

2. The system of claim 1, wherein
the information management component is configured to determine that the condition is a hazardous condition based on the result of the analysis, and
the customized information comprises notification information relating to the hazardous condition.

3. The system of claim 1, wherein
the information management component is configured to determine the device, a component associated with the device, or a hazardous condition located inside the cabinet based on the result of the analysis, and determine the customized information based on the device, the component, or the hazardous condition,
the cabinet, while in a closed position, obscures viewing of the device from outside of the cabinet, and
the condition comprises the hazardous condition.

4. The system of claim 3, wherein
the information management component is configured to, based on the sensor data or equipment-related data relating to the piece of equipment, generate a virtual object that represents the device, the component, or the hazardous condition, and
the customized information comprises the virtual object.

5. The system of claim 4, wherein the customized information, comprising the virtual object, enables virtual visualization of the device, the component, or the hazardous condition before or without opening the cabinet.

6. The system of claim 1, wherein
the device is a controller component,
the information management component is configured to, based on the sensor data or device-related data relating to the controller component, generate virtual objects that respectively represent controls or switches of the controller component, the virtual objects comprise a virtual object that represents a control of the controls or a switch of the switches,
the customized information comprises the virtual objects,
the interface component is configured to receive input data that modifies the virtual object, and
the information management component is configured to, in response to receipt of the input data, modify the virtual object to perform a corresponding modification to the control or the switch of the controller component.

7. The system of claim 1, wherein the task is at least one of a maintenance task involving performance of maintenance on the device, an assembly task involving assembly of the device or a product associated with the piece of equipment, or a design task involving design of the device, the product, the piece of equipment, or an industrial automation system.

8. The system of claim 1, wherein the customized information comprises at least one of augmented reality information or virtual reality information.

9. The system of claim 1, wherein
the result is a first result,
the condition is a first condition,
wherein the information management component is configured to analyze the sensor data, comprising historical sensor data relating to the device, historical operational data relating to operation of the device, and lifetime rating data relating to a lifetime rating of the device,
the information management component is configured to, based on a second result of the analysis of the sensor data, the historical operational data, and the lifetime rating data, determine a second condition that relates to a remaining portion of a lifetime usefulness of the device, and
the customized information comprises notification information relating to the second condition to notify of the second condition.

10. The system of claim 9, wherein
the sensor data relates to infrared thermal measurements, voltage level measurements, or current level measurements associated with the device,
the historical operational data indicates a length of time that the device has been in active service, a number of instances where operation of the device exceeded a rating value or a threshold value relating to the operation the device, a number of times that the device has cycled between respective operational states, historical voltage level measurements, historical current level measurements, or historical infrared thermal measurements, or
the lifetime rating data relates to a first rating that indicates the lifetime usefulness of the device, a second rating that indicates the rating value or the threshold value relating to the operation of the device, or a third rating with regard to cycling of the device between the respective operational states.

11. The system of claim 9, wherein
the information management component is configured to determine a wear level relating to wear on the device or a stress level relating stress on the device based on the second result of the analysis of the sensor data, the historical operational data, and the lifetime rating data, and
the information management component is configured to determine the remaining portion of the lifetime usefulness of the device based on the wear level or the stress level.

12. The system of claim 9, wherein
the information management component is configured to determine a set of risk levels associated with the device based on the second result of the analysis of the sensor data, the historical operational data, and the lifetime rating data,
the set of risk levels comprise a first risk level that indicates a first risk that the device fails, a second risk level that indicates a second risk that failure of the device will result in failure of or damage to another device, a third risk level that indicates a third risk relating to a cost associated with failure of the device, a fourth risk level that indicates a fourth risk of there being a hazardous condition associated with failure of the device, or a fifth risk level that indicates a fifth risk relating to a loss of production associated with failure of the device, and
the condition comprises the hazardous condition.

13. A method, comprising:
analyzing, by a system comprising a processor, sensor data received from a set of sensors that sense a condition associated with a task performed by a user involving a device that is located inside of a cabinet of a piece of equipment;
based on a result of the analyzing, determining, by the system, customized data relating to the condition, wherein the condition is determined to be located inside of the cabinet; and
presenting, by the system, the customized data via an interface, to facilitate performance of the task.

14. The method of claim 13, wherein
the customized data comprises at least one of augmented reality data or virtual reality data,
a portion of the customized data comprises visual data,
another portion of the customized data comprises audio data or haptic data, and
the method further comprises:
 displaying, by the system via a first interface, the visual data in a field of view of a user; and
 presenting, by the system via a second interface, the audio data or the haptic data to the user,
wherein the interface is the first interface or the second interface.

15. The method of claim 13, wherein
the user is a first user,
the interface is a first interface, and
the method further comprises:
 determining, by the system based on the result of the analyzing, information, comprising a portion of the customized data, relating to the task; and
 presenting, by the system, the information via a second interface to a second user, wherein the information comprises visual data or audio data relating to the task, and wherein the visual data represents a view of the device or the piece of equipment in connection with the performance of the task.

16. The method of claim 13, further comprising:
determining, by the system based on equipment-related data relating to the piece of equipment or the sensor data, the device, a component associated with the device, or a hazardous condition located inside the cabinet, wherein the condition comprises the hazardous condition; and
generating, by the system, a virtual object that represents the device, the component, or the hazardous conditions determined to be located inside the cabinet,
wherein
the presenting of the customized data comprises presenting the virtual object, and
the virtual object is interactive to enable the user to plan or rehearse performance of the task, and
wherein the task is at least one of a maintenance task involving performance of maintenance on the device, an assembly task involving assembly of the device or a product associated with the piece of equipment, or a design task involving design of the device, the product, the piece of equipment, or an industrial automation system.

17. The method of claim 13, further comprising:
based on the result of the analyzing, determining, by the system, that the condition is a hazardous condition, wherein the customized data comprises notification data informing of the hazardous condition in connection with the performance of the task.

18. The method of claim 13, wherein
the result is a first result,
the condition is a first condition,
the analyzing comprises analyzing the sensor data, comprising historical sensor data relating to the device, historical operational data relating to operation of the device, and lifetime rating data relating to a lifetime rating of the device, and
the method further comprises:
based on a second result of the analyzing of the sensor data, the historical operational data, and the lifetime rating data, determining, by the system, a second condition that indicates a remaining portion of a lifetime usefulness of the device,
wherein the customized data comprises notification data informing of the second condition.

19. A non-transitory machine-readable medium having stored thereon instructions that, in response to execution, cause a system comprising a processor to perform operations, the operations comprising:
evaluating sensor data received from a set of sensors that detect a condition associated with a job involving a device that is located inside of a structure of equipment and is obscured from view from outside of the structure while the structure is in a closed position;
based on a result of the analyzing, determining customized data relating to the condition, wherein the condition is determined to be located inside of the structure; and
communicating the customized data, via an interface, to facilitate performance of the job.

20. The non-transitory machine-readable medium of claim 19, wherein
the customized data comprises at least one of augmented reality data or virtual reality data,
a portion of the customized data comprises visual data,
another portion of the customized data comprises audio data or haptic data, and
the operations further comprise:
 displaying, via a first interface, the visual data in a field of view of a user; and
 presenting, via a second interface, the audio data or the haptic data to the user, wherein the interface is the first interface or the second interface.

* * * * *